(12) United States Patent
Kissa et al.

(10) Patent No.: US 7,701,630 B2
(45) Date of Patent: Apr. 20, 2010

(54) EXTERNAL OPTICAL MODULATOR WITH DOMAIN INVERSION FOR PROVIDING CONSTANT CHIP VERSUS FREQUENCY

(75) Inventors: Karl Kissa, West Simsbury, CT (US); Gregory J. McBrien, Glastonbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/241,570

(22) Filed: Sep. 30, 2008

(65) Prior Publication Data

US 2009/0093982 A1      Apr. 9, 2009

Related U.S. Application Data

(60) Provisional application No. 60/977,183, filed on Oct. 3, 2007.

(51) Int. Cl.
G02F 1/03 (2006.01)
G02F 1/035 (2006.01)
G02F 1/295 (2006.01)

(52) U.S. Cl. .......................... 359/254; 359/245; 385/2; 385/8

(58) Field of Classification Search ................ 359/237, 359/245, 254; 385/2, 8, 129
See application file for complete search history.

(56) References Cited

U.S. PATENT DOCUMENTS

| | | | |
|---|---|---|---|
| 4,448,479 A | 5/1984 | Alferness | 385/2 |
| 5,249,191 A | 9/1993 | Sawaki et al. | 372/22 |
| 5,267,336 A | 11/1993 | Sriram et al. | 385/2 |
| 5,278,924 A | 1/1994 | Schaffner | 385/3 |

(Continued)

FOREIGN PATENT DOCUMENTS

WO      WO03093777 A2      11/2003

OTHER PUBLICATIONS

F. Koyama et al., "Frequency chirping in external modulators," IEEE Journal of Lightwave Technology, vol. 6, No. 1, pp. 87-93, Jan. 1988.

(Continued)

*Primary Examiner*—Jack Dinh
(74) *Attorney, Agent, or Firm*—Matthew A. Pequignot; Pequignot + Myers LLC

(57) ABSTRACT

The invention relates to an external optical modulator comprising a Mach-Zehnder having a signal electrode including at least four sections of unequal length to one another positioned over an alternating domain structure in an electrooptic substrate, and including a center section, or center pair of sections disposed asymmetrically between pairs surrounding sections. The surrounding pairs, comprise the two sections adjacent the center section or pair of sections, and each two sections adjacent the previous pair of sections, moving outwardly from the center to the final outermost pair, $L_1$ and $L_N$ at the RF input 2 and RF output 4. In each pair, the section lengths are equal, or the section closer to the RF output 4 has a longer length than the section closer to the RF input 2. The surrounding pairs have lengths that decrease from the innermost pair to the outermost pair. For a zero chirp structure, the section lengths are selected to maintain an equivalent length for the inverted and uninverted domain sections. The present invention has found that constant chirp solutions can be found for all frequencies.

11 Claims, 54 Drawing Sheets

U.S. PATENT DOCUMENTS

| | | | | |
|---|---|---|---|---|
| 5,640,267 | A | 6/1997 | May et al. | 359/322 |
| 5,751,867 | A | 5/1998 | Schaffner et al. | 385/3 |
| 6,055,342 | A | 4/2000 | Yi et al. | 385/2 |
| 6,101,296 | A | 8/2000 | Tavlykaev et al. | 385/2 |
| 6,501,867 | B2 | 12/2002 | Gates, II et al. | 385/2 |
| 6,580,840 | B1 | 6/2003 | McBrien et al. | 385/2 |
| 6,600,843 | B2 | 7/2003 | Sriram et al. | 385/2 |
| 6,862,124 | B2 * | 3/2005 | Akiyama et al. | 359/248 |
| 6,947,614 | B2 | 9/2005 | Porte et al. | 385/2 |
| 6,950,579 | B2 | 9/2005 | Ahn et al. | 385/40 |
| 7,058,241 | B2 | 6/2006 | Sugiyama et al. | 385/4 |
| 7,088,874 | B2 | 8/2006 | Pruneri et al. | 385/3 |
| 7,088,875 | B2 | 8/2006 | Sugiyama et al. | 385/3 |
| 7,174,059 | B2 | 2/2007 | Oikawa et al. | 385/3 |
| 2006/0228065 | A1 | 10/2006 | Burns | 385/3 |

OTHER PUBLICATIONS

T.J. Schmidt et al., "Spectrally efficient and impairment-robust modulation techniques for 40Gb/s optical transmission systems," NFOEC, Dallas, Texas, Sep. 15, 2002.

K. Noguchi et al., "Millimeter-wave Ti:LiNbO$_3$ optical modulators," IEEE Journal of Lightwave Technology, vol. 16, No. 4, pp. 615-619, Apr. 1998.

N. Courjal et al., "LiNbO$_3$ Mach-Zehnder modulator with chirp adjusted by ferroelectric domain inversion," IEEE Photonics Technology Letters, vol. 14, No. 11, pp. 1509-1511, Nov. 2002.

N. Courjal et al., "Modeling and optimization of low chirp LiNbO$_3$ Mach-Zehnder modulators with an inverted ferroelectric domain section," IEEE Journal of Lightwave Technology, vol. 22, No. 5, pp. 1338-1343, May 2004.

Weidong Wang et al., "Bandpass traveling-wave Mach-Zehnder modulator in LiNbO$_3$ with domain reversal," IEEE Photonics Technology Letters, vol. 9, No. 5, pp. 610-612, May 1997.

D.-S. Kim et al., "High modulation index EO phase modulator using non-periodic domain inversion," Proceedings of the Conference on Lasers and Electro-Optics (CLEO), Pacific Rim, P1.51, pp. 421-422, Aug. 30-Sep. 3, 1999.

D.-S. Kim et al., "Standing-wave EO phase modulator using non-periodic domain inversion for large modulation index," Electronics Letters, vol. 36, No. 3, pp. 230-232, Feb. 3, 2000.

F. Lucchi et al., "10Gb/s domain engineered LiNbO$_3$ integrated electro-optic modulator for inexpensive low voltage drivers", OWH3 Optical Society of America, OFC/NFOEC 2007, Conference Proceedings, pp. 1-3, Mar. 2007.

S. Samson et al., "Electro-optic measurements using a Mach-Zehnder interferometer with domain reversals", SPIE, vol. 2749, p. 186-194, Jun. 14, 1996.

Tetsuya Kishino et al., "70+ micron deep domain inversion in x-cut LiNbO$_3$ and its use in a high-speed bandpass integrated-optic modulator", Applied Physics Letters, vol. 76, No. 26, pp. 3852-3854, Jun. 26, 2000.

S. Kurimura, "Optical Application of Domain Engineering: Polarization-Reversed Optical Devices", Ferro Electrics, vol. 340, p. 91-98, Sep. 2006. Abstract Only.

Yue Wang et al., "Design of Quasi-velocity-matched LiTa03 phase modulator", Proceeding SPIE, vol. 4220, p. 135-138, Oct. 3, 2000. Abstract Only.

Xianfeng Chen et al., "Optimal design of broadened flat bandpass electro-optic phase modulator based on aperiodic domain-inverted grating", J. Opt. A.: Pure Appl. Opt., vol. 5, p. 159-162, 2003. Abstract Only.

* cited by examiner

Q Signal at Receiver

I Signal at Receiver

Q Signal at Receiver

I Signal at Receiver

Fig. 49 A $$1 - 2e^{-\alpha(f_1)L_1} + 2e^{-\alpha(f_1)(L_1+L_2)} - 2e^{-\alpha(f_1)(L_1+L_2+L_3)} + \ldots + 2e^{-\alpha(f_1)(L_1+L_2+L_3+\ldots+L_{N-1})} - e^{-\alpha(f_1)(L_1+L_2+L_3+\ldots+L_N)} = 0 \quad (19-1)$$

Fig. 49 B $$1 - 2e^{-\alpha(f_2)L_1} + 2e^{-\alpha(f_2)(L_1+L_2)} - 2e^{-\alpha(f_2)(L_1+L_2+L_3)} + \ldots + 2e^{-\alpha(f_2)(L_1+L_2+L_3+\ldots+L_{N-1})} - e^{-\alpha(f_2)(L_1+L_2+L_3+\ldots+L_N)} = 0 \quad (19-2)$$

Fig. 49 C $$1 - 2e^{-\alpha(f_{N-2})L_1} + 2e^{-\alpha(f_{N-2})(L_1+L_2)} - 2e^{-\alpha(f_{N-2})(L_1+L_2+L_3)} + \ldots + 2e^{-\alpha(f_{N-2})(L_1+L_2+L_3+\ldots+L_{N-1})} - e^{-\alpha(f_{N-2})(L_1+L_2+L_3+\ldots+L_N)} = 0 \quad (19-(N-2))$$

Fig. 49 D $$L_1 + L_3 + \ldots + L_N = L_2 + L_4 + \ldots + L_{N-1} \quad (19-(N-1))$$

Fig. 49 E $$L_1 + L_2 + L_3 + \ldots + L_N = L \quad (19-N)$$

Fig. 50 A
$$1 - 2e^{-\alpha(f_1)L_1} + 2e^{-\alpha(f_1)(L_1+L_2)} - 2e^{-\alpha(f_1)(L_1+L_2+L_3)} + \ldots - 2e^{-\alpha(f_1)(L_1+L_2+L_3+\ldots+L_{N-1})} + e^{-\alpha(f_1)(L_1+L_2+L_3+\ldots+L_N)} = 0 \quad (20-1)$$

Fig. 50 B
$$1 - 2e^{-\alpha(f_2)L_1} + 2e^{-\alpha(f_2)(L_1+L_2)} - 2e^{-\alpha(f_2)(L_1+L_2+L_3)} + \ldots - 2e^{-\alpha(f_2)(L_1+L_2+L_3+\ldots+L_{N-1})} + e^{-\alpha(f_2)(L_1+L_2+L_3+\ldots+L_N)} = 0 \quad (20-2)$$

Fig. 50 C
$$1 - 2e^{-\alpha(f_{N-2})L_1} + 2e^{-\alpha(f_{N-2})(L_1+L_2)} - 2e^{-\alpha(f_{N-2})(L_1+L_2+L_3)} + \ldots - 2e^{-\alpha(f_{N-2})(L_1+L_2+L_3+\ldots+L_{N-1})} + e^{-\alpha(f_{N-2})(L_1+L_2+L_3+\ldots+L_N)} = 0 \quad (20-(N-2))$$

Fig. 50 D
$$L_1 + L_3 + \ldots + L_{N-1} = L_2 + L_4 + \ldots + L_N \quad (20-(N-1))$$

Fig. 50 E
$$L_1 + L_2 + L_3 + \ldots + L_N = L \quad (20-N)$$

Fig. 51 A $$C_1(f_1) - C_2(f_1)e^{-\alpha(f_1)L_1} + C_2(f_1)e^{-\alpha(f_1)(L_1+L_2)} - C_2(f_1)e^{-\alpha(f_1)(L_1+L_2+L_3)} + \ldots + C_2(f_1)e^{-\alpha(f_1)(L_1+L_2+L_3+\ldots+L_{N-1})} - C_1(f_1)e^{-\alpha(f_1)(L_1+L_2+L_3+\ldots+L_N)} = 0 \quad (21-1)$$

Fig. 51 B $$C_1(f_2) - C_2(f_2)e^{-\alpha(f_2)L_1} + C_2(f_2)e^{-\alpha(f_2)(L_1+L_2)} - C_2(f_2)e^{-\alpha(f_2)(L_1+L_2+L_3)} + \ldots + C_2(f_2)e^{-\alpha(f_2)(L_1+L_2+L_3+\ldots+L_{N-1})} - C_1(f_2)e^{-\alpha(f_2)(L_1+L_2+L_3+\ldots+L_N)} = 0 \quad (21-2)$$

Fig. 51 C $$C_1(f_{N-2}) - C_2(f_{N-2})e^{-\alpha(f_{N-2})L_1} + C_2(f_{N-2})e^{-\alpha(f_{N-2})(L_1+L_2)} + \ldots + C_2(f_{N-2})e^{-\alpha(f_{N-2})(L_1+L_2+L_3+\ldots+L_{N-1})} - C_1(f_{N-2})e^{-\alpha(f_{N-2})(L_1+L_2+L_3+\ldots+L_N)} = 0 \quad (21-(N-2))$$

Fig. 51 D $\quad C_1(0)(L_1 + L_3 + \ldots + L_N) = C_3(0)(L_2 + L_4 + \ldots + L_{N-1}) \quad (21-(N-1))$ Fig. 51 E $\quad L_1 + L_2 + L_3 + \ldots + L_N = L \quad (21-N)$ Fig. 51 F $\quad C_1(f) = EO_1 - F_C(f)EO_2 \quad (21-(N+1))$ Fig. 51 G $\quad C_2(f) = (1 + F_C(f))(EO_1 - EO_2) \quad (21-(N+2))$ Fig. 51 H $\quad C_3(f) = F_C(f)EO_1 - EO_2 \quad (21-(N+3))$

Fig. 52 A $$C_1(f_1) - C_2(f_1)e^{-\alpha(f_1)L_1} + C_2(f_1)e^{-\alpha(f_1)(L_1+L_2)} - C_2(f_1)e^{-\alpha(f_1)(L_1+L_2+L_3)} + \ldots - C_2(f_1)e^{-\alpha(f_1)(L_1+L_2+L_3+\ldots+L_{N-1})} + C_3(f_1)e^{-\alpha(f_1)(L_1+L_2+L_3+\ldots+L_N)} = 0 \quad (22-1)$$

Fig. 52 B $$C_1(f_2) - C_2(f_2)e^{-\alpha(f_2)L_1} + C_2(f_2)e^{-\alpha(f_2)(L_1+L_2)} - C_2(f_2)e^{-\alpha(f_2)(L_1+L_2+L_3)} + \ldots - C_2(f_2)e^{-\alpha(f_2)(L_1+L_2+L_3+\ldots+L_{N-1})} + C_3(f_2)e^{-\alpha(f_2)(L_1+L_2+L_3+\ldots+L_N)} = 0 \quad (22-2)$$

Fig. 52 C $$C_1(f_{N-2}) - C_2(f_{N-2})e^{-\alpha(f_{N-2})L_1} + C_2(f_{N-2})e^{-\alpha(f_{N-2})(L_1+L_2)} - C_2(f_{N-2})e^{-\alpha(f_{N-2})(L_1+L_2+L_3)} + \ldots - C_2(f_{N-2})e^{-\alpha(f_{N-2})(L_1+L_2+L_3+\ldots+L_{N-1})} + C_3(f_{N-2})e^{-\alpha(f_{N-2})(L_1+L_2+L_3+\ldots+L_N)} = 0 \quad (22-(N-2))$$

Fig. 52 D $\quad C_1(0)(L_1 + L_3 + \ldots + L_{N-1}) = C_3(0)(L_2 + L_4 + \ldots + L_N) \quad (22-(N-1))$ Fig. 52 E $\quad L_1 + L_2 + L_3 + \ldots + L_N = L \quad (22-N)$ Fig. 52 F $\quad C_1(f) = EO_1 - F_C(f)EO_2 \quad (22-(N+1))$ Fig. 52 G $\quad C_2(f) = (1 + F_C(f))(EO_1 - EO_2) \quad (22-(N+2))$ Fig. 52 H $\quad C_3(f) = F_C(f)EO_1 - EO_2 \quad (22-(N+3))$ Fig. 53 A $\quad F_{j,0} = C_1(f_j)[1 - \exp(-\alpha(f_j)L)]$ Fig. 53 B $\quad F_{j,i} = (-1)^i C_2(f_j) \exp\left[-\alpha(f_j)\left(\sum_{l=1}^{l=i} L_l\right)\right]$ For $j = 1, 2, \ldots, N-2$ Fig. 53 C $\quad F_{j,0} + \sum_{i=1}^{N-1} F_{j,i} = 0$ Fig. 53 D $\quad C_1(0)(L_1 + L_3 + \ldots + L_N) = C_3(0)(L_2 + L_4 + \ldots + L_{N-1})$ Fig. 53 E $\quad L_1 + L_2 + L_3 + \ldots + L_N = L$ Fig. 53 F $\quad C_1(f) = EO_1 - F_C(f)EO_2$ Fig. 53 G $\quad C_2(f) = (1 + F_C(f))(EO_1 - EO_2)$ Fig. 53 H $\quad C_3(f) = F_C(f)EO_1 - EO_2$ Fig. 54 A $\quad F_{j,0} = C_1(f_j) + C_3(f_j)\exp(-\alpha(f_j)L)$ Fig. 54 B $\quad F_{j,i} = (-1)^i C_2(f_j)\exp\left[-\alpha(f_j)\left(\sum_{l=1}^{l=i} L_l\right)\right]$ For $j = 1, 2, \ldots, N-2$ Fig. 54 C $\quad F_{j,0} + \sum_{i=1}^{N-1} F_{j,i} = 0$ Fig. 54 D $\quad C_1(0)(L_1 + L_3 + \ldots + L_{N-1}) = C_3(0)(L_2 + L_4 + \ldots + L_N)$ Fig. 54 E $\quad L_1 + L_2 + L_3 + \ldots + L_N = L$ Fig. 54 F $\quad C_1(f) = EO_1 - F_C(f)EO_2$ Fig. 54 G $\quad C_2(f) = (1 + F_C(f))(EO_1 - EO_2)$ Fig. 54 H $\quad C_3(f) = F_C(f)EO_1 - EO_2$

EXTERNAL OPTICAL MODULATOR WITH DOMAIN INVERSION FOR PROVIDING CONSTANT CHIP VERSUS FREQUENCY

CROSS-REFERENCE TO RELATED APPLICATIONS

This application claims priority from 60/977,183 filed Oct. 3, 2007, herein incorporated by reference.

TECHNICAL FIELD

The present application relates to external optical modulators, formed in electrooptic material with domain inversion, for providing a constant chirp versus frequency response, and to a method for designing external optical modulators with domain inversion to provide a constant chirp versus frequency response.

BACKGROUND OF THE INVENTION

In order to satisfy the demand for higher bit rate optical transmission, for example 40 Gbits/s, a number of non-binary encoding schemes are considered such as Quadrature Phase Shift Keying (QPSK), Differential Quadrature Phase Shift Keying (DQPSK), or Duobinary. External modulators constructed on z-cut lithium niobate are attractive for their lower drive voltage requirements and larger bandwidth capabilities. But z-cut modulators have an asymmetric structure that causes chirp, that is, the ratio between residual phase modulation and the intensity modulation generated. Prior art external modulators in lithium niobate have offered zero chirp within narrow frequency limitations. But over the broader frequency range of high bit rate transmission, the frequency dependence reveals an unacceptably high chirp for non-binary encoding schemes.

FIG. 1 shows a simple prior art Mach-Zehnder (MZ) modulator 10 made in a z-cut lithium niobate substrate 12, having an optical input 14 and output 16, two y-junctions 18, 18' for splitting and combining light, respectively, and two waveguides 20, 22 of length, L, that make up the arms of the Mach-Zehnder. A signal electrode 24 having an RF input 2 and an RF output 4, and two ground electrodes 26 apply an electric field to the two waveguides 20, 22 in the MZ 10. The RF signal electrode 24 is much narrower than the ground electrodes 26, hence the electric field is much more focused underneath the signal electrode 24, causing an imbalance in the strength of modulation in the two arms of the MZ. For typical electrode designs, the modulation in the waveguide 20 underneath the ground electrode 26 is approximately $\frac{1}{6}^{th}$ of the modulation of the waveguide 22 under the signal electrode 24. The relative modulation strength, $EO_i$, is defined to be ratio of the modulation in the $i^{th}$ waveguide to the total modulation needed to switch the modulator output from on to off. $EO_1$ and $EO_2$, corresponding to the waveguides 22, underneath the signal 24 and ground 26 electrodes, respectively, are 0.85 and 0.15.

FIG. 2 shows the chirp parameter as a function of frequency. The chirp parameter, α is defined by Equation 3 from F. Koyama and K. Iga, "Frequency chirping in external modulators," IEEE Journal of Lightwave Technology," Vol. 6, No. 1, January 1988, pp. 87-93, which can be rewritten in the form $$\alpha = \frac{\frac{d\phi}{dt}}{\frac{1}{2I}\frac{dI}{dt}} \quad (1)$$

where φ is the net optical phase modulation output by the modulator and I is the intensity of light exiting the modulator. Chirp is referred to as the alpha (α) parameter, which should not be confused with α used to describe the RF loss in an RF electrode. In this application, the chirp parameter is referred to simply as "chirp" to avoid confusion with RF loss.

The chirp is constant but non-zero in FIGS. 2A and B. Depending on which quadrature point of the Mach-Zehnder is chosen as the bias point, the slope of intensity vs. drive voltage can either be positive or negative, causing the calculated chirp value from Equation 1 to be either +0.7 as shown in FIG. 2A or −0.7 shown in FIG. 2B. In all graphs of chirp that follow, it is assumed that the quadrature point corresponding to a chirp value of +0.7 is chosen, for the purpose of defining chirp according to Equation 1.

A prior art modulator with a more complex architecture is shown in FIG. 3. The Dual Parallel Mach-Zehnder (DPMZ) Interferometer 30 has two simple Mach-Zehnder Interferometers 32, 34 nested in the arms of a larger Mach-Zehnder Interferometer 36. This modulator 30 is sometimes used for Quadrature Phase Shift Keying (QPSK) or Differential Quadrature Phase Shift Keying (DQPSK) transmission at 40 Gb/s. There are two independent RF signal electrodes 38A and 38B for the "inner MZ's" 32, 34 and bias electrodes 40 for the larger "outer" MZ 36. Not shown are bias electrodes in the inner MZ's 32, 34, which typically follow the RF signal electrodes 38A and 38B. Note that an x-cut lithium niobate electrode configuration is shown, where the waveguides 31, 33 are positioned between signal 38A and 38B and ground 39 electrodes. This configuration has balanced modulation in the two arms 31, 33 of the inner MZ's resulting in zero chirp for the inner MZ's 32, 34. Another configuration uses z-cut substrate and electrode configuration along with the invention, which permits zero chirp operation. In such a configuration, the waveguides of the inner MZ are underneath the signal and ground electrodes.

In one version of a QPSK system, the two inner MZ's 32, 34 are biased at null while the outer MZ 36 is biased at quadrature as disclosed by T. J. Schmidt, et. al., "Spectrally efficient and impairment-robust modulation techniques for 40 Gb/s optical transmission systems," NFOEC 2002, Dallas, Tex. A 40 Gb/s signal is split into two 20 Gb/s signals with an encoder. The two 20 Gb/s digital signals are fed into the two RF signal electrodes of the DPMZ. The two modulation signals create optical modulation signals that are orthogonal to one another in optical phase. These two transmitted signals are often referred to as I and Q signals. These two optical signals can be detected independently of one another using a coherent receiver which mixes the received optical signal with a signal from a local oscillator. FIGS. 4A and B show simulation results for the two received signals corresponding to the I and Q transmitted signals in the absence of any chromatic dispersion or other degradation caused by the optical fiber. Note that the two signals are free of distortion.

One problem with the zero-chirp x-cut lithium niobate modulators is the requirement for a higher drive voltage than can be implemented using chirped z-cut lithium niobate modulators. For example, by implementing ridge waveguides in z-cut modulators as described in K. Noguchi, et. al., "Millimeter-wave Ti:LiNbO$_3$ optical modulators," IEEE Journal of Lightwave Technology, Vol. 16, No. 4, April 1998, pp. 615-619, the drive voltage can be reduced significantly. However, conventional chirped z-cut Mach-Zehnders are unsuitable for use in a DPMZ architecture, as the chirp would severely compromise the orthogonality of the I and Q signals.

Prior art methods for converting a chirped z-cut modulator into a zero-chirp modulator are described in U.S. Pat. Nos. 6,501,867, 7,058,241, 7,088,875, and in the publication literature N. Courjal, et. al., "LiNbO$_3$ Mach-Zehnder modulator with chirp adjusted by ferroelectric domain inversion," IEEE Photonics Technology Letters, Vol. 14, No. 11, November 2002, pp. 1509-1511. Such designs are desirable to allow for reduced drive voltage available with z-cut lithium niobate technology. While many of the designs are adequate for conventional On-Off Keying (OOK) transmission, they introduce some performance penalty for QPSK transmission due to the residual chirp. There are other transmission formats that require zero-chirp modulators, as well, for example, duobinary.

Electro-optic external modulators made of lithium niobate or lithium tantalite, or electro-optic polymer can be subjected to poling to reverse the crystal structure. Other external modulators are manufactured in semiconductor material such as InP or GaAs.

FIG. 5 shows a prior art single drive z-cut lithium niobate modulator 50 having a two-section MZ 52. The ferroelectric domain has been inverted in section 57 while section 55 is in the original state and the signal electrode 56 moves from waveguide 53 to waveguide 51 in the domain inverted section 57. The sections are defined by the lengths $L_1$ and $L_2$, shown by dashed lines, where the signal electrode 56 overlaps alternate waveguides 51, 53. Throughout this application the labels $L_1$ to $L_N$ for the lengths of the N sections are used such that $L_1$ is disposed closest to the RF input 2, and $L_N$ is disposed closest to the RF output 4. The electrode 56 cross-over portion is not included in the section length. The two ground electrodes adjacent to the signal electrode 56 are not shown for ease of illustration. The alternating electrode path 56 reverses the asymmetric structure when the domain is reversed in order to preserve the polarity of the accumulated modulation. If the two sections 55, 57 have equal length, chirp is zero at low frequency, but becomes non-zero at higher frequencies, due to RF loss in the electrode 56 that reduces the signal voltage at the beginning of the second section 57 relative to the first section 55. One can partially compensate for the RF loss by making the length $L_2$ of the second section 57 longer than the length $L_1$ of the first section 55. FIG. 6 shows chirp as a function of frequency for such a design, where lengths $L_1$ and $L_2$ normalized to the total length of the MZ are 0.42 and 0.58, respectively. The modulator is assumed to be velocity-matched, that is the optical and RF velocities are the same. The RF loss in the RF electrode is given by Equation 2, where the assumed values of $a_{00}$ and $a_{01}$ are 0.0 Nepers/(cm-(GHz)) and 0.0311 Nepers/(cm-(GHz)$^{0.5}$), respectively, and L equals 5 cm. The assumed values of $a_{00}$ and $a_{01}$ correspond to 0.0 dB/(cm-(GHz)) and 0.27 dB/(cm-(GHz)$^{0.5}$), respectively. The values in units of dB must be converted to Nepers by multiplying ln(10)/20, before inserting into Equation 2 and all following equations.

$$\alpha(f)L=(\alpha_{00}f+\alpha_{01}\sqrt{f})L \quad (2)$$

For this two-section modulator 50, chirp is about −0.1 at low frequency, is zero at about 18 GHz, and increases to about +0.06 at 40 GHz. Note that the choice of lengths that produce zero chirp at 18 GHz are different if the coefficients defining RF loss are different.

FIGS. 7A and B show simulation results of the received I and Q signals for the case that the two section MZ 52 is used as the inner MZ's 32, 34 of a DPMZ 30 (as in FIG. 3). There is distortion in the signals. The distortion is due to crosstalk between the two 20 Gb/s bit streams caused by the residual chirp. FIGS. 8A and B show the simulated crosstalk in the two received bitstreams. In these simulations, the I signal at the transmitter is turned off, and the resulting received I signal is calculated. Similarly, the received Q signal is calculated for the case where no Q signal is transmitted. Ideally, the two signal amplitudes should always be zero, but are non-zero due to the transmitted I and Q signals not being completely orthogonal to one another. The amplitude of the crosstalk signals are on the order of 10% to 12% of the amplitude of the main signal.

A prior art three section single drive MZ modulator 60 is shown in FIG. 9, as taught in U.S. Pat. Nos. 7,058,241 and 7,088,875 assigned to Fujitsu Limited. As disclosed in one embodiment, the domain inverted section $L_2$ is centered along the length of the MZ 60, and $L_1$ is equal to $L_3$. In addition, the total length of the uninverted sections ($L_1+L_3$) is equal to the length of the inverted section ($L_2$). The normalized lengths $L_1$, $L_2$, and $L_3$ are 0.25, 0.50, and 0.25, respectively. RF signal electrode 66 is disposed over waveguide 63 at RF input 2 in section $L_1$ and crosses to waveguide 61 in section $L_2$ over the domain inverted section 67 and returns to waveguide 63 in section $L_3$ where it is coupled to the RF output 4.

FIG. 10 shows the chirp vs. frequency plot for the prior art three-section MZ 60 with centered domain inversion section. Residual chirp is much lower than for the two-section design. Chirp is zero at low frequency and steadily increases to about 0.02 at 40 GHz. FIGS. 11A and B show crosstalk in the I and Q signals for a 40 Gb/s QPSK system. The amplitude of the crosstalk is only about 1% of the main signal. This cross-talk is a consequence of the chirp shown in FIG. 10, showing that the I and Q orthogonal signals are not completely independent due to the chirp. This level of crosstalk may be adequate for 40 Gb/s QPSK, however, there may be some small yet significant performance penalty associated with this crosstalk. There may be other performance issues related to small amounts of residual chirp.

FIGS. 12-18 describe the performance of a prior art three-section MZ 60 for cases where the device parameters are slightly different from the optimal design. It is important that any design be relatively insensitive to variation in device parameters that are likely to occur in manufacture.

FIGS. 12 and 13 show chirp vs. frequency for a prior art three-section MZ 60 with +0.05 and −0.05 velocity walk-off ($\Delta N_{RF}$) between RF and optical signals, respectively. The velocity walk-off value refers to the difference between the optical and microwave indices. Note that the residual chirp increases to a larger value of 0.04 at 40 GHz for either case. FIGS. 14A and B show the simulated crosstalk in the received I and Q signals for the prior art three-section MZ with +0.05 velocity walk-off. The crosstalk amplitude increases to about 2% to 3% of the main signal for this case.

FIGS. 15 and 16 show the chirp vs. frequency for a prior art three-section MZ with 20% higher and 20% lower $a_{01}$, respectively, while FIGS. 17 and 18 show similar plots where the intrinsic chirp parameter is 0.8 and 0.6, respectively, instead of 0.7. Intrinsic chirp refers to the chirp for the same MZ geometry as a single section without domain inversion. This typically ranges from 0.5 to 1.0 depending on the MZ geometry. Note that changes to RF loss or intrinsic chirp only produce a minor change to the resultant chirp at any frequency from DC to 40 GHz.

FIG. 19 describes a prior art four-section MZ 70, where all the sections are of equal length, as taught in FIGS. 2 and 3 of U.S. Pat. No. 6,501,867 assigned to Lucent Technologies Inc. RF signal electrode 76 is coupled from RF input 2 over waveguide 73 in section $L_1$, and section $L_3$ and alternates over waveguide 71 in the domain inverted regions 77 for sections $L_2$ and $L_4$. Those figures show two-section and seven-section MZ designs, where all the section lengths are equal. The text does not teach a specific length for the sections. FIG. 3 in N. Courjal, et al., referenced above, shows chirp as a function of frequency for a two-section MZ for five different choices of length. The choice closest to zero chirp is the one where the two lengths are equal to one another.

FIG. 20 shows chirp vs. frequency for a prior art four-section MZ 70 where $L_1=L_2=L_3=L_4$ as shown in FIG. 19. Chirp is zero at low frequency, but increases to >0.08 at 40 GHz.

FIGS. 21A and B show crosstalk in the I and Q signals for the prior art four-section MZ 70, for a 40 Gb/s QPSK system. Simulations assume a structure similar to FIG. 3, where each of the smaller MZ's within the structure contain a four-section zero-chirp MZ. The amplitude of the crosstalk is as much as 6% of the main signal, which is likely to have some impact on system performance. The high amount of residual chirp may introduce other system penalties.

Accordingly, a low voltage external optical modulator that can provide a constant chirp versus frequency response remains highly desirable; particularly an external single drive optical modulator suitable for non-binary encoding schemes is desired.

SUMMARY OF THE INVENTION

Accordingly, an object of the present invention is to provide a single drive external optical modulator that can operate at high bit rates and provide a constant chirp versus frequency response.

A further object of the present invention is to provide a method of designing a high bit rate external optical modulator with a constant chirp versus frequency response.

A further object of the present invention is to provide an external optical modulator that has zero chirp over all frequencies.

A further object of the present invention is to provide an external optical modulator that can operate at less than 5 Volts, and preferably at less than 4 Volts or as low as less than 3 Volts.

The present invention has found that constant chirp solutions can be found for all frequencies for external single drive modulators having at least four alternating domain sections of unequal length to one another, and including a center section, or center pair of sections disposed asymmetrically between pairs surrounding sections. The surrounding pairs, comprise the two sections adjacent the center section or pair of sections, and each two sections adjacent the previous pair of sections, moving outwardly from the center to the final outermost pair, $L_1$ and $L_N$ at the RF input 2 and RF output 4. In each pair, the section lengths are equal, or the section closer to the RF output 4 has a longer length than the section closer to the RF input 2. The surrounding pairs have lengths that decrease from the center pair to the outermost pair. For a zero chirp structure, the section lengths are selected to maintain equivalent length for the inverted and uninverted domain sections.

The present invention has also found that zero chirp can be achieved for all frequencies if the central section or sections are not centered in the waveguide arms.

A further advantage of the present invention is less sensitivity of chirp response to manufacturing conditions.

Thus an aspect of the present invention provides a Mach-Zehnder optical modulator comprising a substrate of electro-optic material having a plurality of regions with alternating domain structure, a Mach-Zehnder (MZ) optical waveguide interferometer formed in the substrate and having two optical waveguide arms, the waveguide arms having a length so as to include at least four regions of alternating domain structure, an RF signal electrode having at least four sections, each section having a length substantially corresponding to the alternating domain structure regions of the substrate, the RF signal electrode positioned over sections of the two optical waveguides arms such that the signal electrode crosses from one optical waveguide arm to the other optical waveguide arm at a boundary of each alternating domain structure region, the lengths of the at least four RF signal electrode sections are predetermined to approximate a constant chirp versus frequency over an optimized frequency band, such that the sections include a center section or center pair of sections disposed asymmetrically between an RF input and an RF output, and surrounded by one or more pairs of surrounding sections, the pairs of surrounding sections including an innermost surrounding pair of sections comprising two sections adjacent the center section or center pair of sections, and two sections adjacent the innermost pair of sections moving outwardly from the innermost to a final outermost pair at the RF input and RF output, the surrounding pairs having lengths that are equal to each other or unequal such that the section closer to the RF output is longer than the section closer to the RF input, the lengths of the surrounding pairs decreasing from the innermost surrounding pair to the outermost surrounding pair of sections.

BRIEF DESCRIPTION OF THE DRAWINGS

Further features and advantages of the present invention will become apparent from the following detailed description, taken in combination with the appended drawings, in which:

FIGS. 49 A-E comprise a series of simultaneous equations for solving the section lengths for an N section MZ having zero chirp at all frequencies, where N is an odd number;

FIGS. 50 A-E comprise a series of simultaneous equations for solving the section lengths for an N section MZ having zero chirp at all frequencies, where N is an even number;

FIGS. 51 A-H comprise a series of simultaneous equations for solving the section lengths for an N section MZ with a selected arbitrary chirp, where N is an odd number;

FIGS. 52 A-H comprise a series of simultaneous equations for solving the section lengths for an N section MZ with a selected arbitrary chirp, where N is an even number.

FIGS. 53 A-H comprise a series of simultaneous equations, generalized from FIG. 51A-H, for solving the section lengths for an N section MZ with a selected arbitrary chirp, where N is an odd number.

FIGS. 54 A-H comprise a series of simultaneous equations, generalized from FIG. 52A-H, for solving the section lengths for an N section MZ with a selected arbitrary chirp, where N is an even number.

It will be noted that throughout the appended drawings, like features are identified by like reference numerals.

Figure 1:
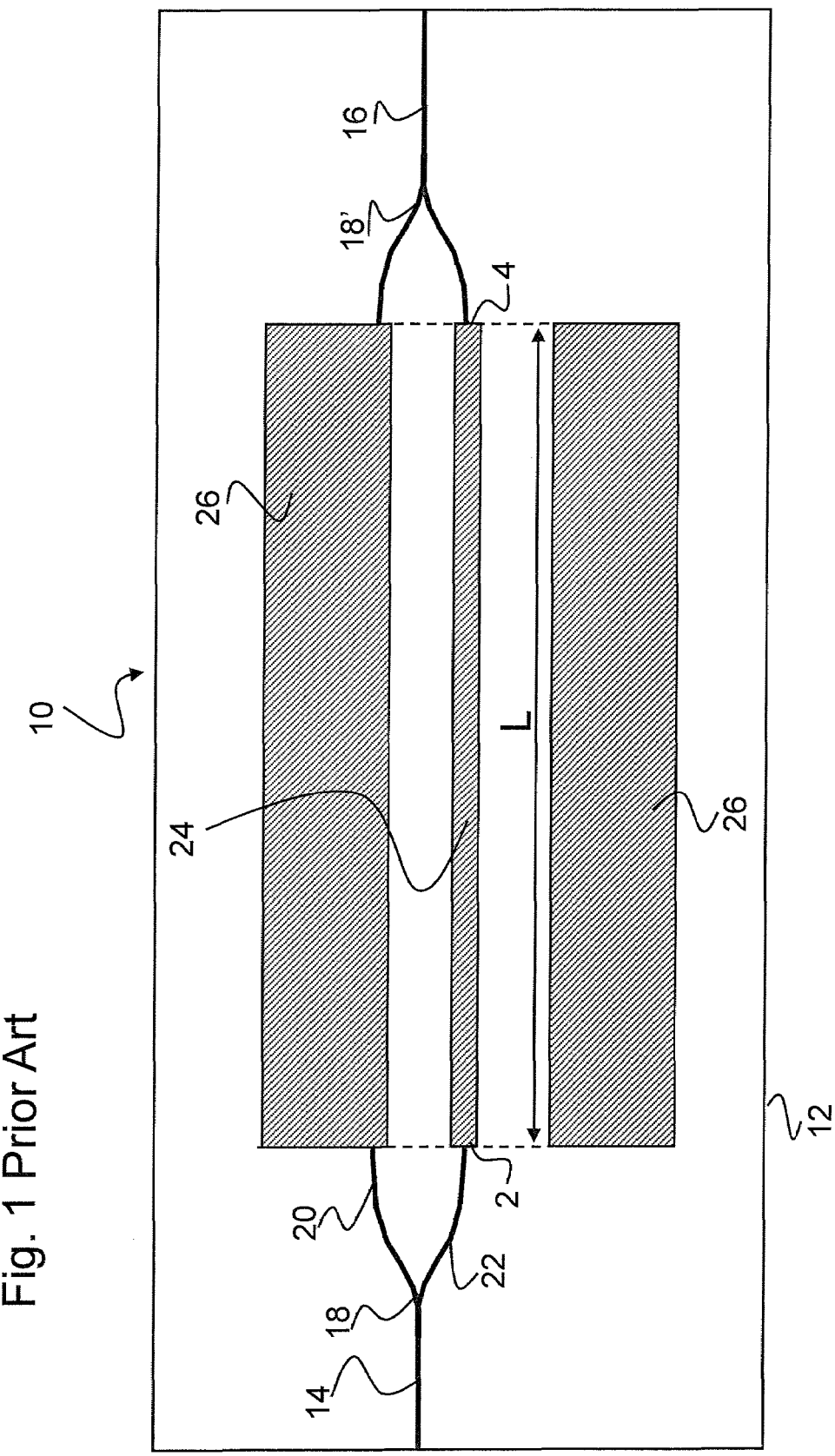
FIG. 1 is a schematic illustration of a prior art one section MZ modulator.
Figure 2A:
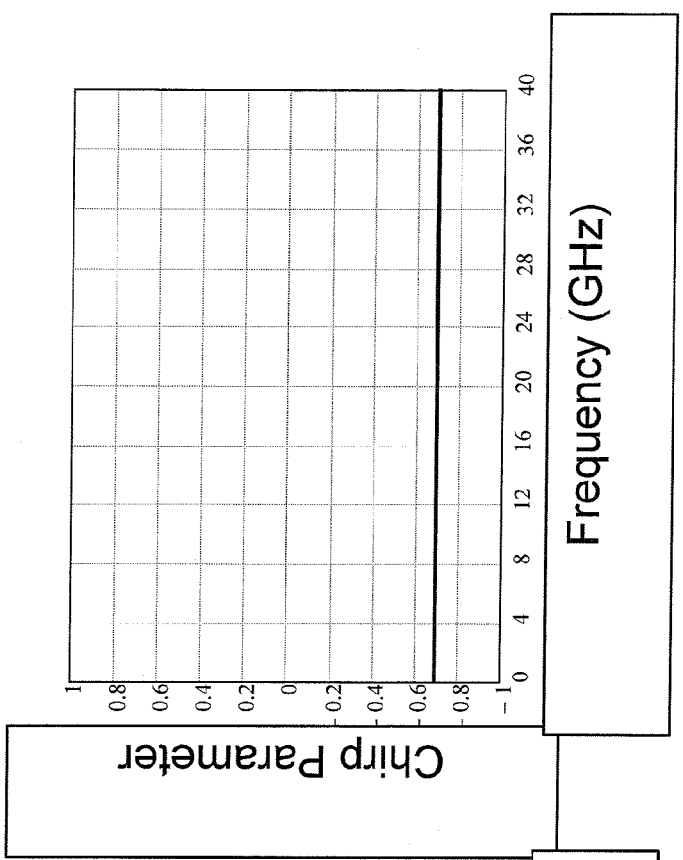
FIGS. 2A and B are graphs of chirp versus frequency for the prior art MZ of FIG. 1.
Figure 2B:
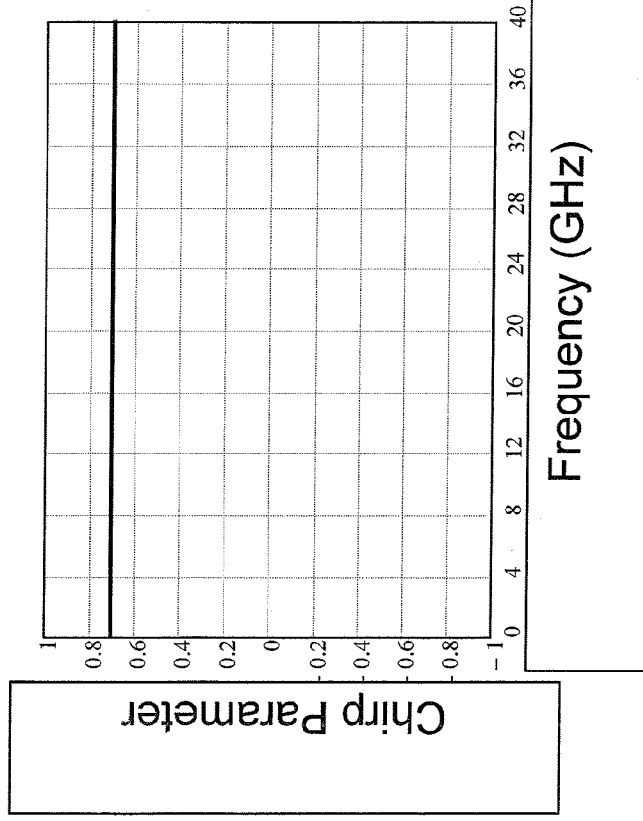
Figure 3:
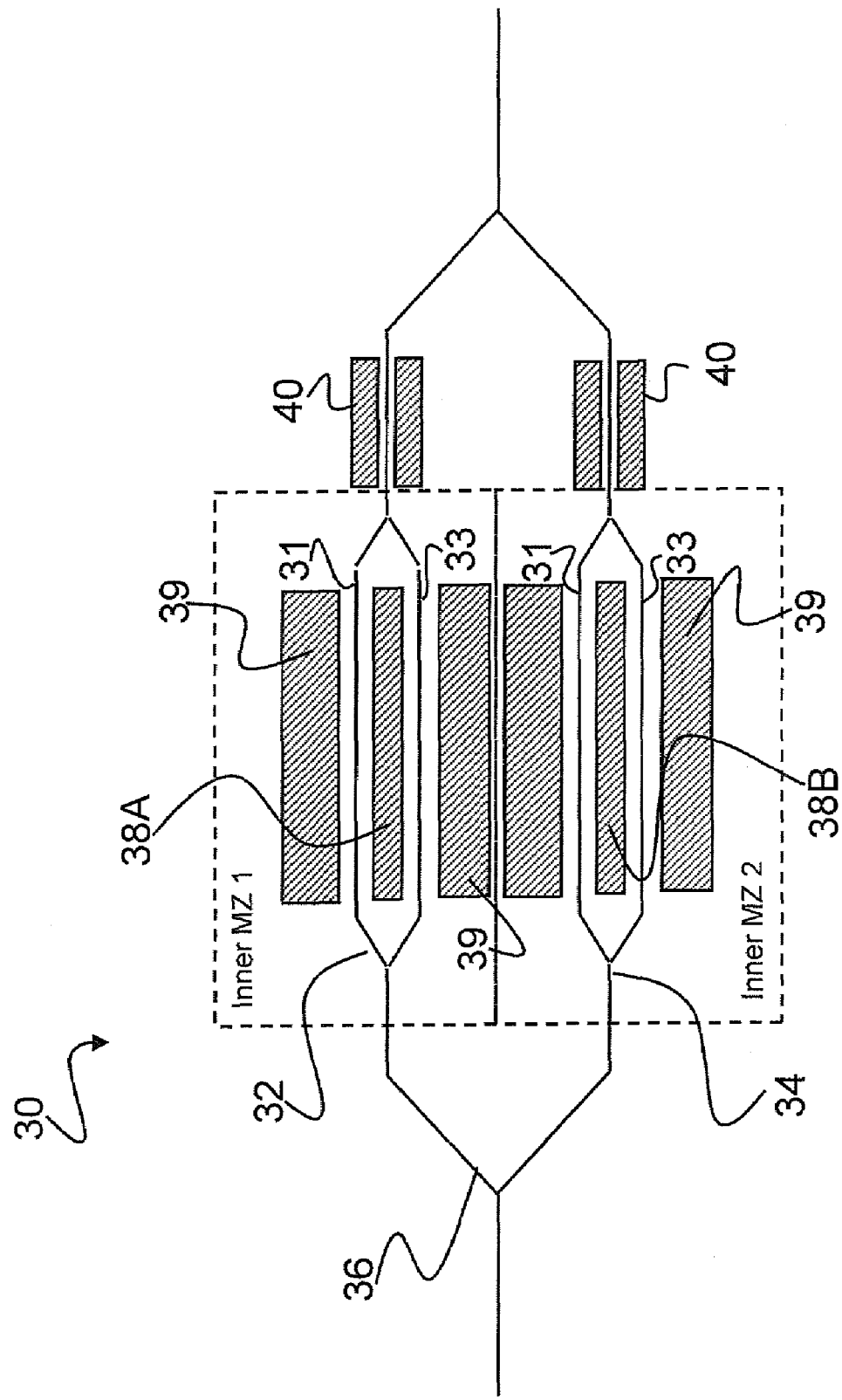
FIG. 3 is a schematic illustration of a prior art dual parallel MZ modulator.

The data for all graphs presented above was obtained through computer simulation using MathCad and a set of equations modeling modulator performance in both time and frequency domain. All simulations of chirp versus frequency are based on a single MZ geometry such as an inner MZ 32 of the modulator 30.

DETAILED DESCRIPTION OF THE PREFERRED EMBODIMENT

Embodiments of the present invention are shown in FIGS. 22-48 and additional equations at FIGS. 49-52. The designs are determined by considering the effect of RF loss in the electrode. The voltage along the electrode is given by $$V(f,L) = V_0 e^{-\alpha(f)L} \quad (3)$$

where $V_0$ is the voltage amplitude at the beginning of the electrode, a(f) is defined in Equation 2, and L is the total length of the MZ.

For the case where the optical and RF velocities are matched, the modulation imparted on a waveguide in a single section is given by $$F(f, L_s, L_f) = \frac{EO}{V_0 L} \int_{L_s}^{L_f} V_0 e^{-\alpha(f)z} dz \quad (4)$$

-continued $$= EO \frac{(e^{-\alpha(f)L_s} - e^{-\alpha(f)L_f})}{\alpha(f)L}$$

where EO is the relative modulation strength, and $L_s$ and $L_f$ are the length along the MZ at the start and end of the section, respectively.

For N sections, the resultant modulation is given by the sum $$F_{total}(f) = \sum_{i=0}^{N-1} EO \frac{(e^{-\alpha(f)L_{s,i}} - e^{-\alpha(f)L_{f,i}})}{\alpha(f)L} \quad (5)$$

where $L_{s,i}$ and $L_{f,i}$ are the length along the MZ at the start and end of the ith section, respectively. At DC (direct current 0 Hz) or low frequency, where f equals zero, Equation 5 can be rewritten as $$F_{total,DC}(f) = \sum_{i=0}^{N-1} EO \frac{L_i}{L} \quad (6)$$

Hence, at DC the modulation imparted on the waveguide only depends on the relative modulation strength and the length of the different MZ sections.

The net chirp for the MZ is given by $$\text{chirp}(f) = \frac{Re(F_{total,1}(f) - F_{total,2}(f))}{|F_{total,1}(f) + F_{total,2}(f)|} \quad (7)$$

where $F_{total,1}(f)$ and $F_{total,2}(f)$ are the net modulation responses for the two waveguides in the MZ, as a function of frequency. The frequency dependence arises from the fact that each waveguide samples the RF signal with different strength along the length of the RF electrode. Note that Equation 7 can be used for the cases where $F_{total,1}(f)$ and $F_{total,2}(f)$ are complex numbers. The modulation responses take on complex values for the cases where there is velocity mismatch between the RF and optical waves. For such cases, Equations 4 and 5 include an additional multiplicative factor to include the effects of velocity mismatch. If the effects of velocity mismatch are small enough to be neglected, then all the values in Equation 7 are real numbers and the equation can be rewritten as $$F_{total,1}(f) = F_{total,2}(f)\left[\frac{1 + \text{chirp}(f)}{1 - \text{chirp}(f)}\right] = F_{total,2}(f)F_c(f) \quad (8)$$

where $F_c(f)$ is defined as $$F_c(f) = \frac{1 + \text{chirp}(f)}{1 - \text{chirp}(f)} \quad (9)$$

Equations 5, 6, and 8 allows one to create a set of simultaneous equations, where the lengths of the MZ sections are the independent parameters to be determined.

For the two-section MZ, there is only one degree of freedom in the design, corresponding to the normalized length of either the first or second section. This degree of freedom can be used to set chirp equal to zero at one frequency. Combining Equations 5 and 8 for the two-section MZ results in the Equations 10 and 11, $$1 - 2e^{-\alpha(f)L_1} + e^{-\alpha(f)(L_1+L_2)} = 0 \quad (10)$$

$$L_1 + L_2 = L \quad (11)$$

Equation 10 arises from setting chirp equal to zero at frequency, $f_1$. Equation 11 simply states that the sum of section lengths must equal the total length, L. The set of two simultaneous equations can be solved numerically using commonly available software. The solved variables are the lengths of first and second sections.

The equations 12, 13 and 14 describe a three-section MZ having zero chirp at all frequencies.

$$1 - 2e^{-\alpha(f)L_1} + 2e^{-\alpha(f)(L_1+L_2)} - e^{-\alpha(f)(L_1+L_2+L_3)} = 0 \quad (12)$$

$$L_1 + L_3 = L_2 \quad (13)$$

$$L_1 + L_2 + L_3 = L \quad (14)$$

Equation 12 sets chirp equal to zero at some frequency greater than zero. Equation 13 sets the total length of domain inverted sections equal to the length of uninverted section, thereby setting chirp equal to zero at a frequency of zero (DC). Equation 14 sets the sum of section lengths to the total length, L. This set of three simultaneous equations can be solved numerically. Frequency, $f_1$ can be selected to be anywhere in the frequency range of interest, but is chosen to be 40 GHz for the examples described later. The solved variables are the lengths of the three different sections.

Equations 15, 16, 17 and 18 describe a four-section MZ having zero chirp at all frequencies.

$$1 - 2e^{-\alpha(f_1)L_1} + 2e^{-\alpha(f)(L_1+L_2)} - 2e^{-\alpha(f)(L_1+L_2+L_3)} + e^{-\alpha(f)(L_1+L_2+L_3+L_4)} = 0 \quad (15)$$

$$1 - 2e^{-\alpha(f_2)L_1} + 2e^{-\alpha(f_2)(L_1+L_2)} - 2e^{-\alpha(f_2)(L_1+L_2+L_3)} + e^{-\alpha(f_2)(L_1+L_2+L_3+L_4)} = 0 \quad (16)$$

$$L_1 + L_3 = L_2 + L_4 \quad (17)$$

$$L_1 + L_2 + L_3 + L_4 = L \quad (18)$$

Equations 15 and 16 sets chirp equal to zero at two frequencies greater than zero while Equation 17 sets the total length of domain inverted sections equal to the total length of uninverted sections, thereby setting chirp equal to zero at a DC. Equation 18 sets the sum of section lengths equal to the total length, L. This set of four simultaneous equations can be solved numerically, as before. Frequencies $f_1$ and $f_2$ can be selected to be anywhere in the frequency range of interest, but are chosen to be 20 GHz and 40 GHz for the examples described later. The frequency range of 0 to 40 GHz is the range of interest, hence $f_1$ and $f_2$ are chosen to be at mid-band and maximum, respectively. The solved variables are the lengths of the four different sections.

FIGS. 49 A-E show the equations 19-1 through 19-N for a zero-chirp MZ with N sections, where N is an odd number. Equations 19-1 through 19-(N−2) set chirp equal to zero at the N−2 frequencies, $f_1, f_2, \ldots f_{N-2}$, which are all greater than zero. The frequencies can be selected to be evenly spaced across the frequency range of interest, or unevenly spaced, to force residual chirp to be extremely low in some critical portion of the frequency band. Equation 19-(N−1) sets the total length of domain inverted sections equal to the total length of uninverted sections, thereby setting chirp equal to zero at a DC. Equation 19-N sets the sum of section lengths equal to the total length, L. The N equations are solved simultaneously. The solved variables are the lengths of the N sections.

FIGS. 50 A-E shows the equations 20-1 through 20-N for a zero-chirp MZ with N sections, where N is an even number. Similar to as shown before, Equations 20-1 through 20-(N−2) set chirp equal to zero at the N−2 frequencies, $f_1, f_2, \ldots f_{N-2}$, which are all greater than zero, while Equation 20-(N−1) sets the total length of domain inverted sections equal to the total length of uninverted sections, thereby setting chirp equal to zero at a DC. Equation 20-N sets the sum of section lengths equal to the total length, L. As before, the solved variables are the lengths of the N sections.

FIGS. 51 A-H show a more general set of equations for an MZ with N sections, where N is an odd number, and the desired chirp is specified at N−1 frequencies. The specified chirp can be non-zero for this more general set of equations. Equations 21-1 through 21-(N−2), FIGS. 51 A-C, set chirp equal to N−2 specified values at the N−2 frequencies, $f_1$, $f_2, \ldots f_{N-2}$, which are all frequencies greater than zero, while Equation 21-(N−1), FIG. 51 D, sets chirp to some specified value at DC. Equation 21-N, FIG. 51 E, sets the sum of section lengths equal to the total length, L. Equations 21-(N+1), 21-(N+2), and 21-(N+3), FIGS. 51 F-H, define the coefficients in the other equations, which depend on the selected value of chirp at a particular frequency. Parameters $EO_1$ and $EO_2$ are the relative modulation strength for a waveguide under the signal and ground electrodes, respectively.

Similar to FIGS. 51 A-H, FIGS. 52 A-H show a more general set of equations for an MZ with N sections, where N is an even number, and the desired chirp is specified at N−1 frequencies. Equations 22-1 through 22-(N−2), FIGS. 52 A-C, set chirp equal to N−2 specified values at the N−2 frequencies, $f_1, f_2, \ldots f_{N-2}$, which are all frequencies greater than zero, while Equation 22-(N−1), FIG. 52 D, sets chirp to some specified value at DC. Equation 22-N, FIG. 52 E, sets the sum of section lengths equal to the total length, L. As before, Equations 22-(N+1), 21 (N+2), and 21-(N+3) define the coefficients in the other equations, FIGS. 52 F-H. Parameters $EO_1$ and $EO_2$ are defined previously.

FIGS. 53 A-H show a more general function for the equations shown in FIG. 51 A-H to obtain an arbitrary chirp where N is an odd number of sections. Equation 53C expresses the expanded functions of the N−2 equations 21-1 through 21-(N−2). Equations 53 D-H are the same as in FIG. 51 defining the chirp, sum of the lengths and the equation coefficients of the other equations. FIGS. 53 A and B show equations that define the coefficients $F_{j,o}$ and $F_{j,i}$ shown in the equation in FIG. 53 C.

Similarly FIGS. 54 A-H show a more general function for the equations shown in FIG. 52 A-H to obtain an arbitrary chirp where N is an even number of sections. Equation 54C expresses the expanded functions of the N−2 equations 22-1 through 22-(N−2). Equations 54 D-H are the same as in FIG. 52 defining the chirp, sum of the lengths, and the equation coefficients of the other equations. FIGS. 54 A and B show equations that define the coefficients $F_{j,o}$ and $F_{j,i}$ shown in the equation in FIG. 54 C.

FIGS. 22-48, describe the invention. Two general features of the invention that are different from the prior art: (1) the lengths of the MZ sections are unequal to one another and (2) the layout of domain inversion sections is not exactly symmetric about the midpoint of the RF electrode. In general, for zero-chirp designs, as was the case for the prior art zero-chirp designs, the total length of domain inverted sections equals the total length of non-inverted sections.

The lengths of alternating domain sections are determined from the numerical optimization described earlier. The larger the number of sections, the larger the number of frequencies at which chirp can be set to zero. Note that the chirp can also be set to non-zero values at the N−1 frequencies, or the residual chirp can be made extremely low in a selected critical portion of the frequency band, and even N−1 different chirp values at N−1 different frequencies, though, it is typically difficult to find a solution to the equations for a set of chirp values that vary with frequency. In addition, as will be seen later, designs that target non-zero chirp values are more sensitive to variation in the intrinsic chirp (parameters $EO_1$ and $EO_2$) and the degree of velocity matching. The choice of chirp set to zero at all N−1 frequencies is the design of most interest.

Figure 22:
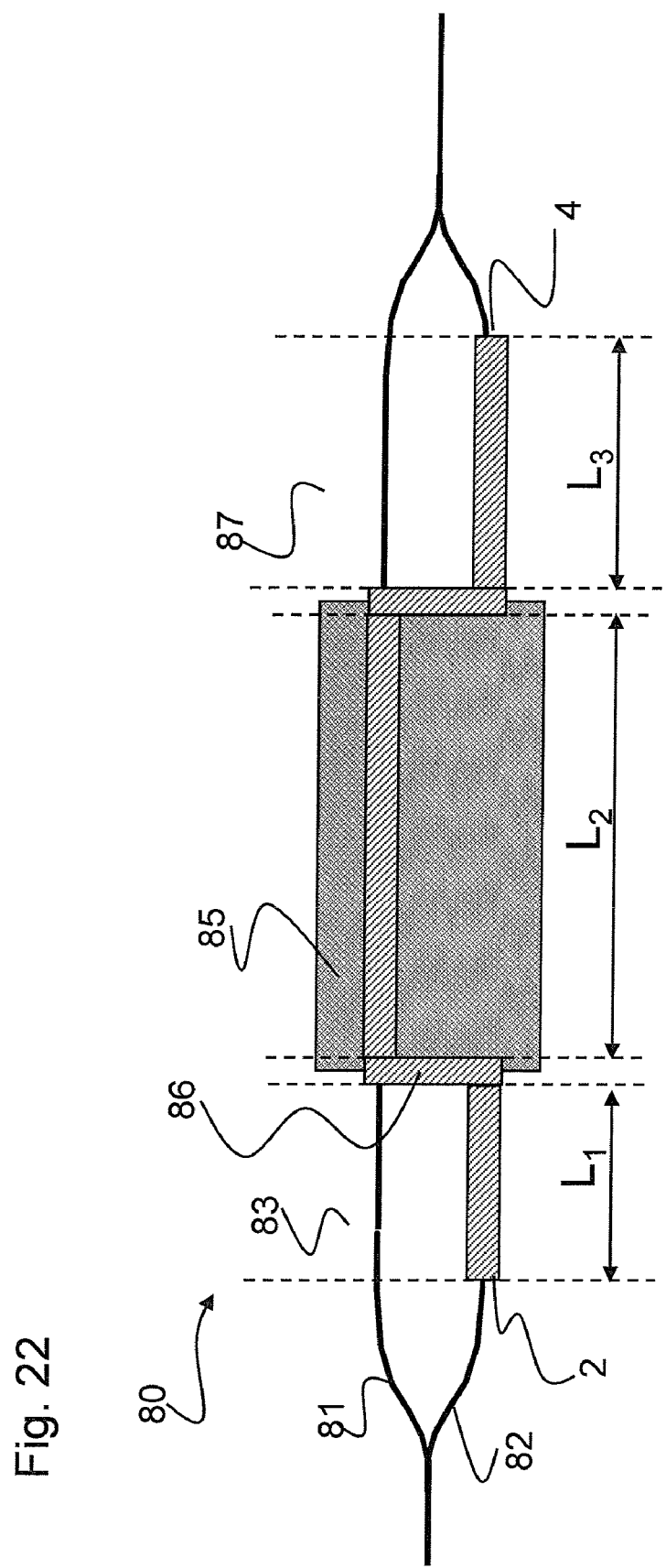
FIG. 22 is a schematic illustration of a three section MZ with unequal lengths and an asymmetric center section in accordance with the present invention.

FIG. 22 shows a three-section MZ 80 where the sections 83, 85, 87 all have unequal lengths. The normalized lengths $L_1$, $L_2$, and $L_3$ are 0.22, 0.50, and 0.28, respectively. The normalized length is the actual length divided by the total length of the active portion of the MZ, equal to $L_1+L_2+L_3$. The portions of the MZ where the electrode crosses over are neglected, as there is negligible modulation produced there. Note that the domain inverted section 85 is slightly off center compared to the prior art three-section MZ 70, where $L_1$, $L_2$, and $L_3$ are 0.25, 0.50, and 0.25, respectively. Also, the surrounding pair of sections $L_1$ and $L_3$ are arranged so that $L_3$ is longer than $L_1$. Sections 83 and 87 in FIG. 22 differ by 6% of total active MZ length. RF signal electrode 86 is disposed over waveguide 82 at RF input 2 in section $L_1$, it crosses to waveguide 81 in the domain inverted region 85 at $L_2$ and returns to waveguide 82 in section $L_3$ to couple to RF output 4.

Figure 9:
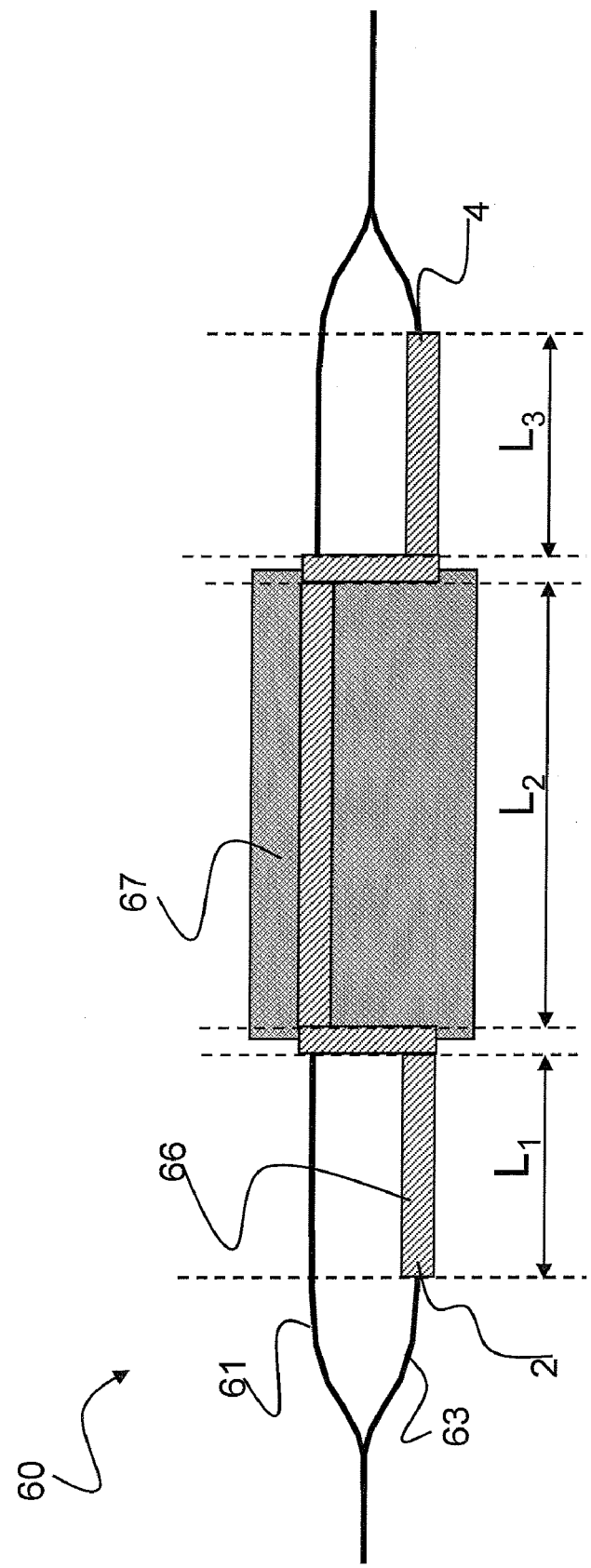
FIG. 9 is a schematic illustration of a prior art three section MZ.
Figure 10:
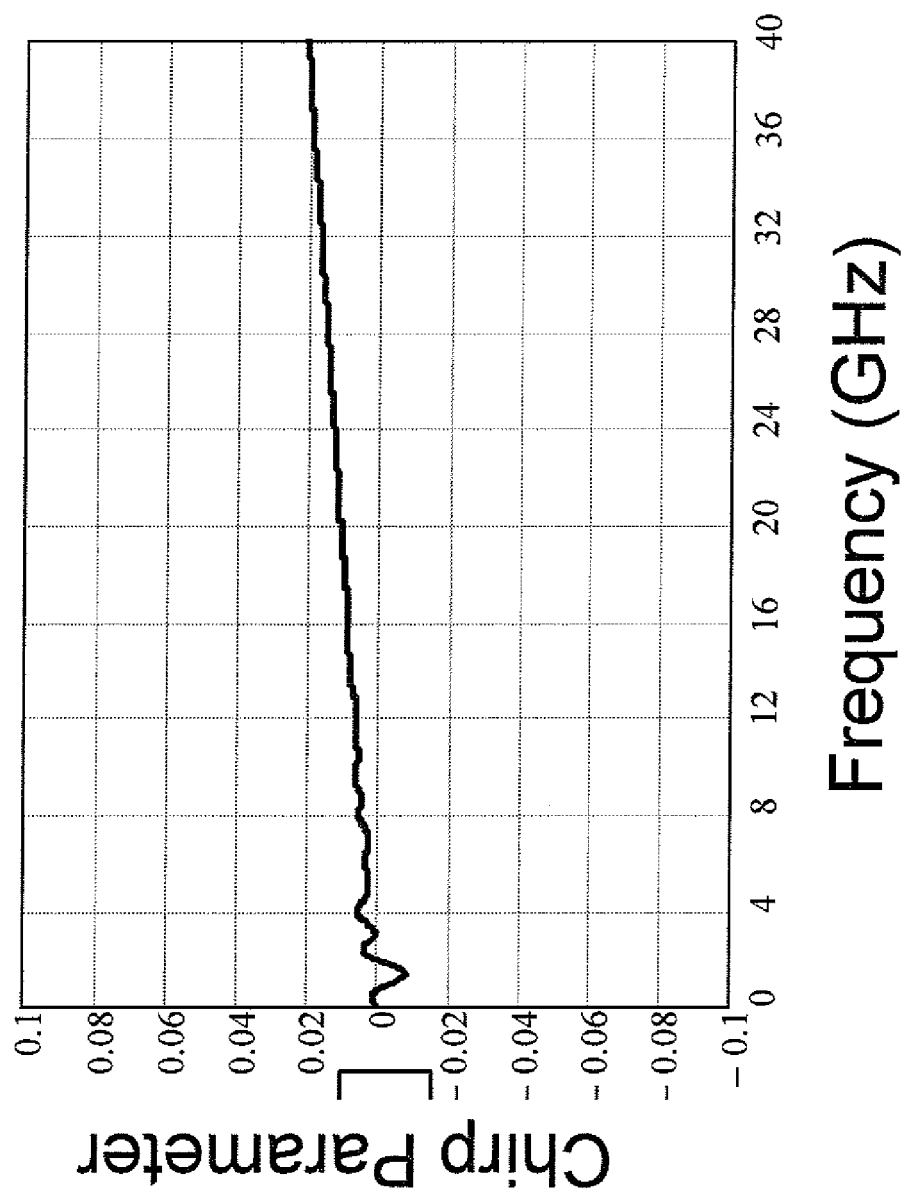
FIG. 10 is a graph of chirp versus frequency for the prior art MZ of FIG. 9.
Figure 11A:
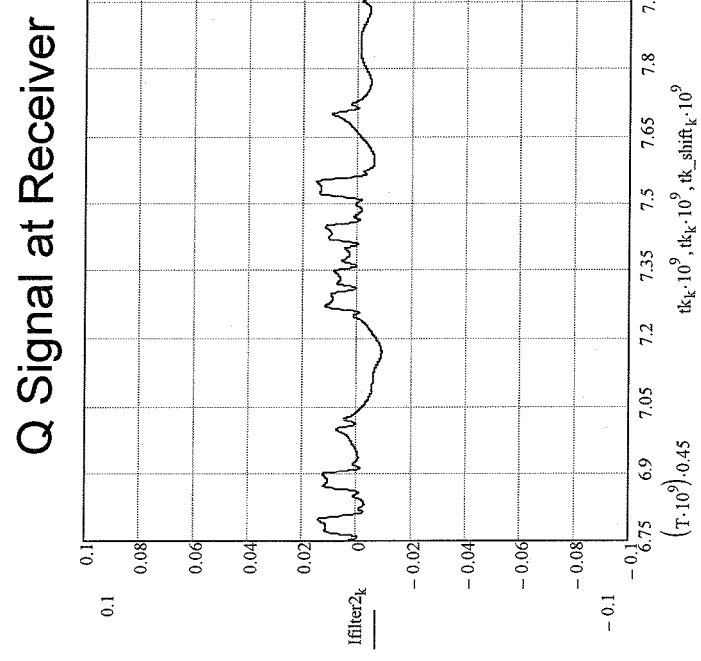
FIGS. 11A and B are graphs of signal crosstalk in a 40 Gb QPSK transmission system using DPMZ with the prior art MZ of FIG. 9.
Figure 11B:
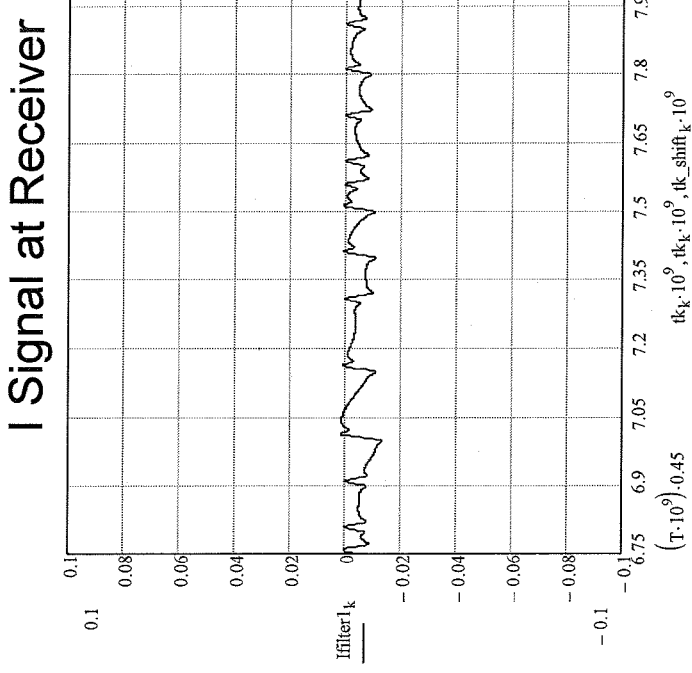
Figure 12:
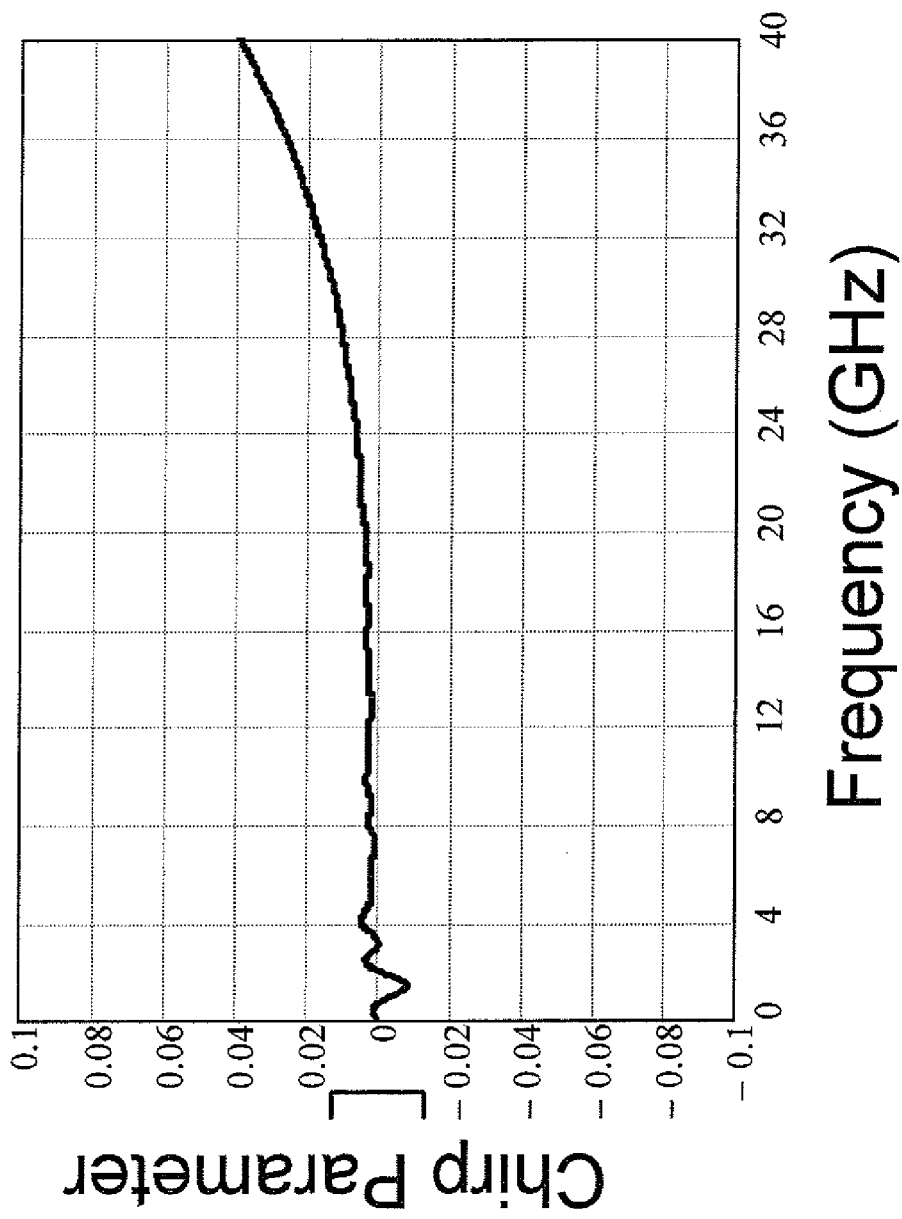
FIG. 12 is a graph of chirp versus frequency for the prior art MZ of FIG. 9 with a positive velocity walk-off.
Figure 13:
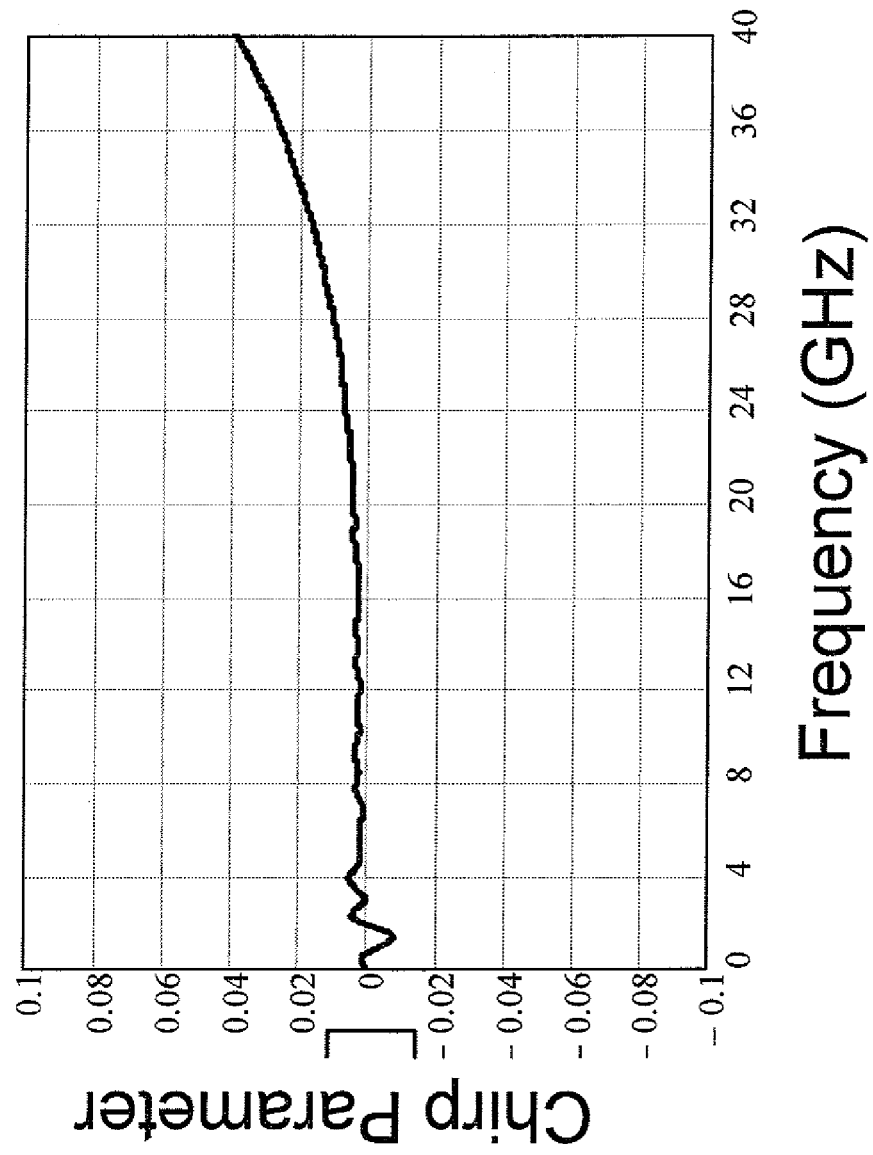
FIG. 13 is a graph of chirp versus frequency for the prior art MZ of FIG. 9 with a negative velocity walk-off.
Figure 15:
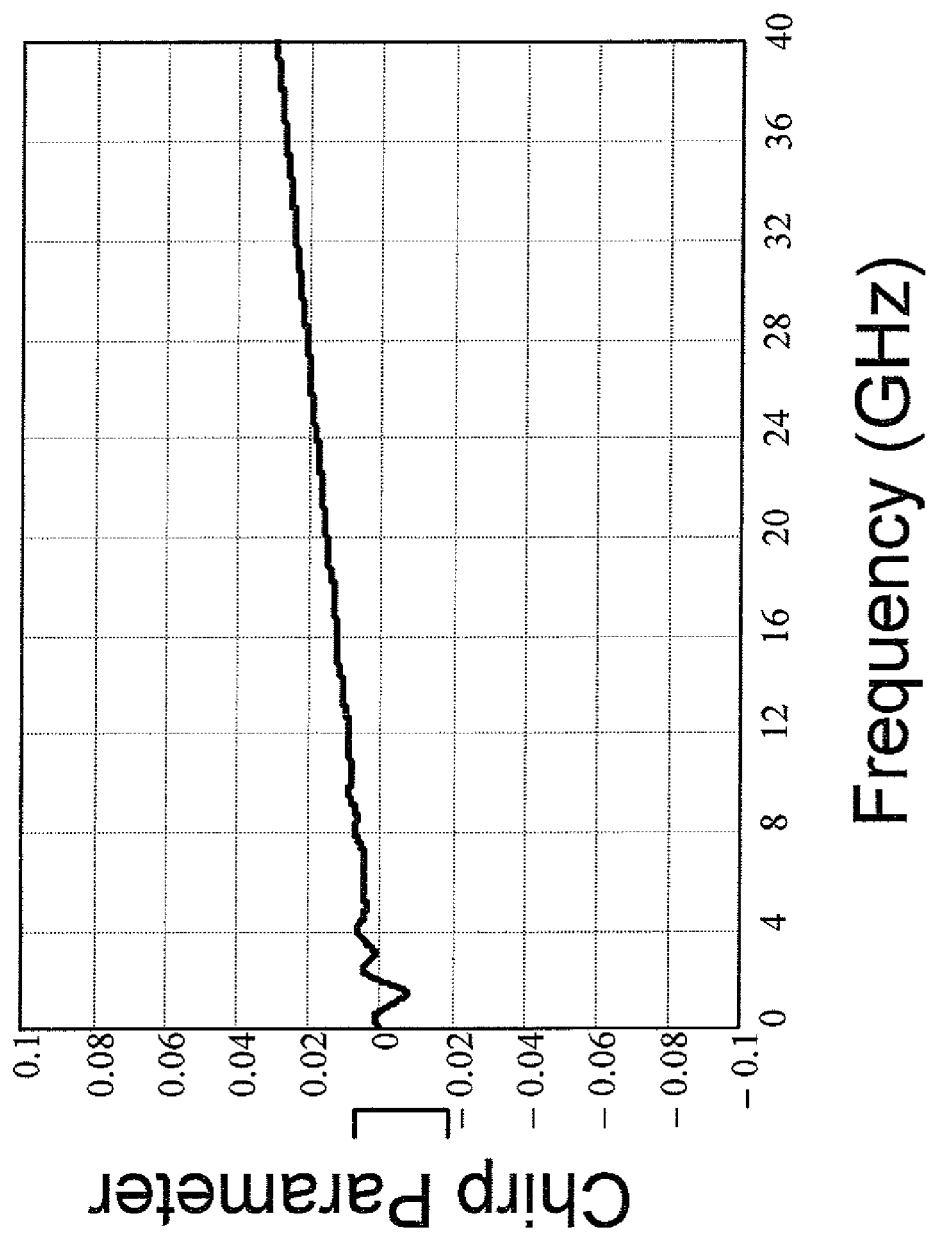
FIG. 15 is a graph of chirp versus frequency for the prior art MZ of FIG. 9 with a 20% higher RF loss.
Figure 16:
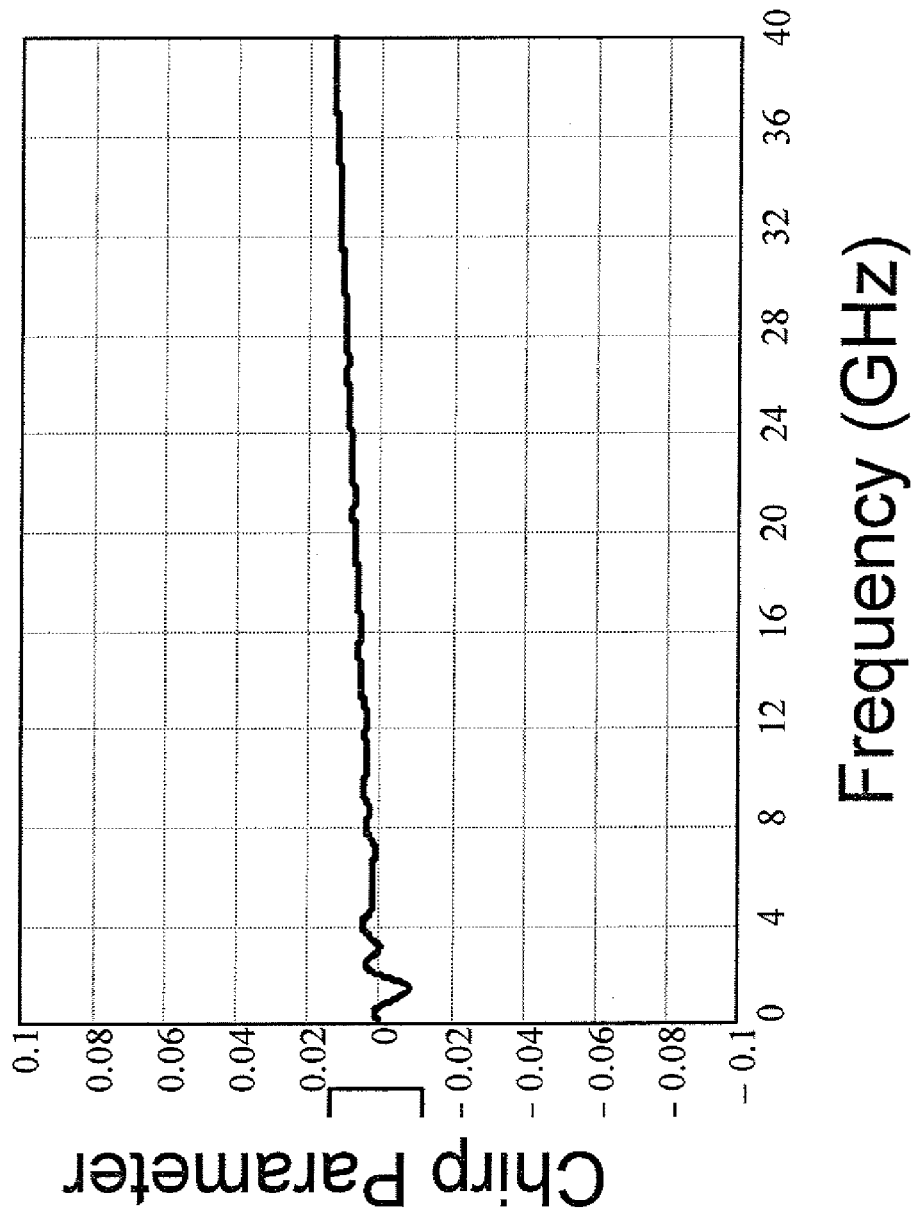
FIG. 16 is a graph of chirp versus frequency for the prior art MZ of FIG. 9 with a 20% lower RF loss.
Figure 17:
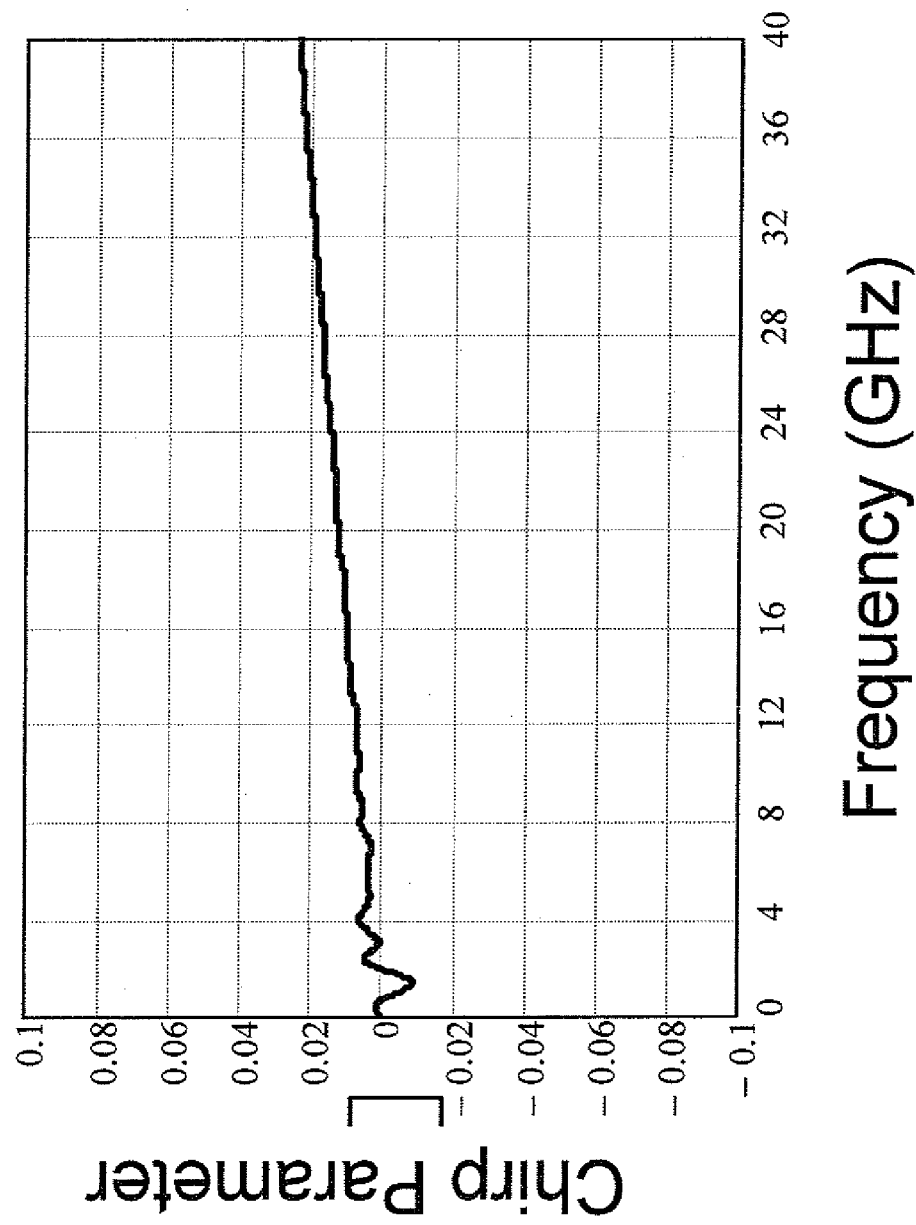
FIG. 17 is a graph of chirp versus frequency for the prior art MZ of FIG. 9 with a higher intrinsic chirp of 0.8.
Figure 18:
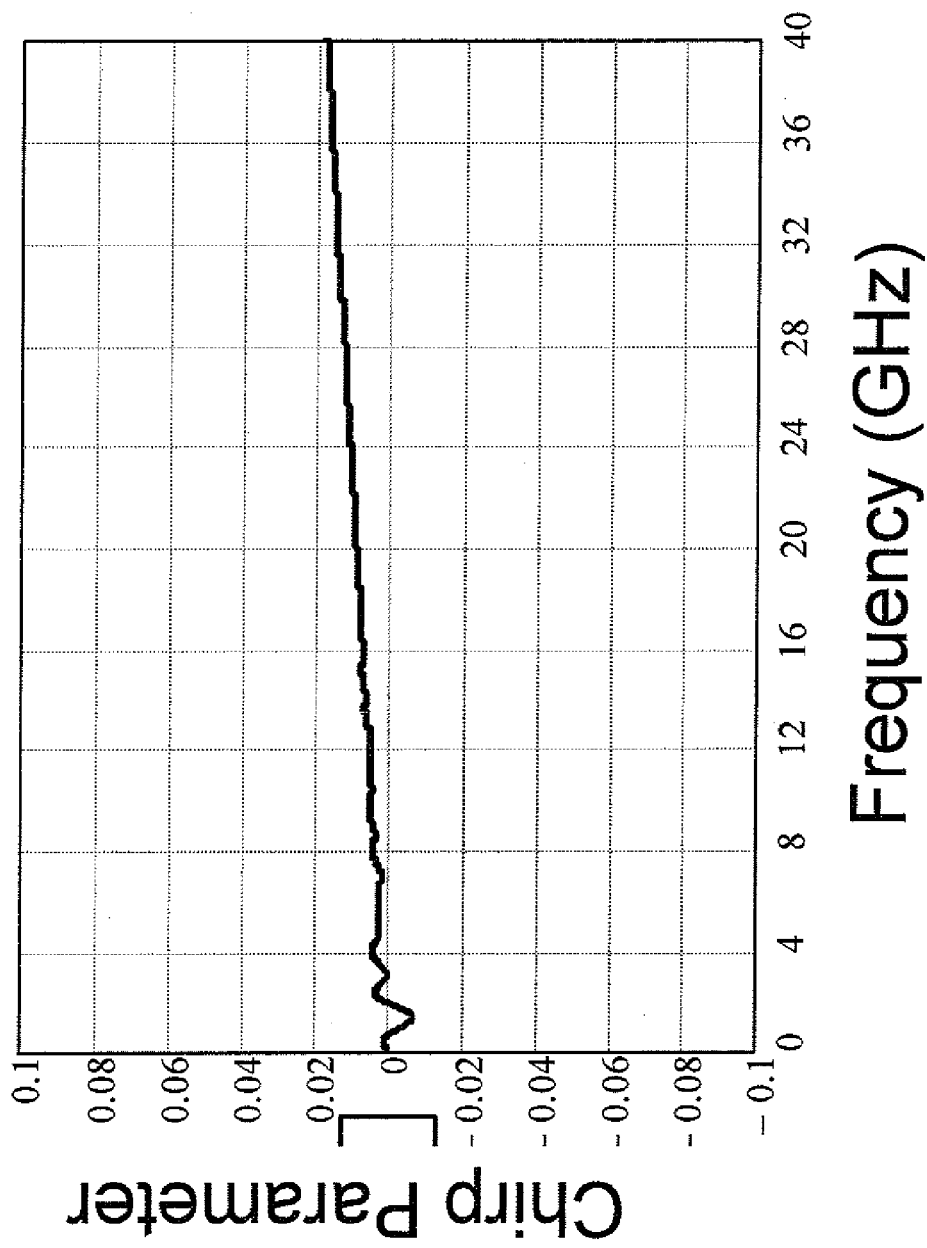
FIG. 18 is a graph of chirp versus frequency for the prior art MZ of FIG. 9 with a lower intrinsic chirp of 0.6.
Figure 19:
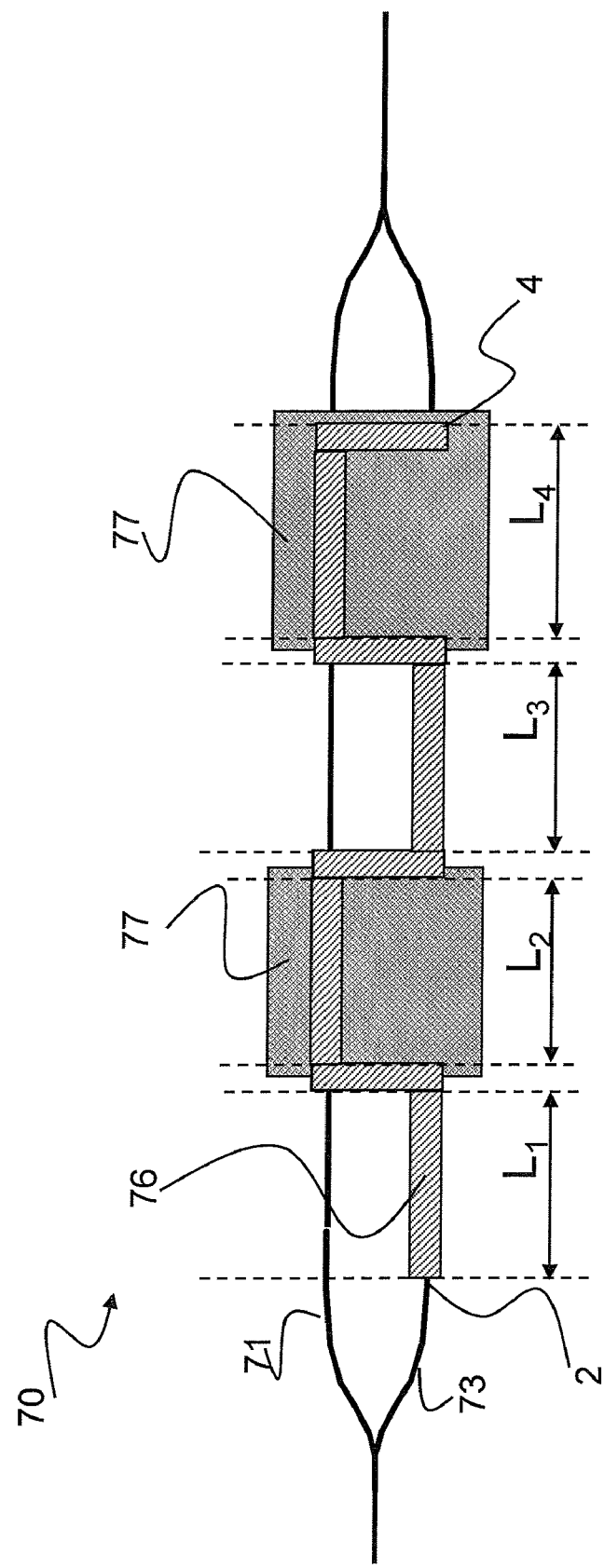
FIG. 19 is a schematic illustration of a prior art four section MZ having equal sections.
Figure 23:
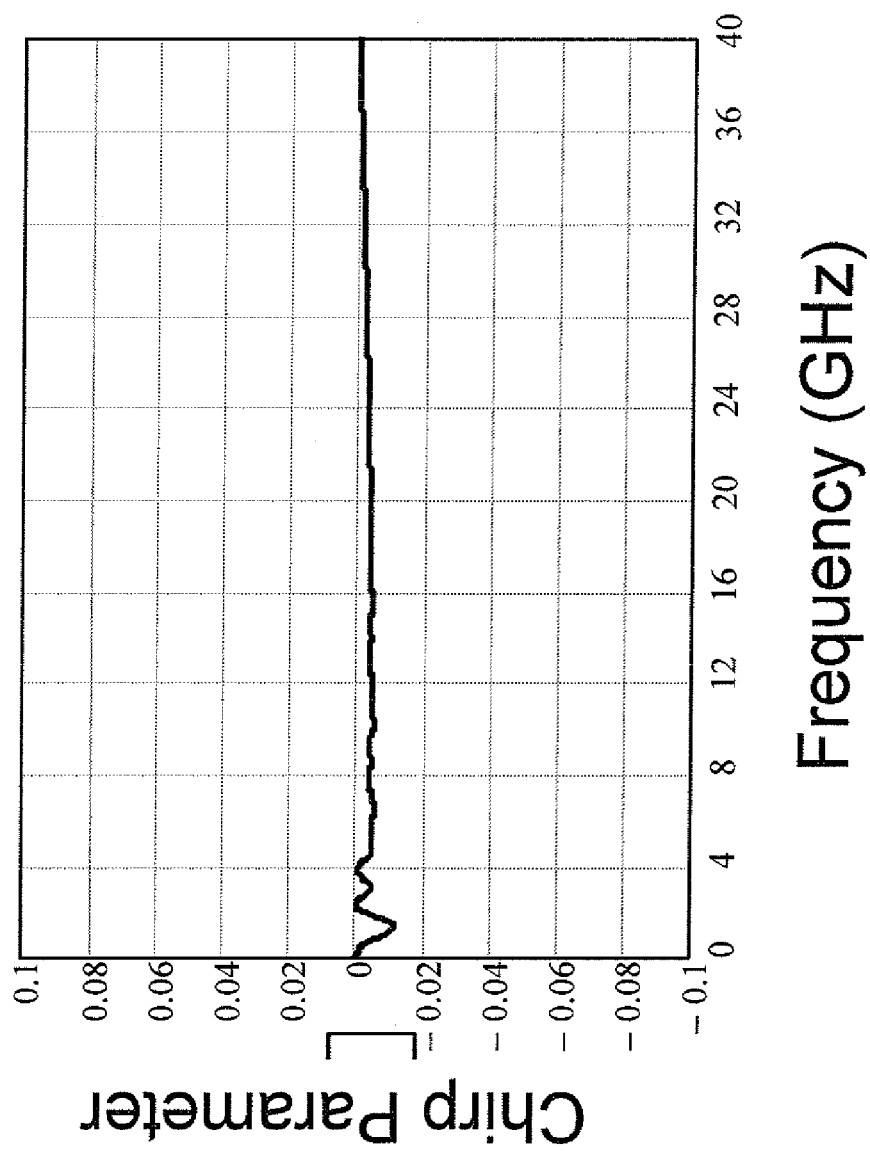
FIG. 23 is a graph of chirp versus frequency for the three section MZ of FIG. 22.
Figure 24:
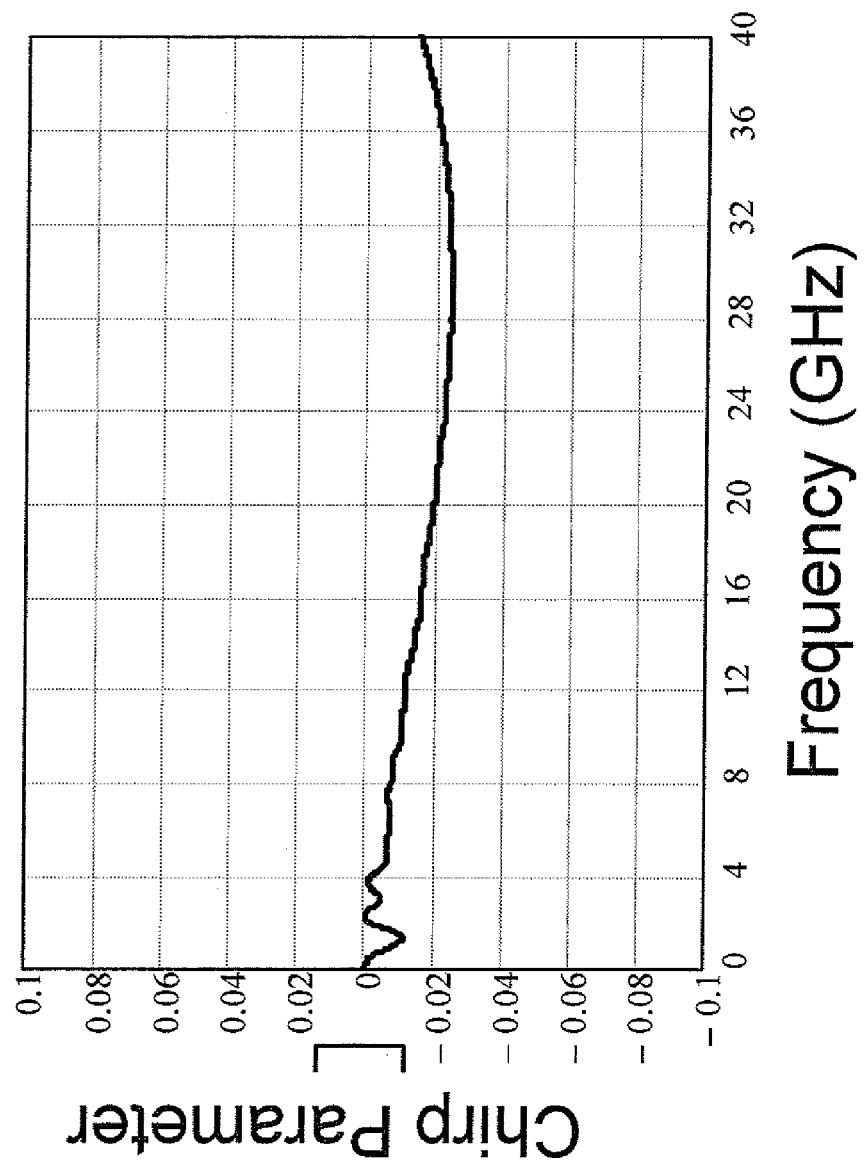
FIG. 24 is a graph of chirp versus frequency for the MZ of FIG. 22 with a positive velocity walk-off.
Figure 25:
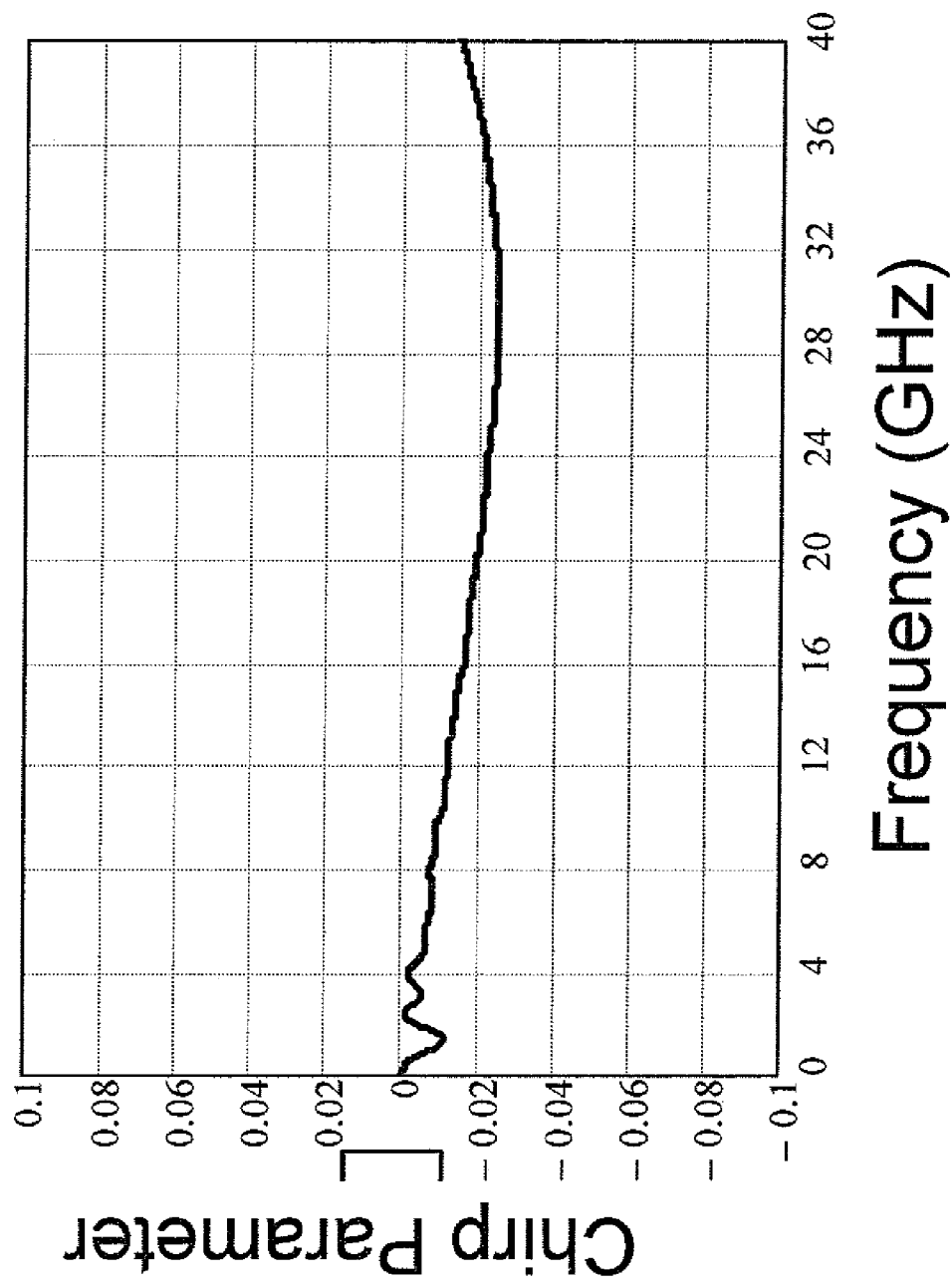
FIG. 25 is a graph of chirp versus frequency for the MZ of FIG. 22 with a negative velocity walk-off.
Figure 26:
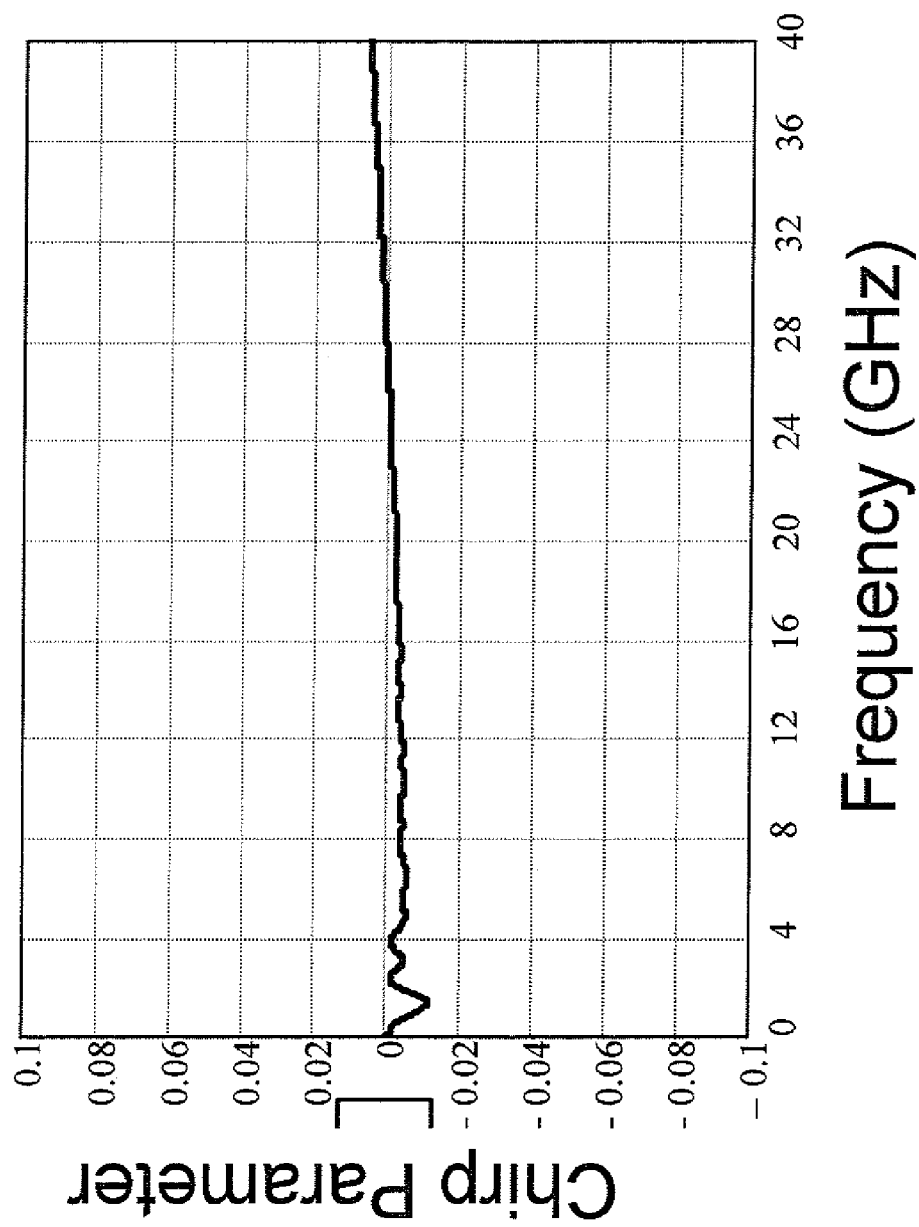
FIG. 26 is a graph of chirp versus frequency for the MZ of FIG. 22 with a 20% higher RF loss.
Figure 27:
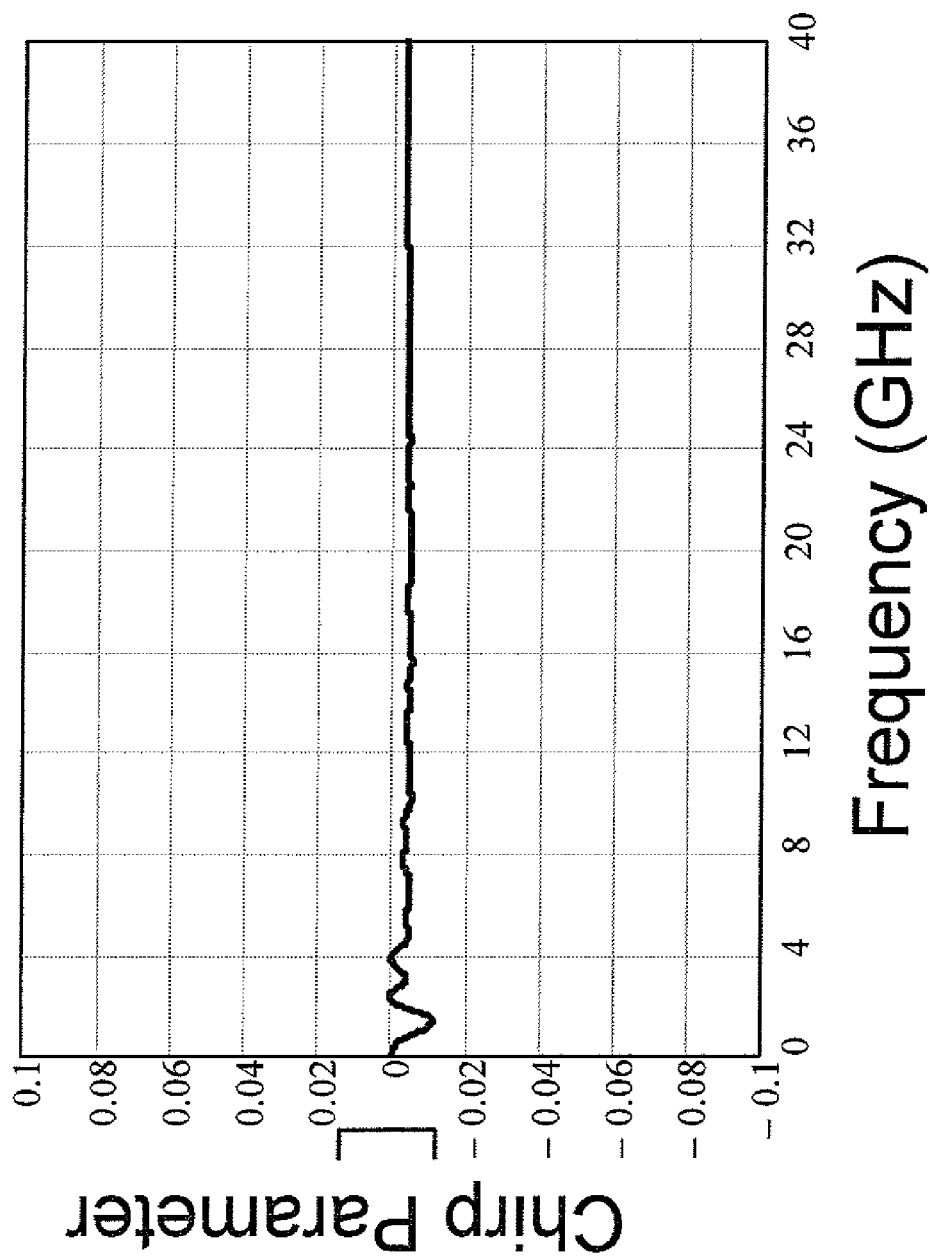
FIG. 27 is a graph of chirp versus frequency for the MZ of FIG. 22 with a 20% lower RF loss.
Figure 28:
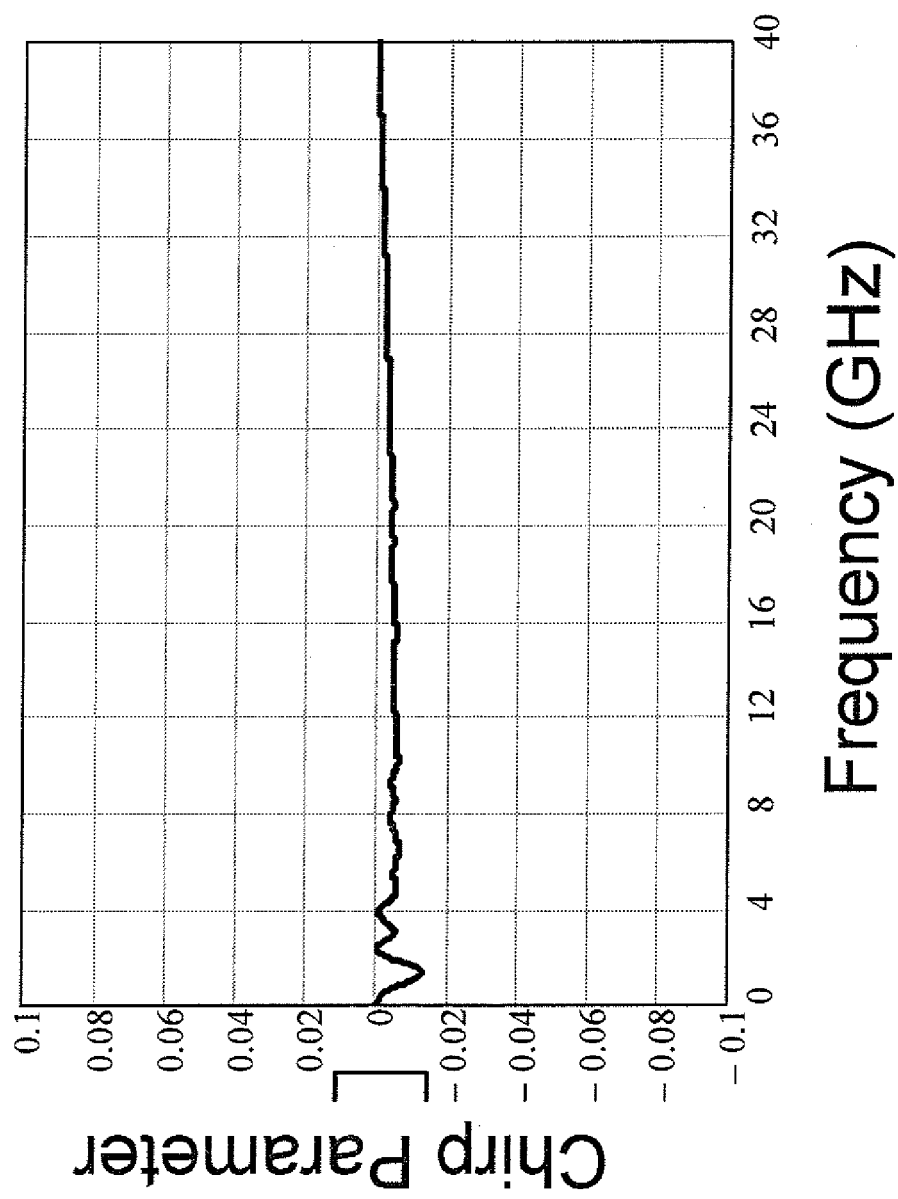
FIG. 28 is a graph of chirp versus frequency for the MZ of FIG. 22 with a higher intrinsic chirp of 0.8.
Figure 29:
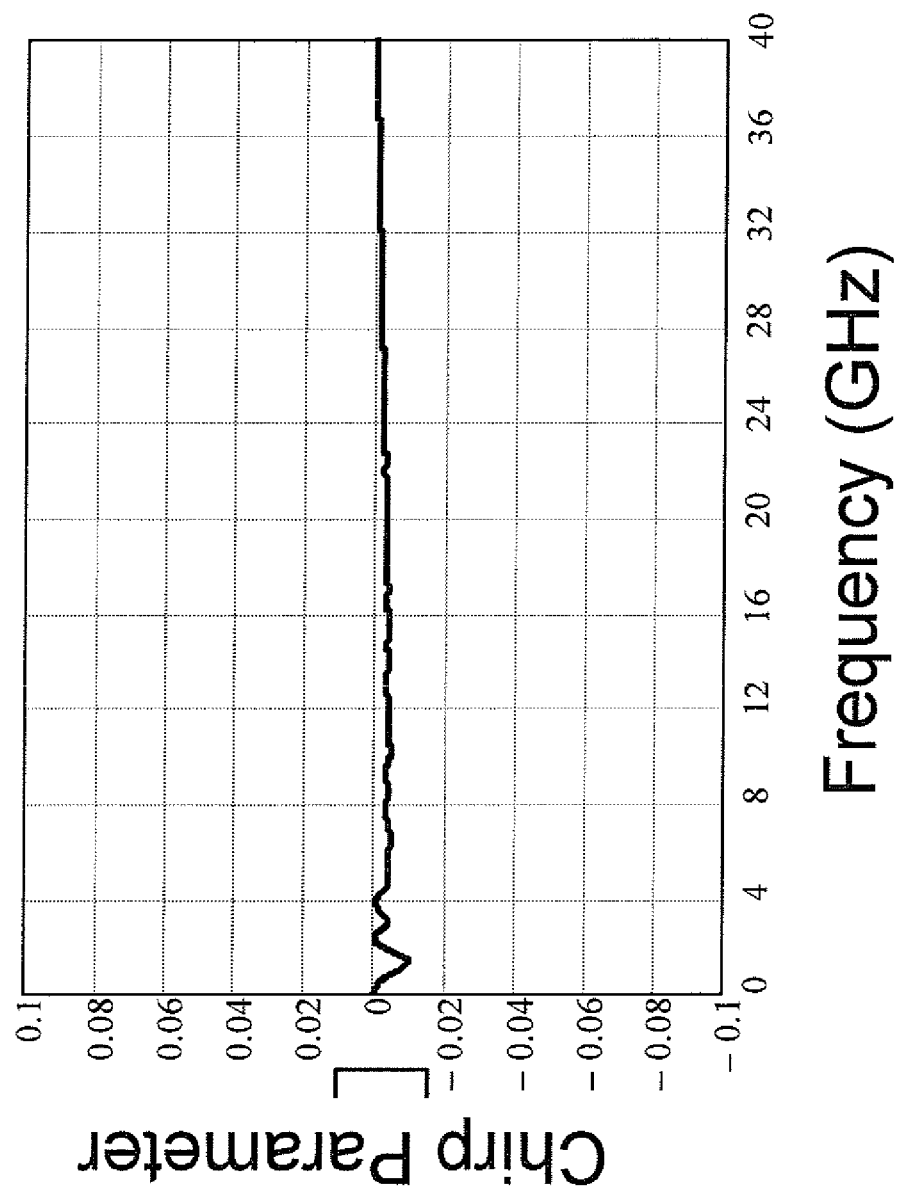
FIG. 29 is a graph of chirp versus frequency for the MZ of FIG. 22 with a lower intrinsic chirp of 0.6.

The chirp vs. frequency curve is plotted for the nominal choice of design parameters, as well as some cases where certain parameters are slightly different from nominal. For most cases, chirp is flatter vs. frequency for the MZ 80 shown in FIG. 22, compared to the prior art MZ 60 shown in FIG. 9. For example, FIG. 23 shows the chirp vs. frequency for the three-section MZ 80 shown in FIG. 22. Note that the 3% shift in the location of the domain inverted section improves the flatness of chirp vs. frequency as compared to FIG. 10. The magnitude of the chirp is 0.01 or less across the entire frequency range, whereas the prior art three-section MZ 60 with a centered domain-inverted section has chirp of 0.02 near 40 GHz. FIGS. 24 and 25 show chirp vs. frequency for the cases of + and − velocity walk-off. The magnitude of chirp remains near 0.02 or less over the entire frequency range, whereas chirp in the prior art MZ 60 approaches 0.04 at 40 GHz, as seen in FIGS. 12 and 13. However, the prior art MZ 60 does have lower chirp at frequencies below 20 GHz. FIGS. 26 and 27 show chirp vs. frequency for the cases of 20% higher and 20% lower RF loss, respectively. Note again that the magnitude of chirp is 0.01 or less across the entire frequency range, where as the chirp of the prior art MZ 60 approaches 0.03 at 40 GHz for the case of 20% higher RF loss, as seen in FIG. 15. FIGS. 28 and 29 show chirp vs. frequency for the cases of different intrinsic chirp (0.8 and 0.6, respectively). The magnitude of chirp is less than 0.01 across the frequency range, whereas the chirp of the prior art MZ 60 is close to 0.02 at 40 GHz, as seen in FIGS. 17 and 18.

Figure 14B:
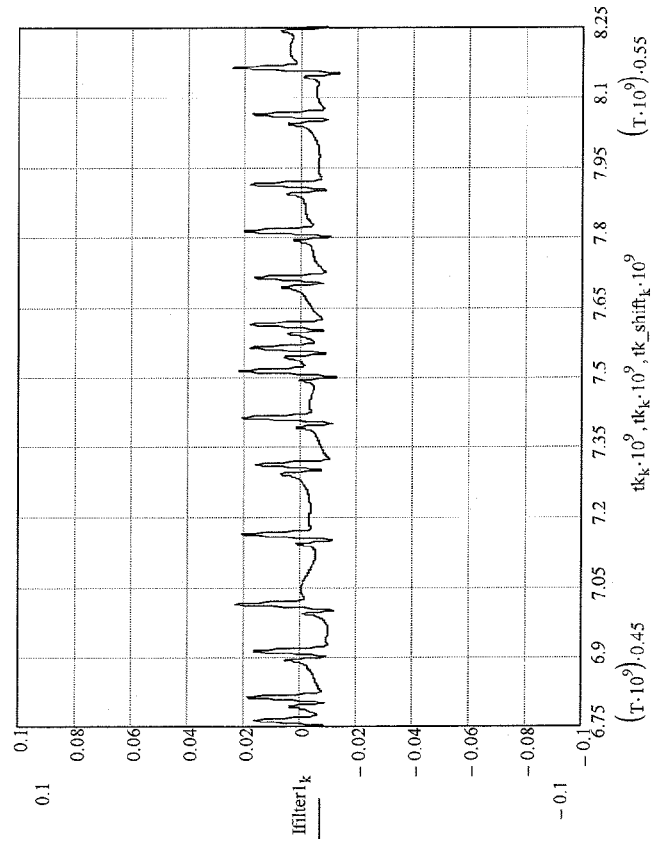
FIGS. 14A and B are graphs of signal crosstalk in a 40 Gb QPSK transmission system using DPMZ with the prior art MZ of FIG. 5 with a positive velocity walk-off.
Figure 14A:
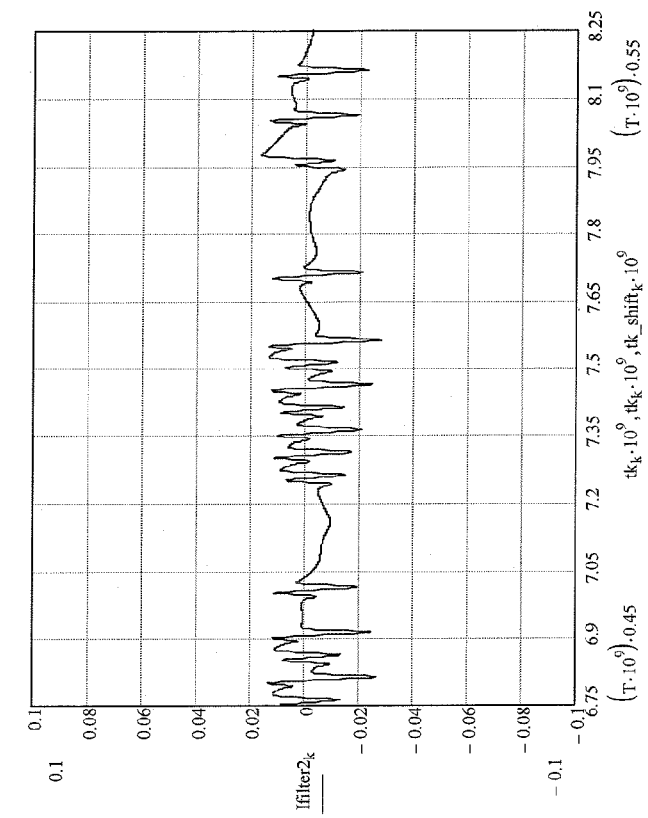
Figure 30B:
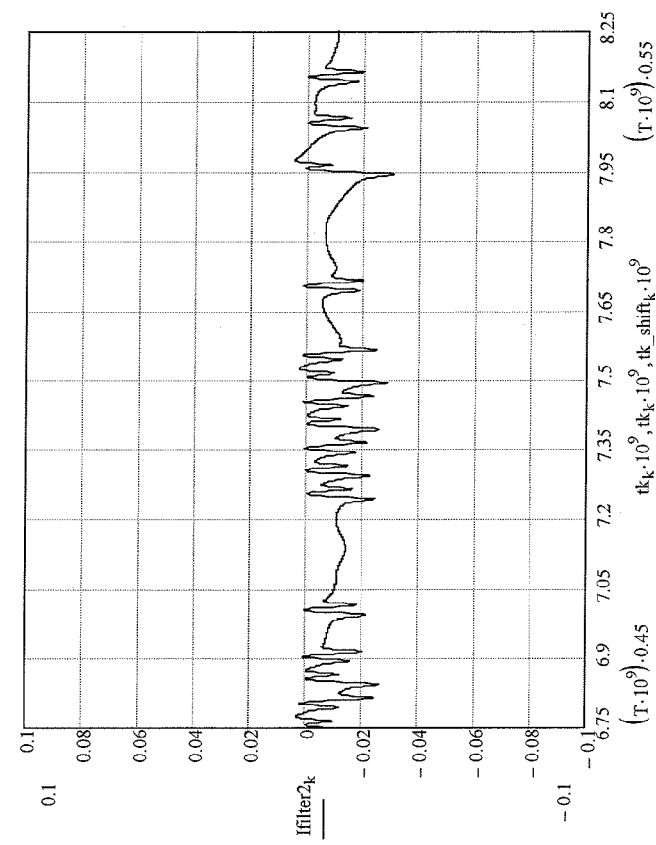
FIGS. 30A and B are graphs of the I signal and Q signal crosstalk in a 40 Gb QPSK transmission system using DPMZ with the MZ of FIG. 22 and a positive velocity walk-off.
Figure 30A:
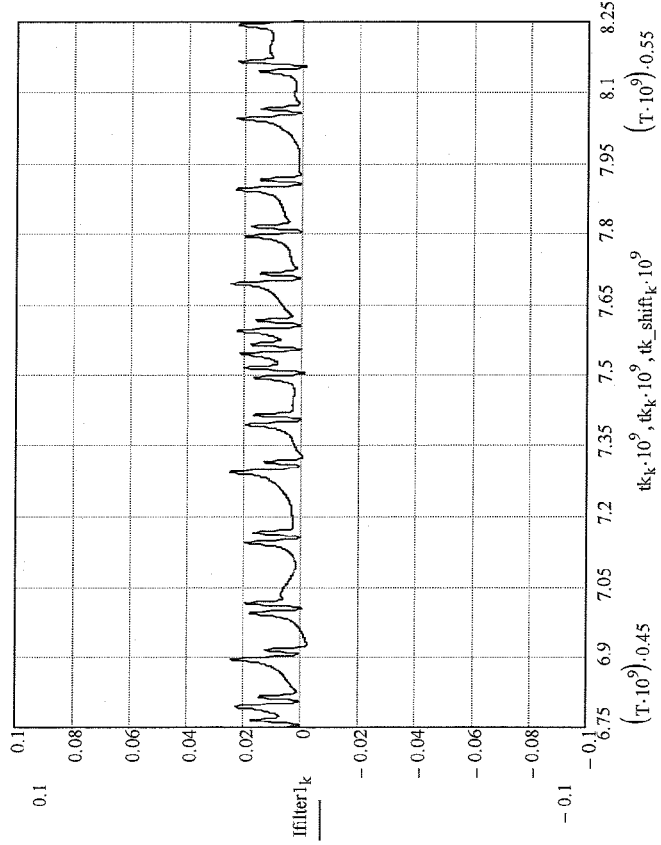

FIGS. 30A and B shows the simulated crosstalk in the received I and Q signals for the three-section MZ 80 shown in FIG. 22. Note that the magnitude of crosstalk is about 0.03 or less, a level which is comparable to the crosstalk for the prior art three-section MZ 60 as shown in FIG. 14.

Figure 31:
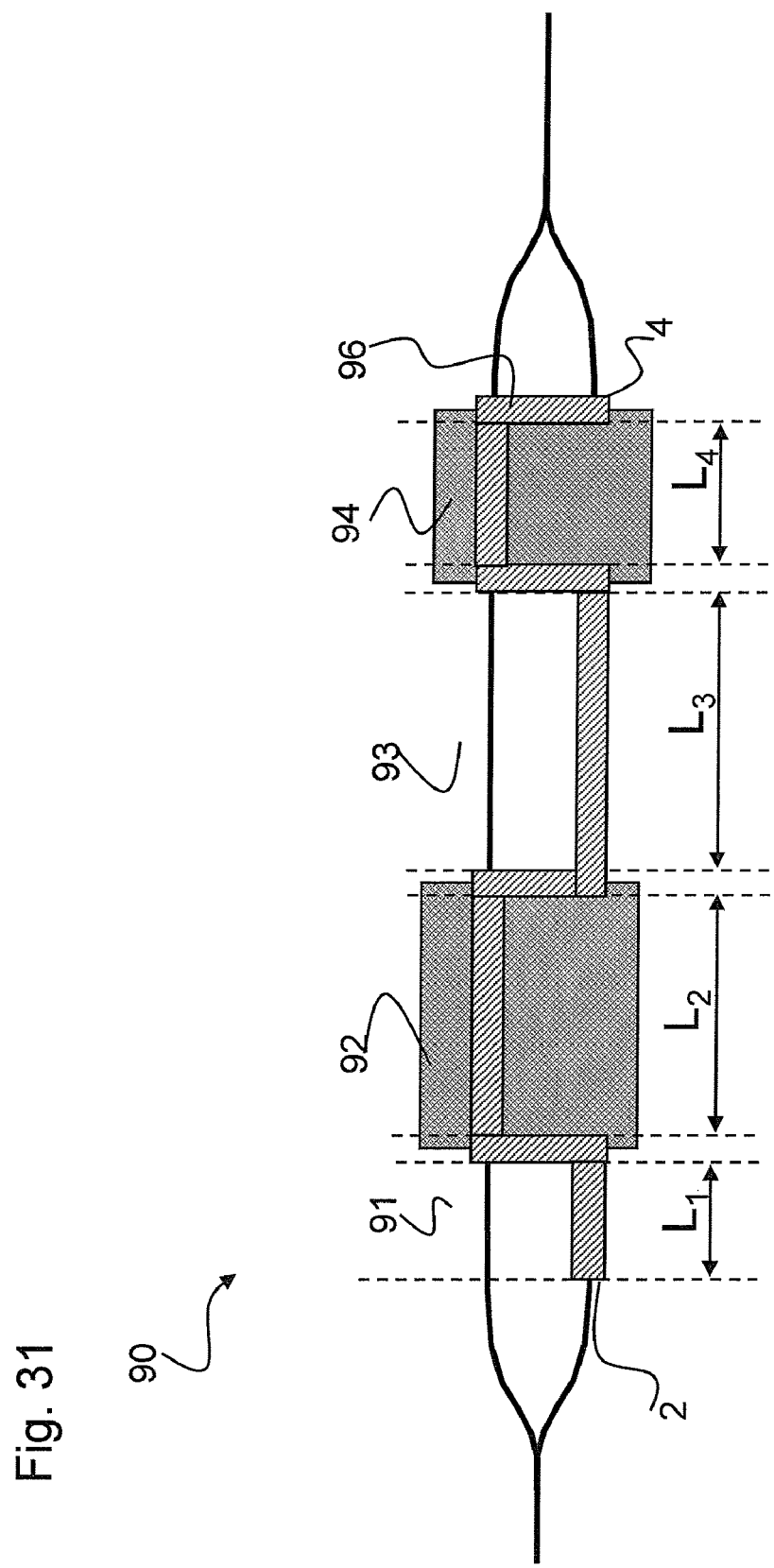
FIG. 31 is a schematic illustration of a four section MZ having unequal section lengths and asymmetric center sections in accordance with the present invention.
Figure 32:
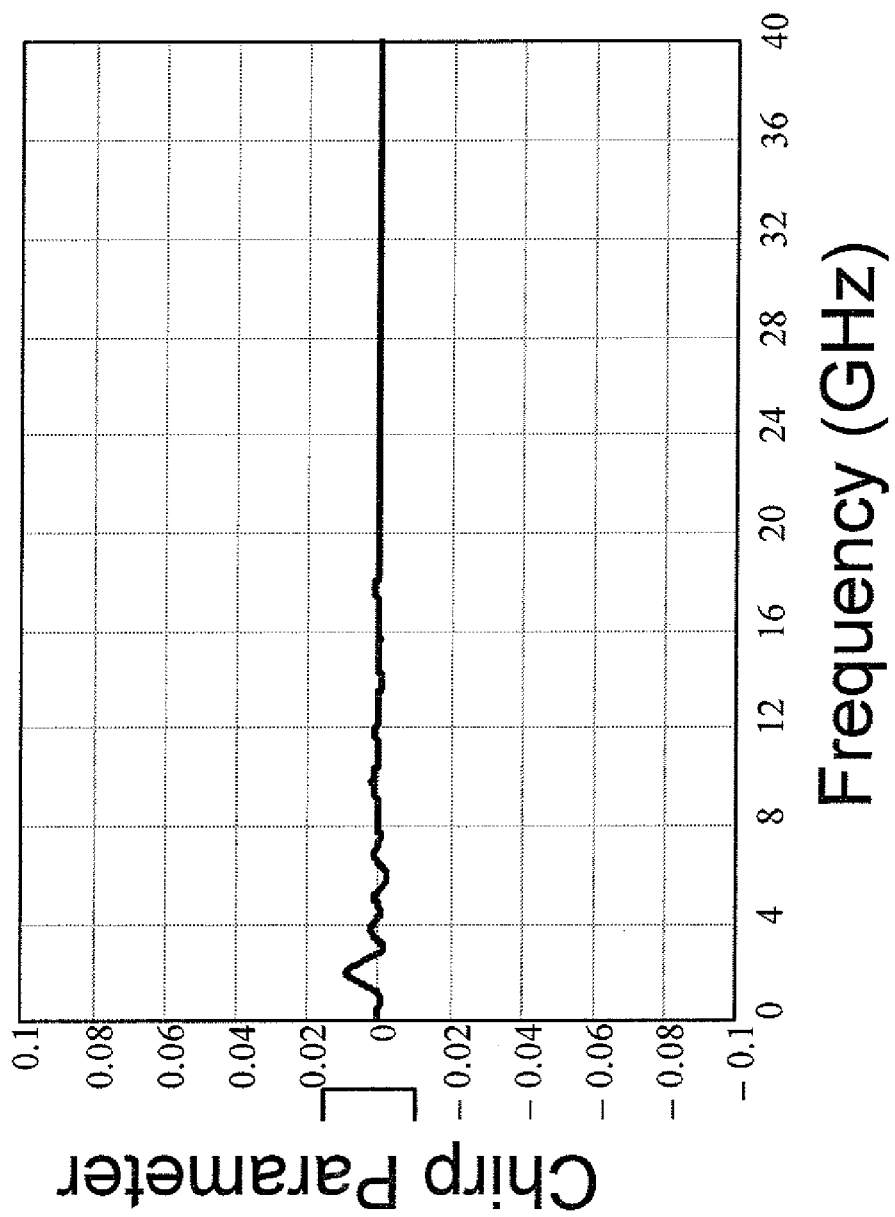
FIG. 32 is a graph of chirp versus frequency for the four section MZ of FIG. 31.

FIG. 31 shows a four-section MZ 90 with unequal lengths. The normalized lengths $L_1$, $L_2$, $L_3$, and $L_4$, corresponding to sections 91, 92, 93, 94 of the MZ 90 are 0.130, 0.335, 0.370, and 0.165, respectively. The lengths for sections 91 and 94 and the lengths for sections 92 and 93 differ by 3.5% of total length, $L_1+L_2+L_3+L_4$. FIG. 32 shows chirp vs. frequency for the four-section MZ 90 with unequal lengths. Chirp is set to zero at DC, 20 GHz, and 40 GHz. Note that the curve is very flat. Chirp is 0.01 or less over the entire frequency range.

Figure 20:
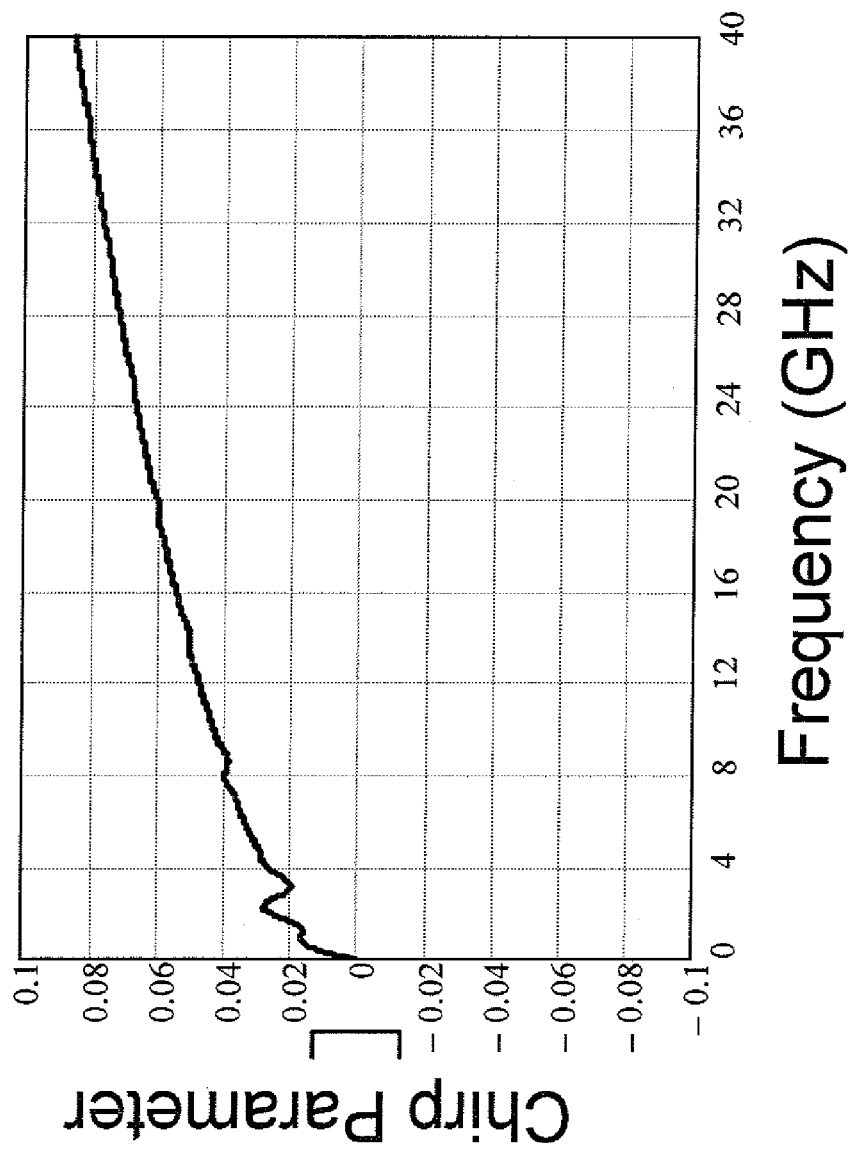
FIG. 20 is a graph of chirp versus frequency for the prior art MZ of FIG. 19.
Figure 21B:
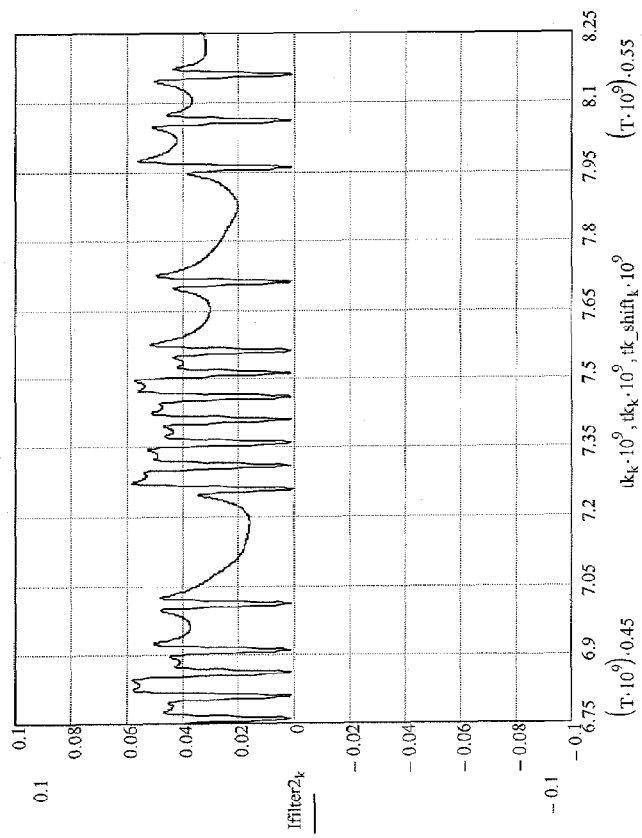
FIGS. 21A and B are graphs of signal crosstalk in the I signal and the Q signal in a 40 Gb QPSK transmission system using DPMZ with the prior art MZ of FIG. 19.
Figure 21A:
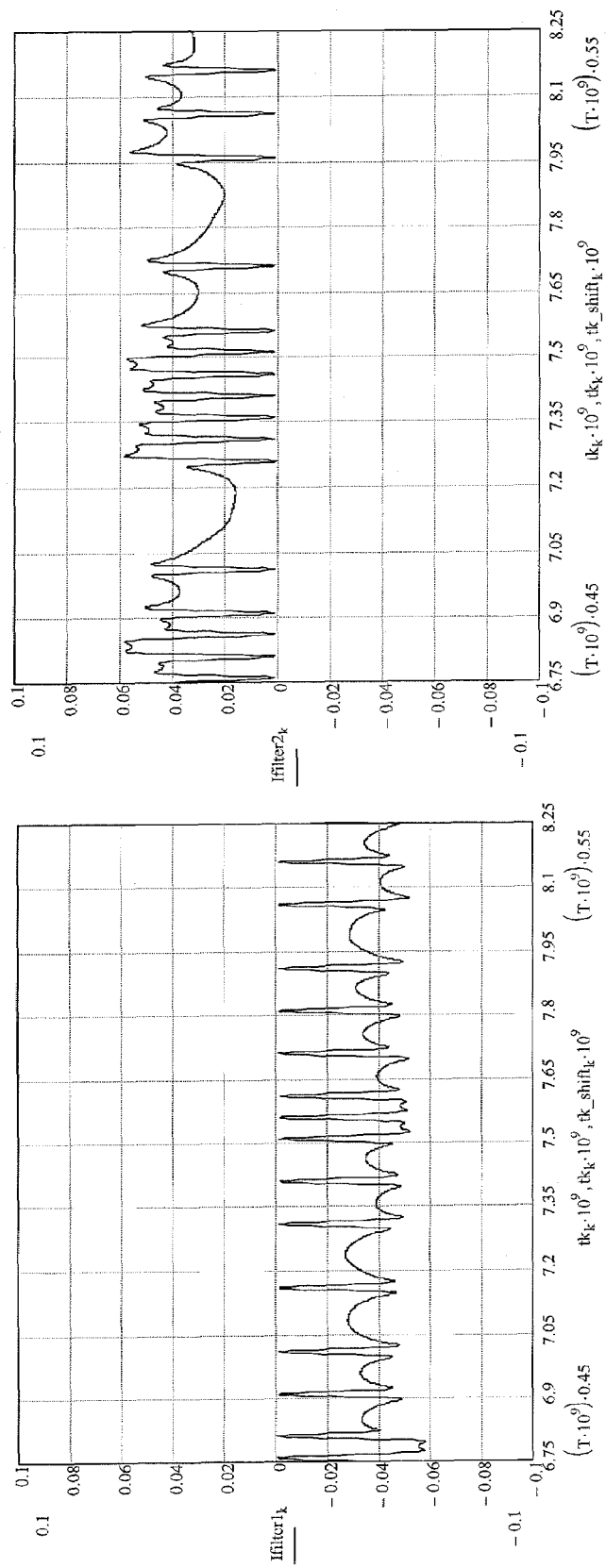
Figure 33:
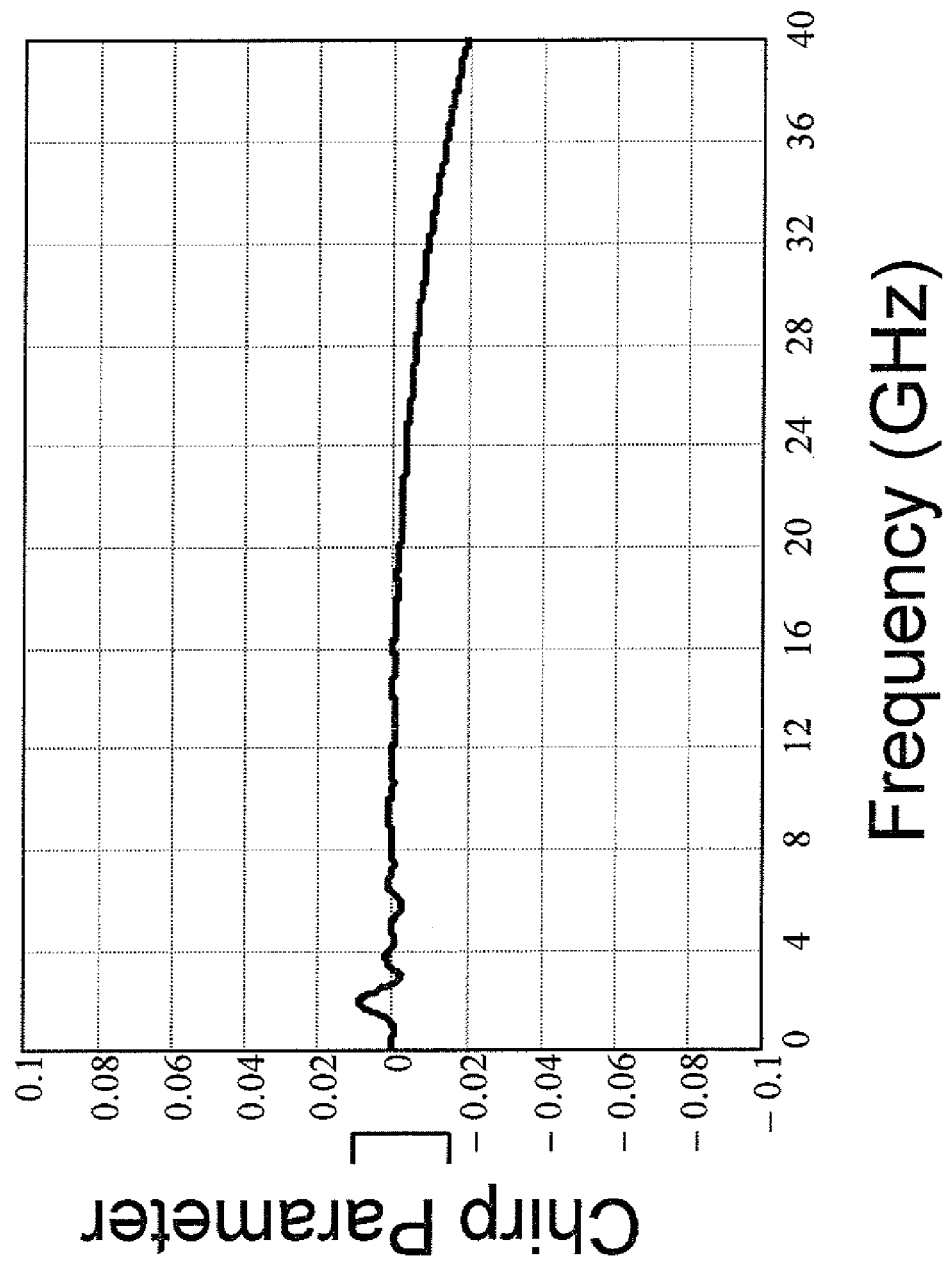
FIG. 33 is a graph of chirp versus frequency for the MZ of FIG. 31 with a positive velocity walk-off.
Figure 34:
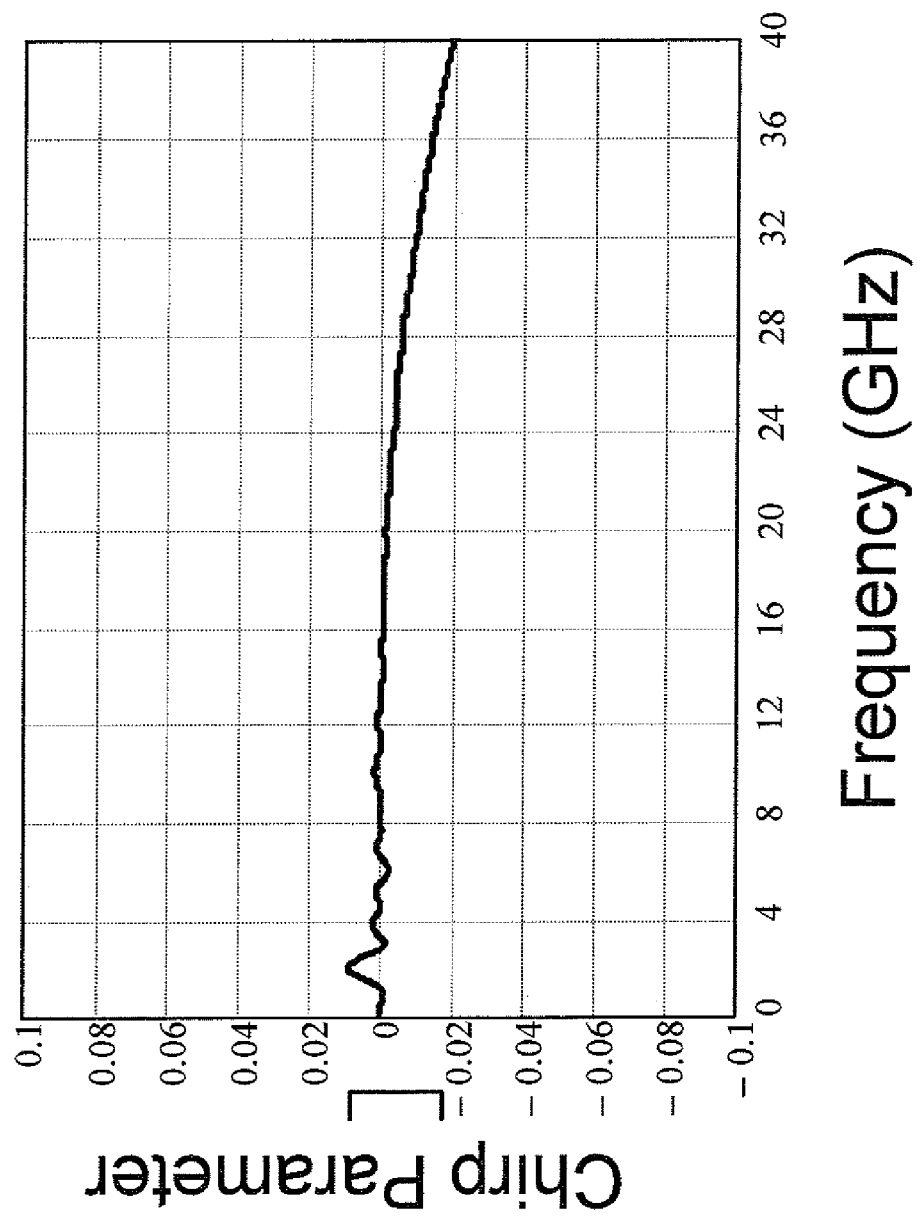
FIG. 34 is a graph of chirp versus frequency for the MZ of FIG. 31 with a negative velocity walk-off.
Figure 35:
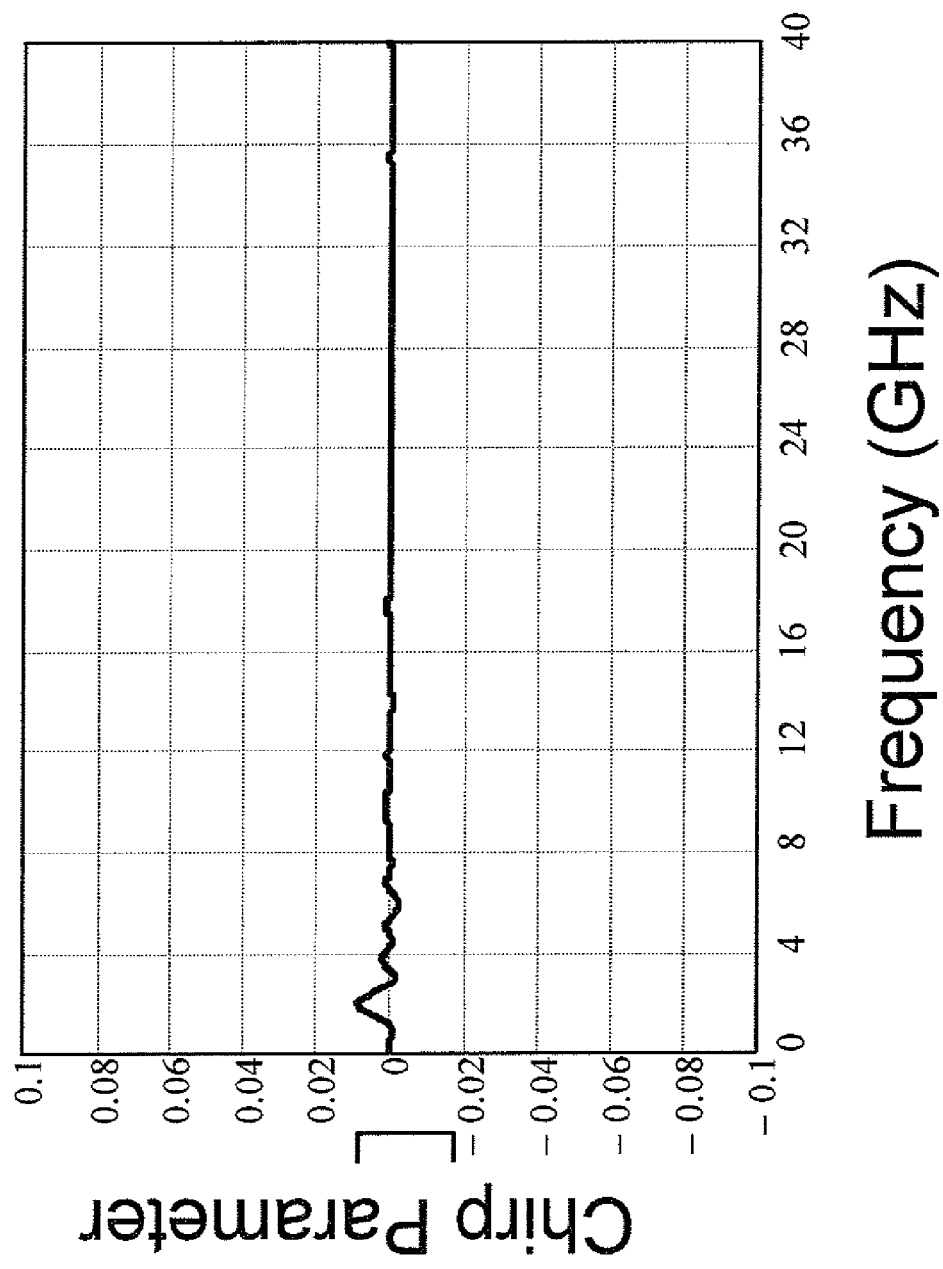
FIG. 35 is a graph of chirp versus frequency for the MZ of FIG. 31 with a 20% higher RF loss.
Figure 36:
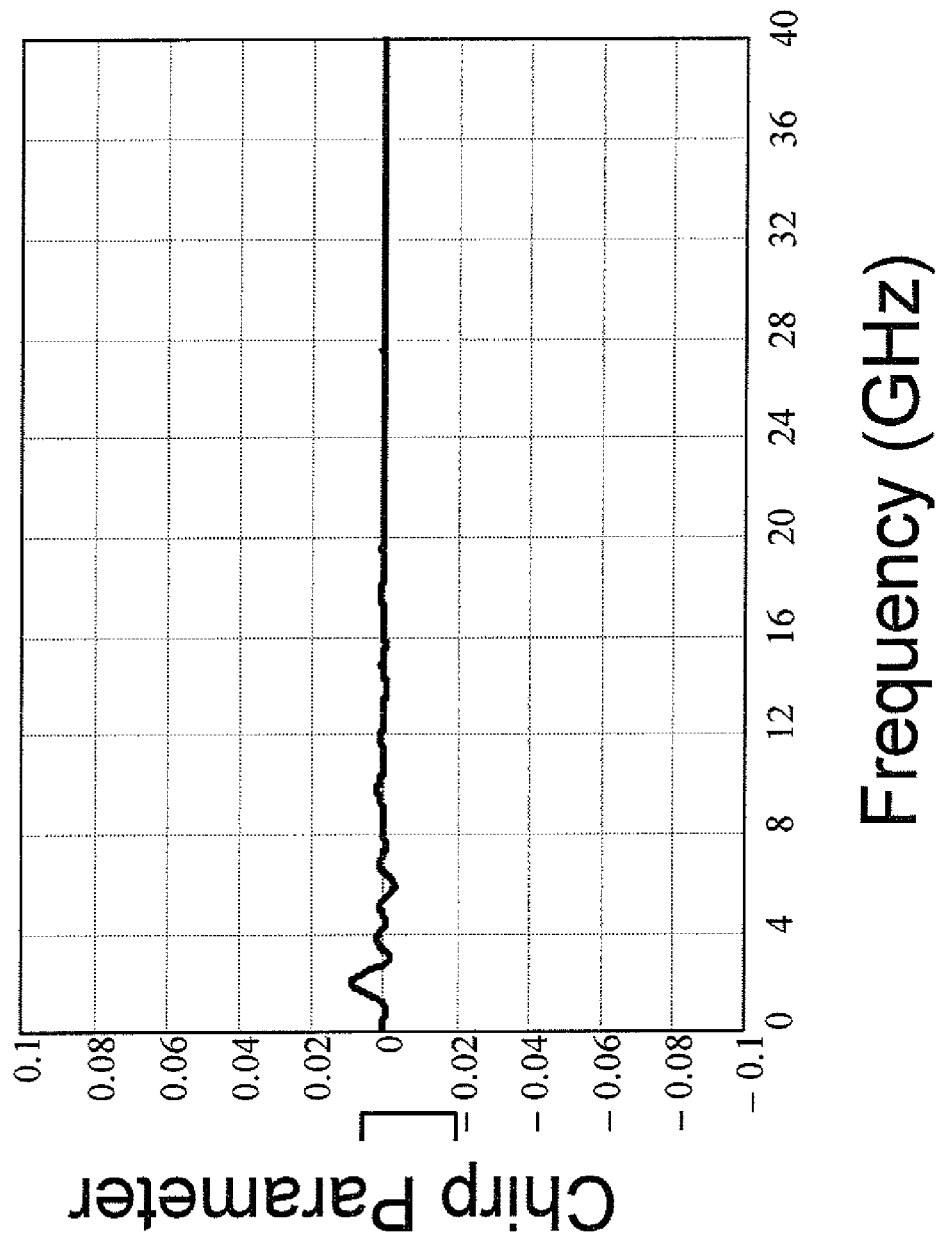
FIG. 36 is a graph of chirp versus frequency for the MZ of FIG. 31 with a 20% lower RF loss.
Figure 37:
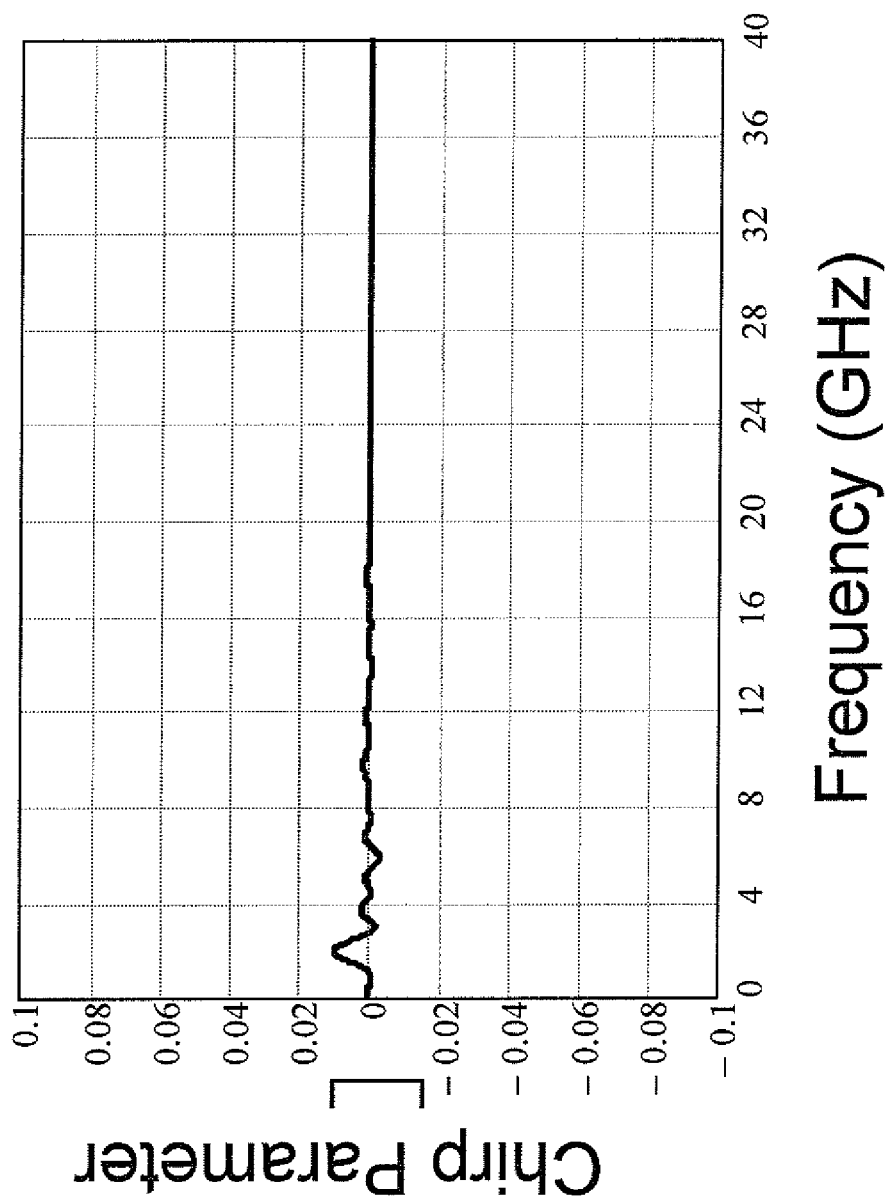
FIG. 37 is a graph of chirp versus frequency for the MZ of FIG. 31 with a higher intrinsic chirp of 0.8.
Figure 38:
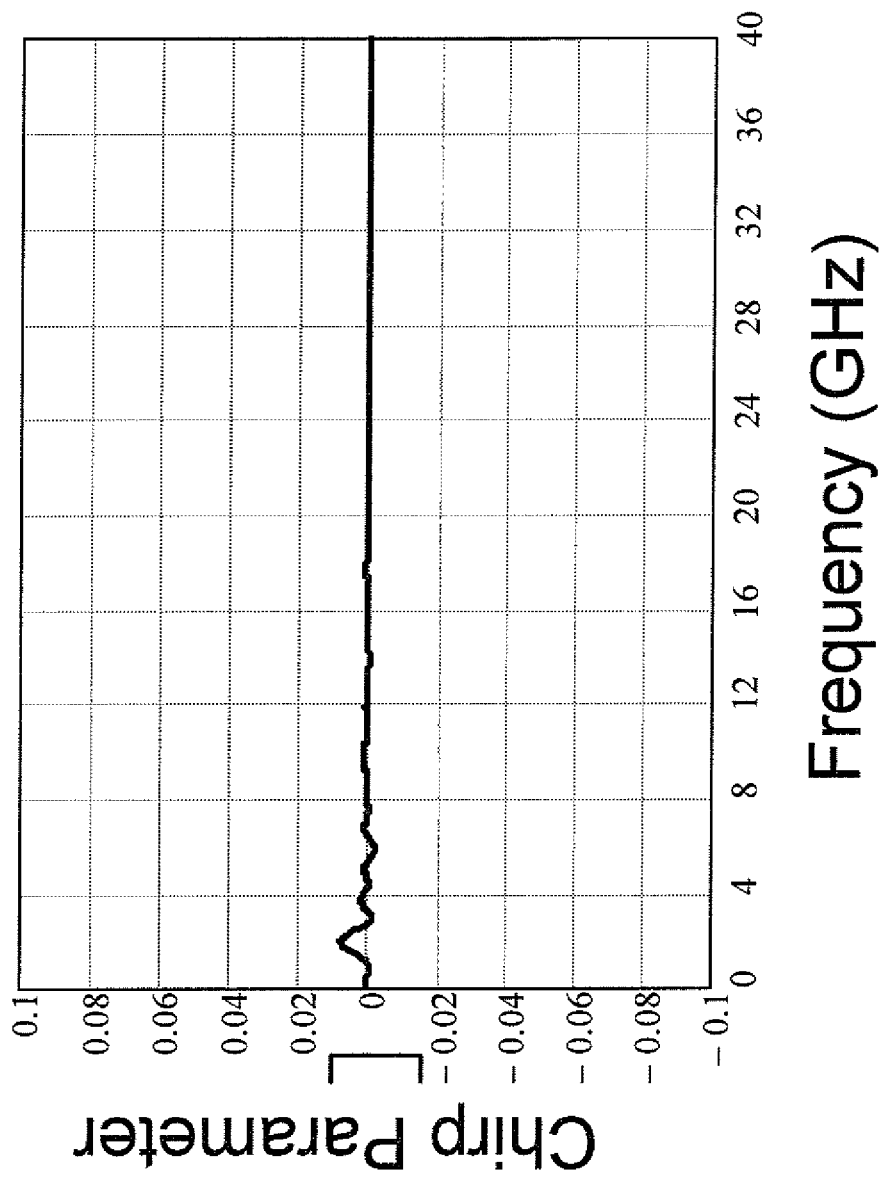
FIG. 38 is a graph of chirp versus frequency for the MZ of FIG. 31 with a lower intrinsic chirp of 0.6.

FIGS. 33-38 show the sensitivity of the flatness of the chirp vs. frequency curve to various changes in parameters. FIGS. 33 and 34 show chirp vs. frequency with +0.05 and −0.05 velocity walk-off between RF and optical signals ($\Delta N_{RF}$), respectively. The magnitude of chirp is 0.02 or less over the entire frequency range. This is an improvement over the prior art three-section MZ 60, see FIGS. 12-13, as well as the three-section MZ 80 with unequal lengths, see FIGS. 24-25. The chirp of the prior art three-section MZ 60 is +0.04 at 40 GHz, though, very small for frequencies below 20 GHz. The magnitude of the chirp of the three-section MZ 80 with unequal lengths is never much above 0.02, however, chirp is significant at frequencies below 20 GHz. FIGS. 35 and 36 show chirp vs. frequency for the cases of 20% higher and 20% lower RF loss, respectively, while FIGS. 37 and 38 show chirp vs. frequency for the cases of different intrinsic chirp (0.8 and 0.6, respectively). Note that any of these curves show little change from chirp with the nominal design, shown in FIG. 32. The magnitude of chirp is 0.01 or less across the entire frequency range. This is a significant improvement over the prior art three-section MZ 60, where chirp increases roughly linearly with frequency and equals a value between 0.01 and 0.03 at 40 GHz, see FIGS. 15-18, and a dramatic improvement of the prior art four section design 70 having equal lengths, see FIG. 20, where chirp increases to 0.08 at 34 GHz.

Figure 39A:
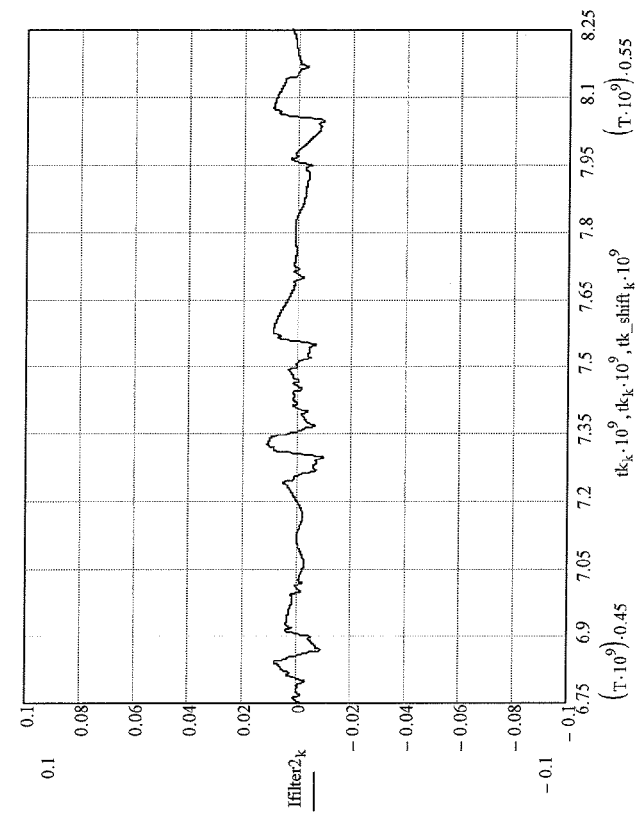
FIGS. 39A and B are graphs of the I signal and Q signal crosstalk in a 40 Gb QPSK transmission system for the MZ of FIG. 31 with a positive velocity walk-off.
Figure 39B:
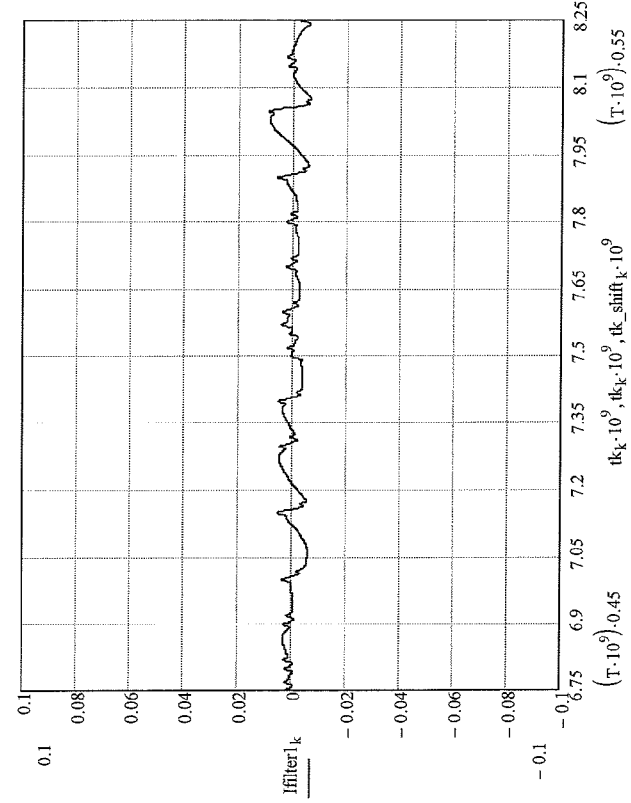

FIGS. 39A and B show the simulated crosstalk in the received I and Q signals for the four-section MZ 90 with unequal lengths and a positive velocity walk-off. Note that the magnitude of the crosstalk is 0.01 or less, which is less than the magnitude of up to 0.03 for either the prior art three-section MZ 60, see FIG. 14, or the three-section MZ 80 with unequal lengths, see FIG. 30.

In general, the chirp vs. frequency curve becomes flatter as the number of sections is increased. The only drawback is that the amount of inactive length, corresponding to locations where the electrode crosses over to the adjacent waveguide, becomes a larger portion of overall MZ length. It seems a four-section MZ with unequal lengths has adequate performance, but designs with more sections are possible.

Figure 40:
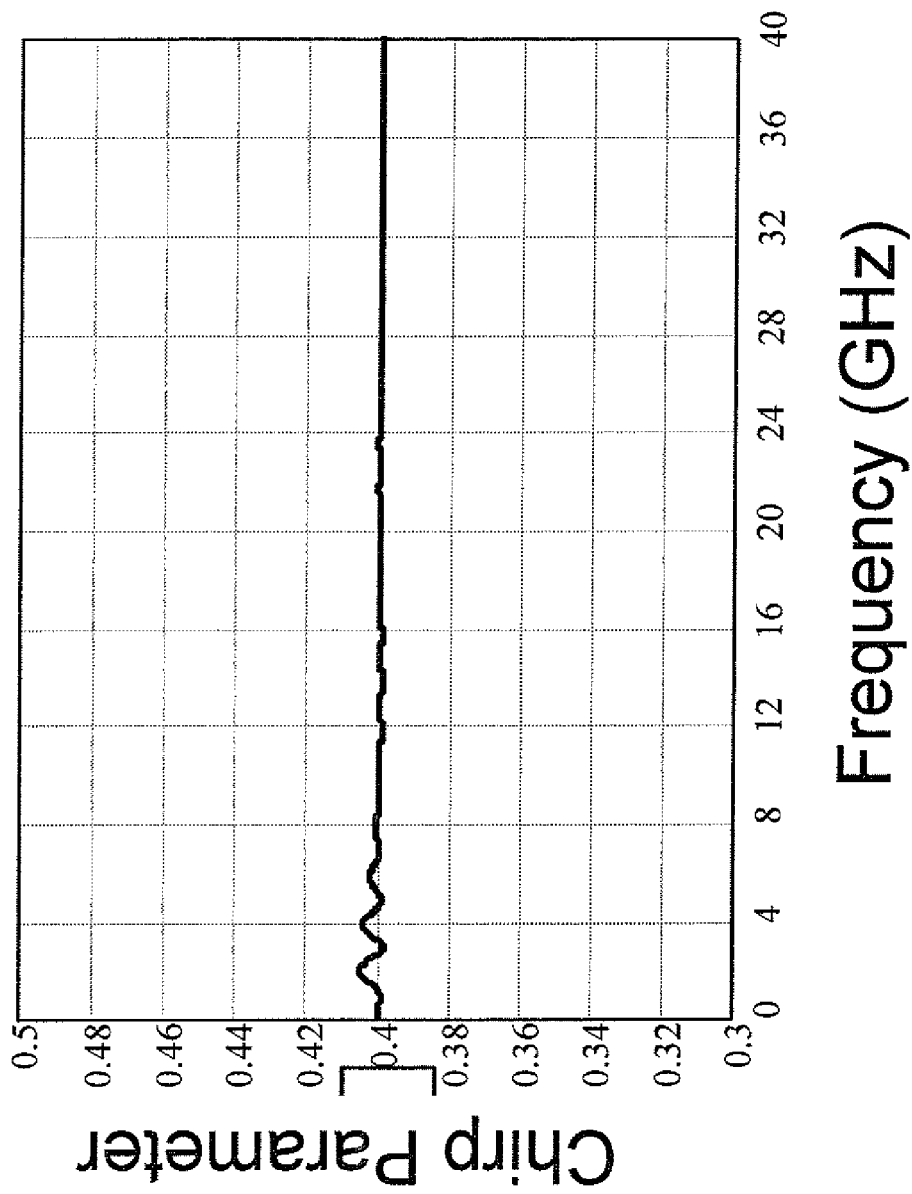
FIG. 40 is a graph of chirp versus frequency for a four section MZ in accordance with the present invention having a constant chirp versus frequency at a selected value of 0.4.
Figure 41:
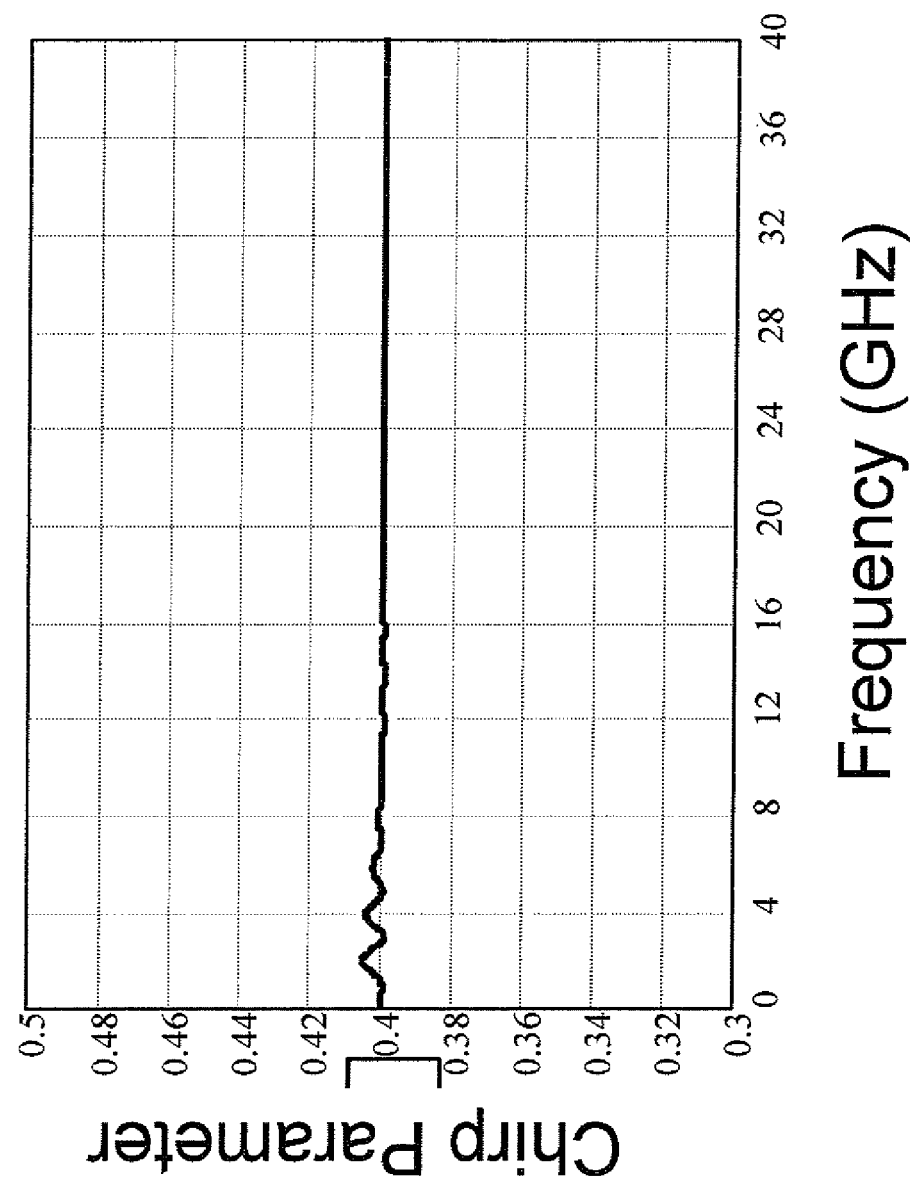
FIG. 41 is a graph of chirp versus frequency for the MZ of FIG. 40 with a 20% higher RF loss.
Figure 42:
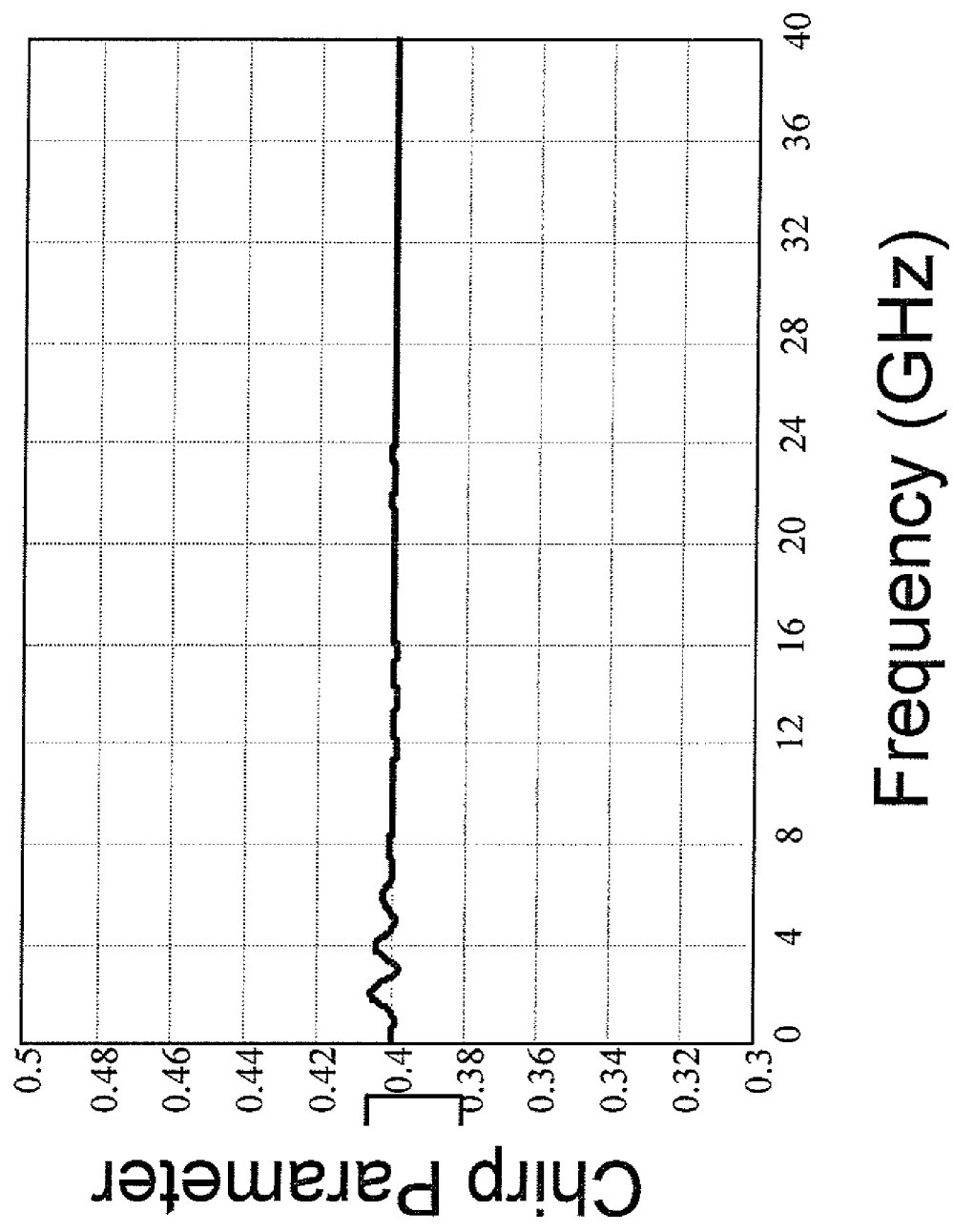
FIG. 42 is a graph of chirp versus frequency for the MZ of FIG. 40 with a 20% lower RF loss.
Figure 43:
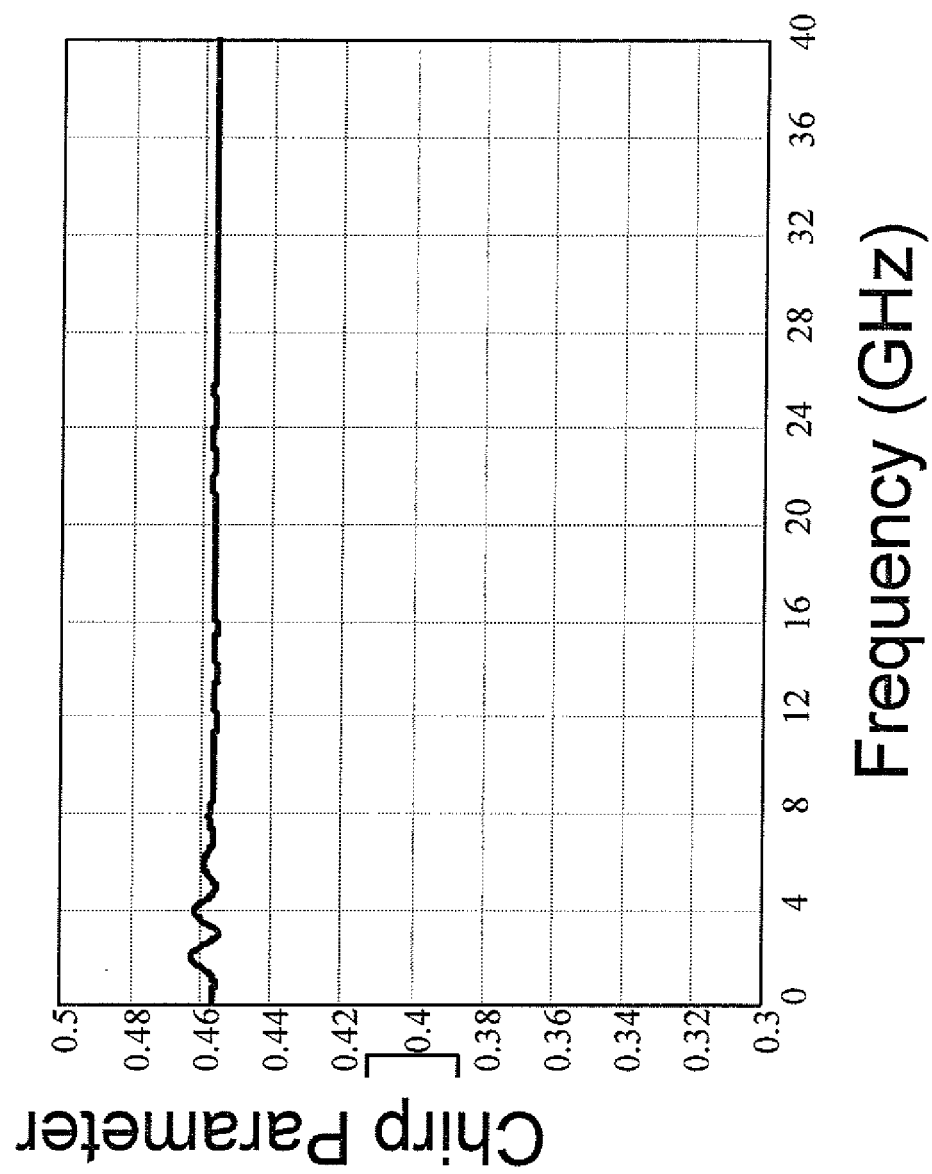
FIG. 43 is a graph of chirp versus frequency for the MZ of FIG. 40 with a higher intrinsic chirp of 0.8.
Figure 44:
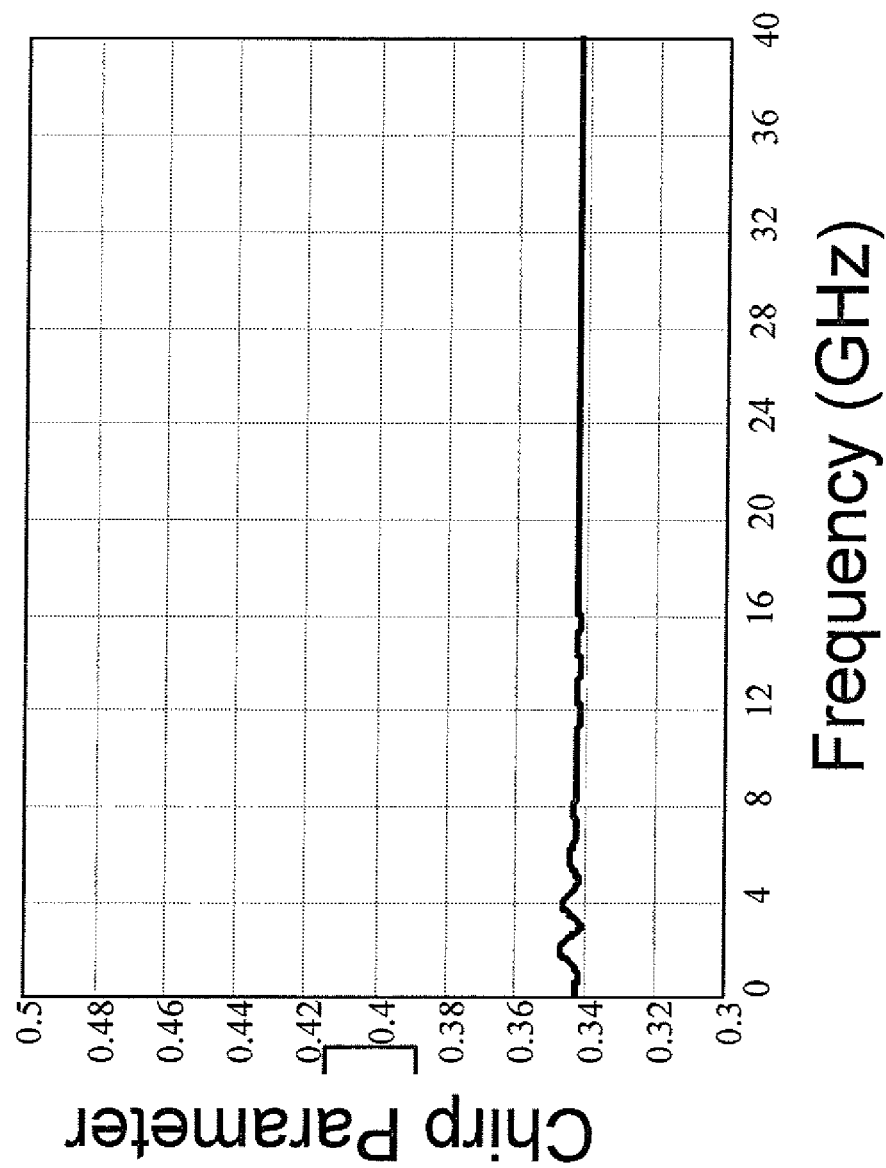
FIG. 44 is a graph of chirp versus frequency for the MZ of FIG. 40 with a lower intrinsic chirp of 0.6.
Figure 45:
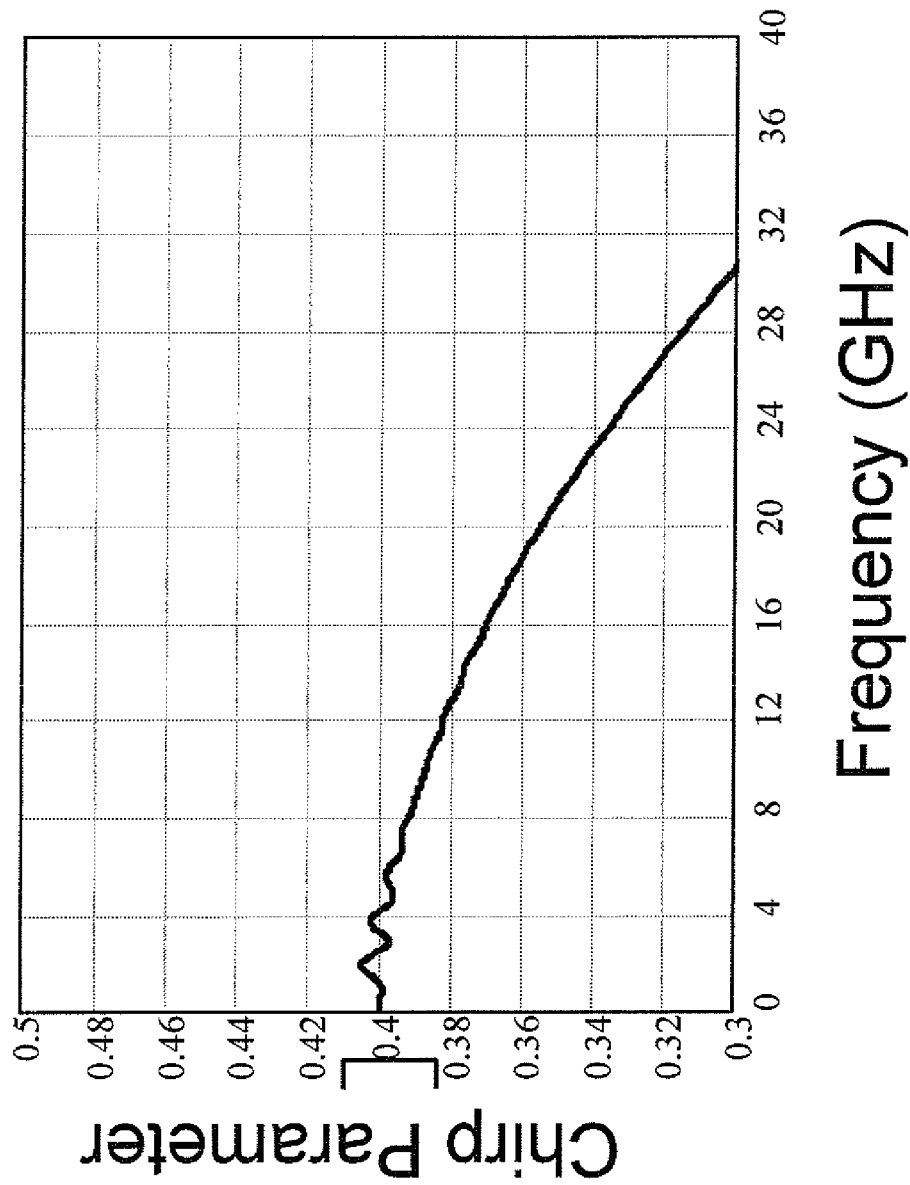
FIG. 45 is a graph of chirp versus frequency for the MZ of FIG. 40 with a positive velocity walk-off.
Figure 46:
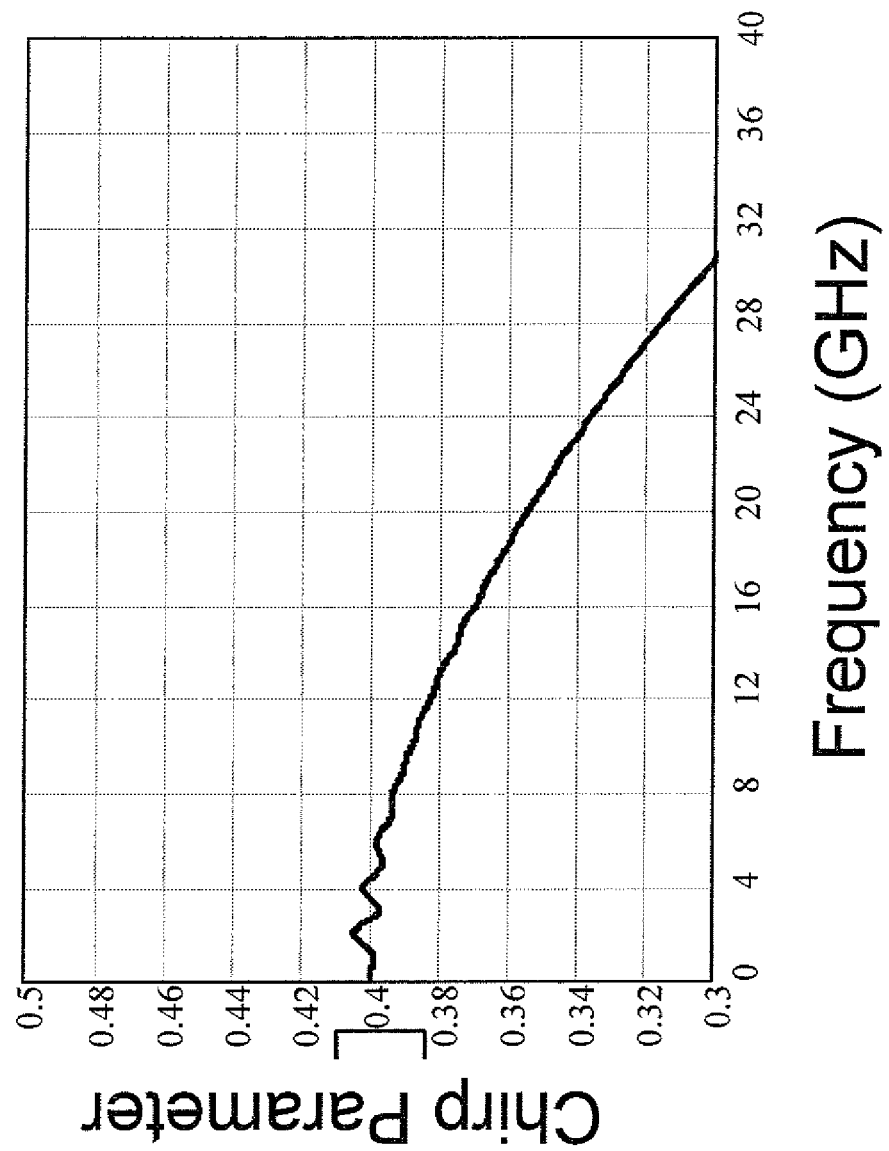
FIG. 46 is a graph of chirp versus frequency for the MZ of FIG. 40 with a negative velocity walk-off.

Designs were chirp is set to a non-zero value are also possible, allowing the chirp value to be tailored to the application requirement. FIG. 40 shows chirp vs. frequency for a four-section MZ 90 with unequal lengths, were the normalized lengths $L_1$, $L_2$, $L_3$, and $L_4$, corresponding to sections 91, 92, 93, 94 of the MZ 90 are 0.223, 0.149, 0.563, and 0.066, respectively. The chirp value is in the range 0.4±0.01 across the entire frequency range for nominal choices of parameters. The intrinsic chirp of individual section is assumed to be 0.7, as before. FIGS. 41 and 42 show chirp vs. frequency for the cases of 20% higher and 20% lower RF loss, respectively, while FIGS. 43 and 44 show chirp vs. frequency for the cases of different intrinsic chirp (0.8 and 0.6, respectively). The chirp vs. frequency curve shows little change when the values RF loss is modified, however, the value of chirp changes significantly when the intrinsic chirp is changed, the percentage change being approximately equal to the percentage change in intrinsic chirp. FIGS. 45 and 46 show chirp vs. frequency with +0.05 and −0.05 velocity walk-off between RF and optical signals ($\Delta N_{RF}$), respectively. The value of chirp drops to 0.3 at about 30 GHz in either case. The severity of this variation in chirp on system performance depends on the application. At any rate, designs where chirp is set to zero at all frequencies seem to be the most robust with regards to variations in such parameters as RF loss, velocity walk-off, and intrinsic chirp.

TABLE 1

Optimum normalized lengths for N section MZ, assuming $a_{01} = 0.0311$ Nepers/(cm-(GHz)$^{0.5}$), corresponding to 0.27 dB/(cm-(GHz)$^{0.5}$), and 0.70 intrinsic chirp.

| N | $L_1$ | $L_2$ | $L_3$ | $L_4$ | $L_5$ | $L_6$ | $L_7$ |
|---|-------|-------|-------|-------|-------|-------|-------|
| 3 | 0.220 | 0.500 | 0.280 | n/a | n/a | n/a | n/a |
| 4 | 0.130 | 0.335 | 0.370 | 0.165 | n/a | n/a | n/a |
| 5 | 0.086 | 0.234 | 0.308 | 0.266 | 0.106 | n/a | n/a |
| 6 | 0.061 | 0.171 | 0.243 | 0.256 | 0.196 | 0.074 | n/a |
| 7 | 0.034 | 0.106 | 0.176 | 0.224 | 0.226 | 0.170 | 0.063 |

TABLE 2

Optimum normalized lengths for N section MZ, assuming $a_{01} = 0.0518$ Nepers/(cm-(GHz)$^{0.5}$), corresponding to 0.45 dB/(cm-(GHz)$^{0.5}$), and 0.70 intrinsic chirp.

| N | $L_1$ | $L_2$ | $L_3$ | $L_4$ | $L_5$ | $L_6$ | $L_7$ |
|---|-------|-------|-------|-------|-------|-------|-------|
| 3 | 0.200 | 0.500 | 0.300 | n/a | n/a | n/a | n/a |
| 4 | 0.120 | 0.322 | 0.380 | 0.178 | n/a | n/a | n/a |
| 5 | 0.080 | 0.223 | 0.306 | 0.277 | 0.114 | n/a | n/a |
| 6 | 0.057 | 0.163 | 0.238 | 0.259 | 0.205 | 0.078 | n/a |
| 7 | 0.043 | 0.124 | 0.188 | 0.221 | 0.212 | 0.155 | 0.057 |

Tables 1 and 2 provide calculated examples of optimum normalized lengths for an N section MZ, assuming $a_{01}=0.0311$ Nepers/(cm-(GHz)$^{0.5}$), corresponding to 0.27 dB/(cm-(GHz)$^{0.5}$) (Table 1), or $a_{01}=0.0518$ Nepers/(cm-(GHz)$^{0.5}$), corresponding to 0.45 dB/(cm-(GHz)$^{0.5}$) (Table 2), and 0.70 intrinsic chirp. There are some common patterns to the solutions shown in Tables 1 and 2. The longest section is near the middle of the MZ. As one moves from that longest section to either the input or output of the MZ, the sections become monotonically shorter and shorter. In addition, if one compares the $1^{st}$ section to the Nth section, the Nth section is longer. For MZ's with four or more sections, the N−1 section is longer than the $2^{nd}$ section. For MZ's with six or more sections, the N−2 section is longer than the $3^{rd}$ section, and so on. Even though no two lengths are equal in any given design, the difference between two lengths can be 1% or less of the total active MZ length for the MZ's with larger numbers of sections.

Figure 4A:
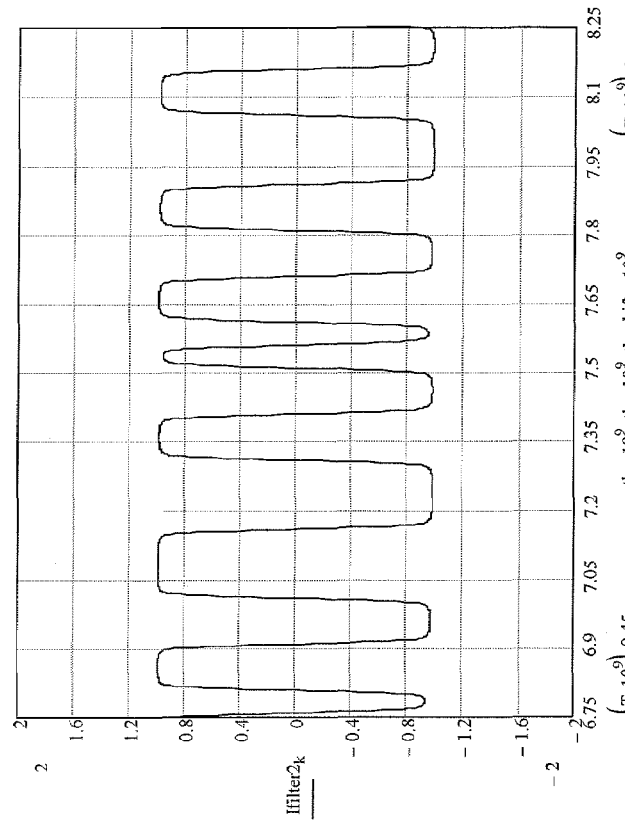
FIGS. 4A and B are graphs of the I and Q received 2×20 Gb digital signal in a 40 Gb QPSK transmission system using and ideal prior art DPMZ.
Figure 4B:
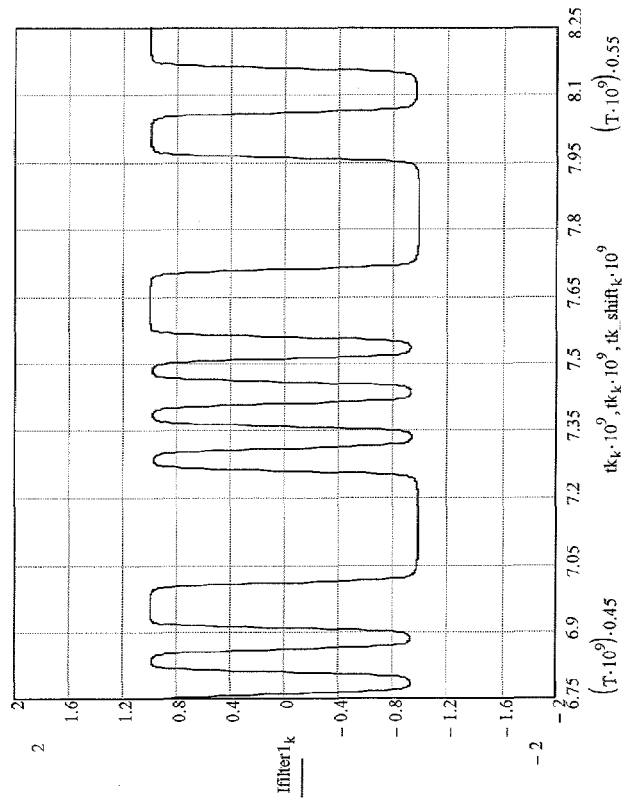
Figure 5:
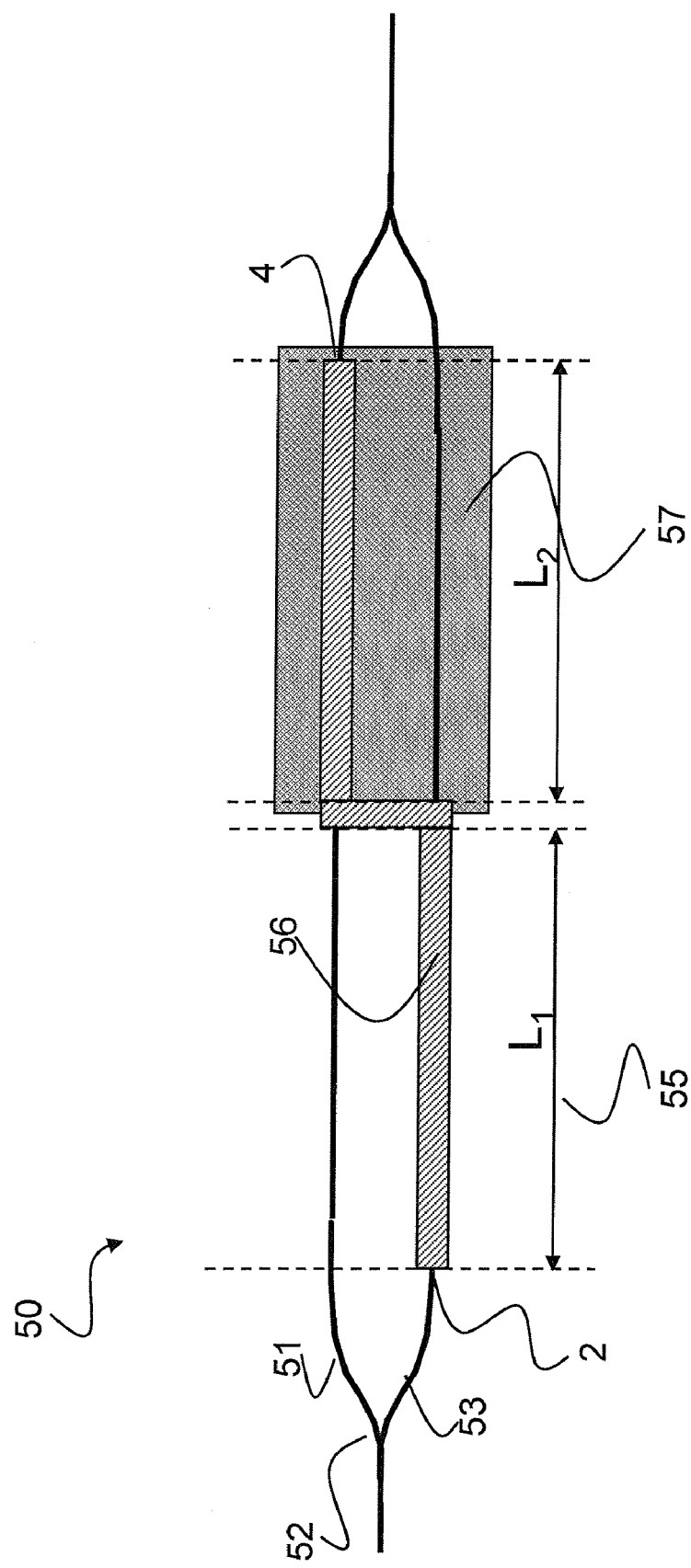
FIG. 5 is a schematic illustration of a prior art two section MZ.
Figure 6:
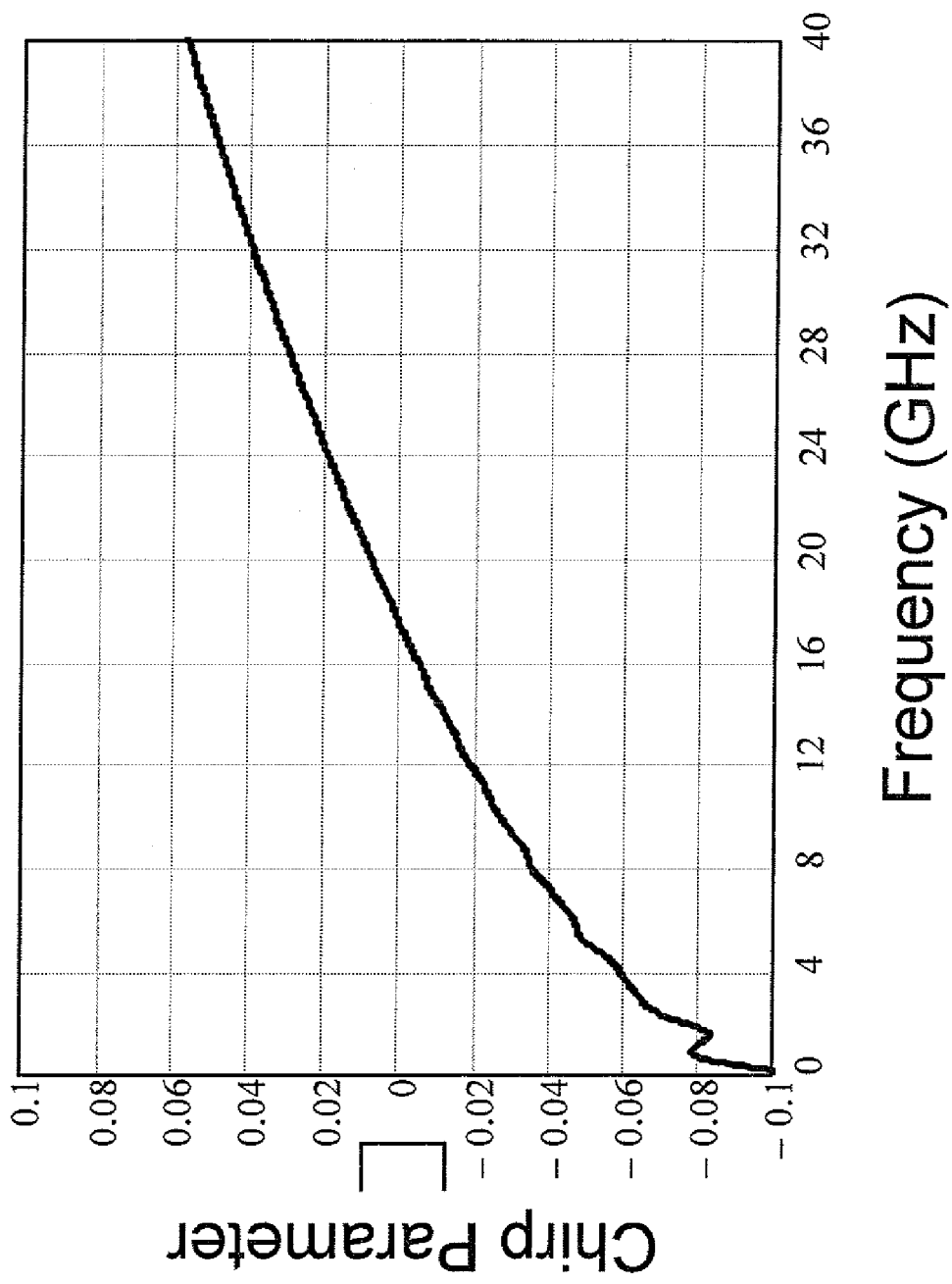
FIG. 6 is a graph of chirp versus frequency for the prior art MZ of FIG. 5.
Figure 7B:
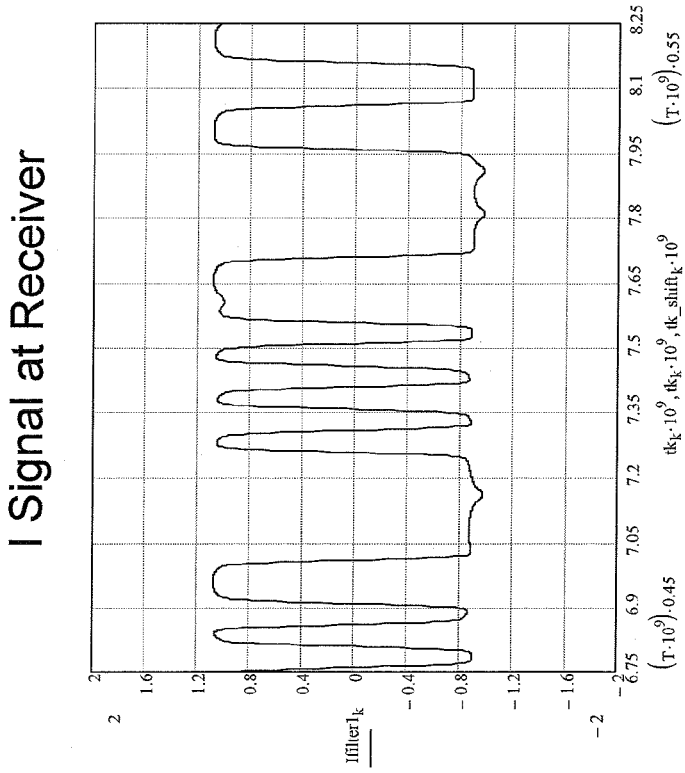
FIGS. 7A and B are graphs of the I and Q signals of the 2×20 Gb digital signal in a 40 Gb QPSK transmission system using DPMZ with the prior art two section MZ of FIG. 5.
Figure 7A:
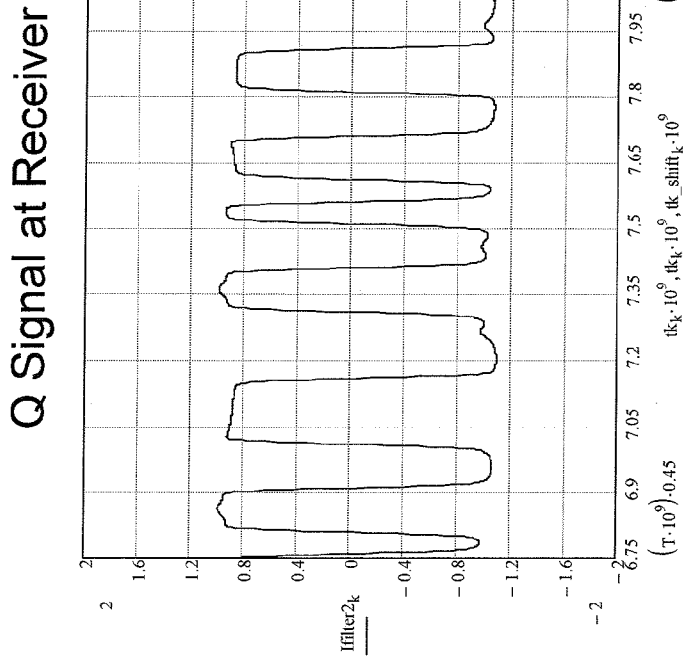
Figure 8A:
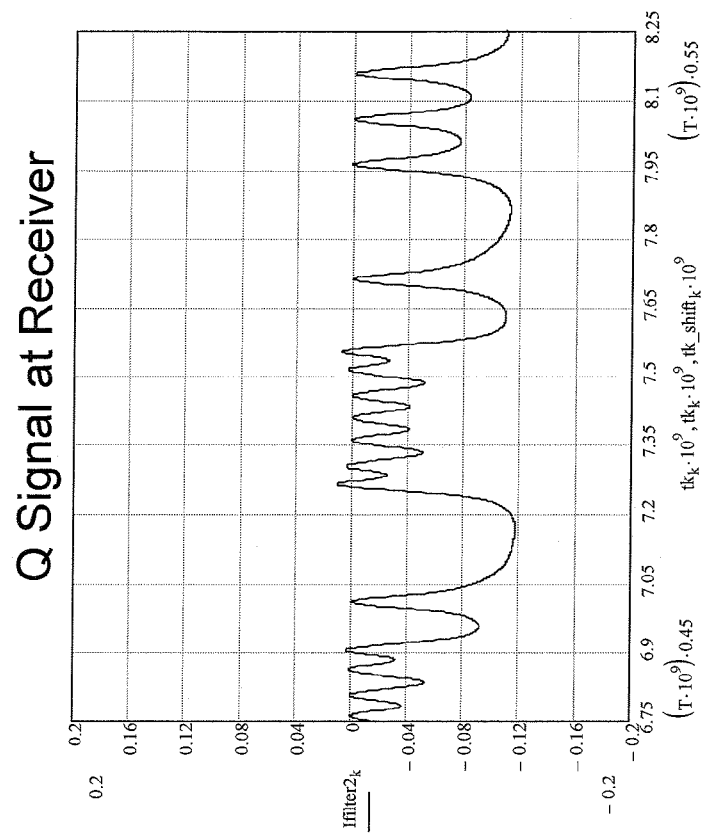
FIGS. 8A and B are graphs of the signal crosstalk in the 4 Gb QPSK transmission system using DPMZ with the prior art MZ of FIG. 5.
Figure 8B:
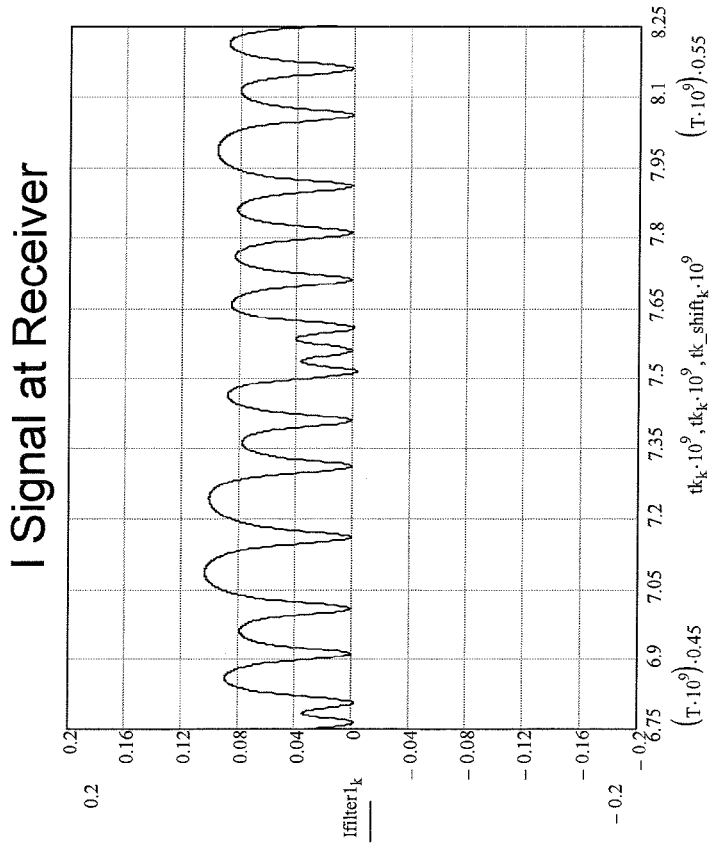
Figure 47:
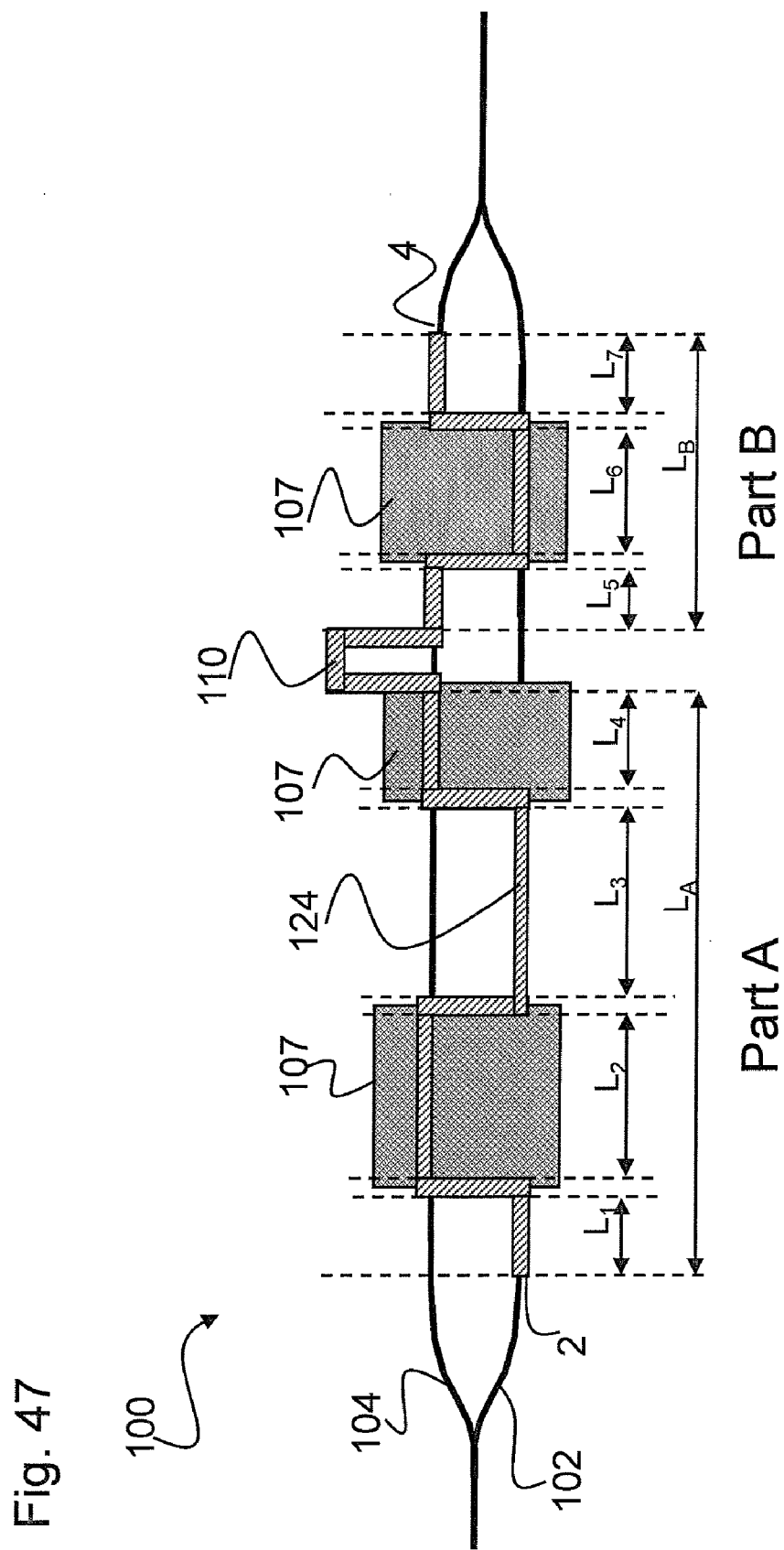
FIG. 47 is a schematic illustration of a zero-chirp MZ in accordance with the present invention including an RF delay line for frequency response equalization.
Figure 48:
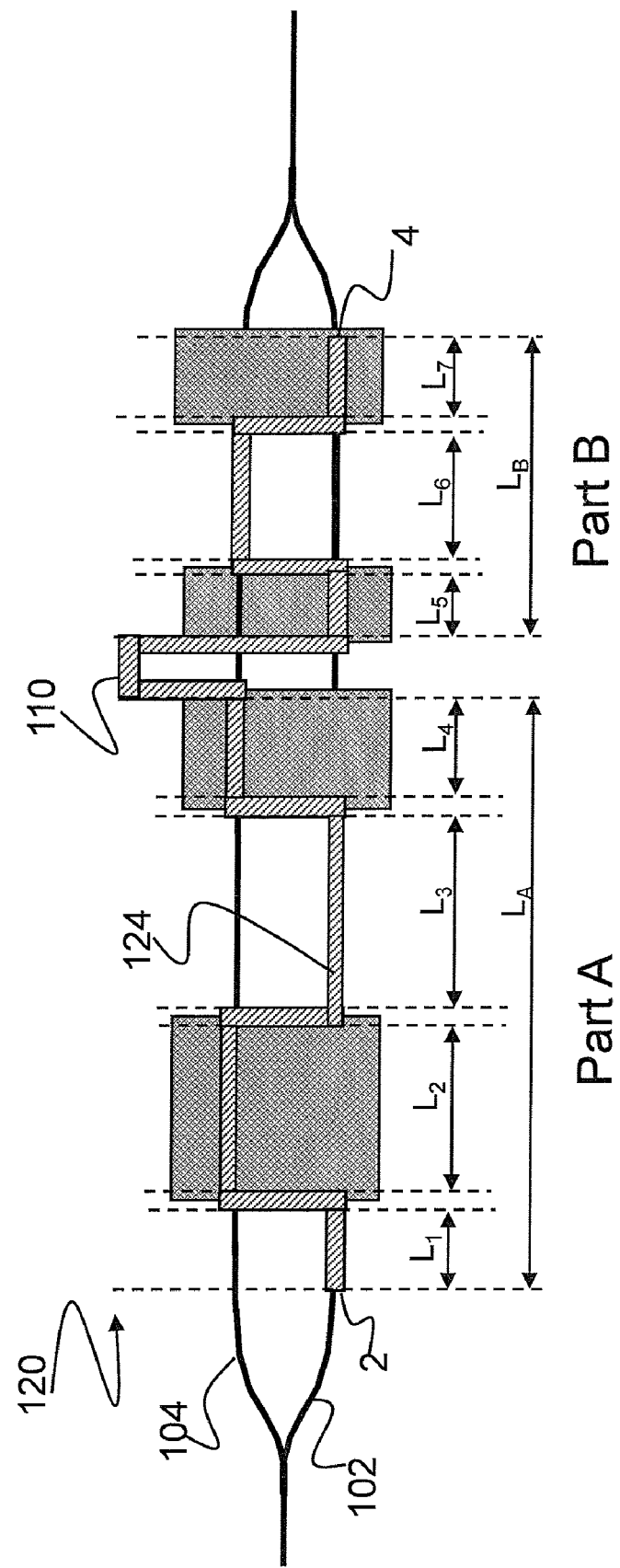
FIG. 48 is a schematic illustration of an alternative zero-chirp MZ including an RF delay line for frequency response equalization.

FIGS. 47 and 48 describe a modulator 100, 120 that combines the electrode and domain reversal for obtaining zero chirp with the frequency response equalization described in U.S. Pat. No. 6,580,840. MZ parts A and B of length $L_A$ and $L_B$ correspond to the parts before and after the compensation network 114 having length $L_1$ and $L_2$ in FIG. 4 of the '480 patent. The compensation network 110 is a simple RF delay line in FIGS. 47 and 48, analogous to the RF delay line shown in FIG. 5 of the '480 patent. The modulators 100, 120 of FIGS. 47 and 48 use a Co-Planar Waveguide (CPW) RF electrode 124 with z-cut lithium niobate as the substrate (not shown), whereas the embodiments shown in FIGS. 4 and 5 of the '480 patent show a Co-Planar Strip (CPS) RF electrode with x-cut lithium niobate. As before, only the signal electrode is shown in FIGS. 47 and 48. Ground electrodes in the CPW electrodes are not shown.

The method by which frequency response flattening is accomplished in the modulators 100, 120 shown in FIGS. 47 and 48 is relatively straightforward. MZ part A produces most of the modulation at any frequency. MZ part B produces modulation that is opposite to that of the part A at low frequency. At some high enough frequency, the phase shift caused by the delay line 110 adds in an additional 180 degrees of phase shift, canceling out the modulation polarity reversal between the parts A and B. The reduction of modulation at low frequency and increase in modulation at a higher frequency produces a flattening of the frequency response of the modulator 100, 120. Note that the RF signal electrode 124 in the domain reversed region(s) in part B, having length $L_6$ in modulator 100, and lengths $L_5$, $L_7$ in modulator 120, are on the opposite waveguide 102, relative to the domain reversed regions in part A, $L_2$, $L_4$ in modulator 100 and 120. Likewise, for the electrode locations in the regions without domain reversal, having lengths $L_1$, $L_3$, $L_5$ and $L_7$ in modulator 100, and lengths $L_1$, $L_3$, $L_6$ in modulator 120, the electrode location is chosen to be on the opposite waveguide, 104 in part B relative to part A in order that the modulation in part B cancels out some portion of the modulation produced in part A at low frequency. The use of domain reversal allows for two different design variants 100, 120 which are shown in FIGS. 47 and 48. In FIG. 47, the second section of length $L_6$ in part B has domain reversal, whereas in FIG. 48 the first and third sections of lengths $L_5$ and $L_7$ of part B have domain reversal.

One problem for some applications with the equalized design of the '840 patent is non-zero chirp. The chirp can be made nearly zero by applying the domain and electrode reversal design rules discussed earlier to parts A and B, independently of one another. In particular, the number of MZ sections, e.g., 2 or more, need not be the same for parts A and B. Part A may require more sections, as it produces most of the modulation. FIGS. 47 and 48 show a four-section MZ design for part A, and a three-section MZ design for part B. Most likely, at least three sections are needed for either part A or B, as a two-section design produces a significant amount of chirp at some frequencies.

To clarify the design process for the structures shown in FIGS. 47 and 48, Lengths $L_1$, $L_2$, $L_3$, and $L_4$ normalized to length $L_A$ would be the same as for the lengths of the four section MZ with unequal lengths, that is $L_1$, $L_2$, $L_3$, and $L_4$ normalized to length $L_A$ are 0.130, 0.335, 0.370, and 0.165, respectively, as defined before. Similarly, lengths $L_5$, $L_6$, and $L_7$ normalized to length $L_B$ correspond would be the same as for the three lengths of the three section MZ with unequal lengths, that is lengths $L_5$, $L_6$, and $L_7$ normalized to length $L_B$ are 0.22, 0.50, and 0.28, respectively, as defined before. Hence, the MZ sections A and B produce nearly zero chirp at all frequencies, independently of one another. Thus the net chirp of the entire structure at all frequencies is also close to zero. Note that these designs will have the lowest magnitude of chirp across the frequency range for the case where the RF and optical velocities are matched. The design described in the '840 patent can accommodate a large amount velocity walk-off to allow for improved modulation efficiency; however, a large amount of velocity walk-off is likely to cause the magnitude of chirp to be significantly larger at some frequencies than for the case where velocities are matched. Hence, for the designs shown in FIGS. 47 and 48, there is likely to be some trade-off between overall modulation efficiency and the degree to which chirp equals zero at all frequencies.

The embodiment(s) of the invention described above is(are) intended to be exemplary only. The scope of the invention is therefore intended to be limited solely by the scope of the appended claims.

What is claimed is:

1. A Mach-Zehnder optical modulator comprising:
   a substrate of electro-optic material having a plurality of regions with alternating domain structure;
   a Mach-Zehnder (MZ) optical waveguide interferometer formed in the substrate and having two optical waveguide arms, the waveguide arms having a length so as to include at least four regions of alternating domain structure;
   an RF signal electrode including an RF input and an RF output, and having at least four sections, each section having a length substantially corresponding to the alternating domain structure regions of the substrate, the RF signal electrode positioned over sections of the two optical waveguides arms such that the signal electrode crosses from one optical waveguide arm to the other optical waveguide arm at a boundary of each alternating domain structure region;
   the lengths of the at least four RF signal electrode sections are predetermined to approximate a constant chirp versus frequency over an optimized frequency band, such that:
   the sections include a center section or center pair of sections disposed asymmetrically between an RF input and an RF output, and surrounded by one or more pairs of surrounding sections, the pairs of surrounding sections including an innermost surrounding pair of sections comprising two sections adjacent the center section or center pair of sections, and two sections adjacent the innermost pair of sections moving outwardly from the innermost to a final outermost pair at the RF input and RF output, the surrounding pairs having lengths that are equal to each other or unequal such that the section closer to the RF output is longer than the section closer to the RF input, the lengths of the surrounding pairs decreasing from the innermost surrounding pair to the outermost surrounding pair of sections.

2. The Mach-Zehnder optical modulator defined in claim 1, wherein the substrate comprises lithium niobate, lithium tantalite or electro-optic polymer.

3. The Mach-Zehnder optical modulator defined in claim 2, wherein the substrate comprises z-cut lithium niobate.

4. The Mach-Zehnder optical modulator defined in claim 3, wherein the alternating domain structure comprises inverted domain sections an uninverted domain sections and a total length of the inverted domain sections is equal to a total length of the uninverted sections to provide zero chirp at low frequency.

5. The Mach-Zehnder optical modulator defined in claim 4, wherein the modulator functions at less than 5 Volts, preferably less than 4 Volts and most preferably at less than 3 Volts.

6. The Mach-Zehnder optical modulator defined in claim 1, wherein the MZ comprises an inner MZ in a dual parallel MZ modulator including a pair of matched inner MZs disposed in parallel arms of an outer MZ.

7. The Mach-Zehnder optical modulator defined in claim 6, wherein each inner MZ comprises a 4 section MZ.

8. The Mach-Zehnder optical modulator defined in claim 7, wherein the center sections or center pairs are disposed asymmetrically in the length of the inner MZ waveguide arms, and the pairs of surrounding sections have unequal lengths.

9. The Mach-Zehnder optical modulator defined in claim 6, wherein each inner MZ comprises a 5 section MZ.

10. The Mach-Zehnder optical modulator defined in claim 1, wherein the MZ includes part A of length $L_A$ and part B of length $L_B$ and an RF delay line between them, such that part B produces modulation opposite to part A at low frequency, and the RF electrode includes at least 4 sections in part A, such that the sections include a center section or center pair of sections disposed asymmetrically between an RF input and the RF delay line, and surrounded by one or more pairs of surrounding sections, the pairs of surrounding sections including an innermost surrounding pair of sections comprising two sections adjacent the center section or center pair of sections, and two sections adjacent the innermost pair of sections moving outwardly from the innermost to a final outermost pair at the RF input and RF delay line, the surrounding pairs having lengths that are equal to each other or unequal such that the section closer to the RF delay line is longer than the section closer to the RF input, the lengths of the surrounding pairs decreasing from the innermost surrounding pair to the outermost surrounding pair of sections;

and the RF electrode includes at least 3 sections in part B such that the sections include a center section or center pair of sections disposed asymmetrically between the RF delay line and the RF output, and surrounded by one or more pairs of surrounding sections, the pairs of surrounding sections including an innermost surrounding pair of sections comprising two sections adjacent the center section or center pair of sections, and two sections adjacent the innermost pair of sections moving outwardly from the innermost to a final outermost pair at the RF delay line and the RF output, the surrounding pairs having lengths that are equal to each other or unequal such that the section closer to the RF output is longer than the section closer to the RF delay line, the lengths of the surrounding pairs decreasing from the innermost surrounding pair to the outermost surrounding pair of sections; and the RF signal electrode in the domain reversed regions in part B is on the opposite waveguide relative to the domain reversed regions in part A.

11. The Mach-Zehnder optical modulator as defined in claim 10, wherein the lengths of the sections of part A are selected to provide a nearly constant zero chirp versus frequency across an optimized frequency band, and the lengths of the sections of part B are selected to provide a constant zero chirp versus frequency across an optimized frequency band.

* * * * *